(12) United States Patent
Bererton et al.

(10) Patent No.: US 11,673,053 B2
(45) Date of Patent: Jun. 13, 2023

(54) OPEN GAME ENGINE AND MARKETPLACE WITH ASSOCIATED GAME EDITING AND CREATION TOOLS

(71) Applicant: Electronic Arts Inc., Redwood City, CA (US)

(72) Inventors: Curt Alexander Bererton, Burlingame, CA (US); Thomas Andrew Bererton, Calgary (CA); Christopher Lee DeLeon, Pacifica, CA (US); David Lee Hershberger, Palo Alto, CA (US); John Michael Nesky, Pacifica, CA (US); Mathilde Elodie Pignol, Burlingame, CA (US); Joshua Alan Wagner, San Francisco, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 380 days.

(21) Appl. No.: 16/909,918

(22) Filed: Jun. 23, 2020

(65) Prior Publication Data

US 2021/0008455 A1    Jan. 14, 2021

Related U.S. Application Data

(63) Continuation of application No. 12/417,845, filed on Apr. 3, 2009, now abandoned.
(Continued)

(51) Int. Cl.
*A63F 13/63* (2014.01)
*A63F 13/71* (2014.01)

(52) U.S. Cl.
CPC .............. *A63F 13/63* (2014.09); *A63F 13/71* (2014.09); *A63F 2300/575* (2013.01); *A63F 2300/6009* (2013.01)

(58) Field of Classification Search
CPC .... A63F 13/63; A63F 13/71; A63F 2300/575; A63F 2300/6009
(Continued)

(56) References Cited

U.S. PATENT DOCUMENTS 5,680,534 A    10/1997   Yamato et al.
5,794,006 A    8/1998    Sanderman
(Continued)

OTHER PUBLICATIONS

"Game Brix Game Maker Tutorial," <http://web.archive.org/web/20071110011329/http://www.youtube.com/watch?v=dYAK6S4HcH0>, internet archive date Nov. 10, 2007, 3 pages.
(Continued)

*Primary Examiner* — Jay Trent Liddle
*Assistant Examiner* — Ryan Hsu
(74) *Attorney, Agent, or Firm* — Knobbe, Martens, Olson & Bear, LLP

(57) ABSTRACT

The present invention provides a video game development platform. More specifically, aspects of the invention relate to components of applications such as video games including the source code, graphics, sounds, and animations as well as a market place where any of the above are traded for currency, tokens, credits, or given to other people. These components can then be combined, using game editing and creation tools, to make video games. Users can create and edit games, either of their own or based on other users' preexisting games, and can share their games with others. Game components may be bought, sold, traded, or otherwise distributed through an online marketplace.

20 Claims, 40 Drawing Sheets

Related U.S. Application Data

(60) Provisional application No. 61/042,516, filed on Apr. 4, 2008.

(58) Field of Classification Search
USPC .......................................................... 463/42
See application file for complete search history.

(56) References Cited

U.S. PATENT DOCUMENTS

| | | | |
|---|---|---|---|
| 6,692,359 | B1 | 2/2004 | Williams et al. |
| 8,001,219 | B2 | 8/2011 | Moorer et al. |
| 8,317,606 | B2 | 11/2012 | Graham et al. |
| 2002/0108109 | A1 | 8/2002 | Harris et al. |
| 2005/0027871 | A1 | 2/2005 | Bradley et al. |
| 2006/0224448 | A1 | 10/2006 | Herf |
| 2007/0241945 | A1 | 10/2007 | Moorer et al. |
| 2008/0016176 | A1* | 1/2008 | Leitner ............... A63F 13/332 709/217 |
| 2008/0096654 | A1 | 4/2008 | Mondesir et al. |
| 2008/0146342 | A1 | 6/2008 | Harvey et al. |
| 2008/0176658 | A1 | 7/2008 | Wright |
| 2009/0044237 | A1 | 2/2009 | Keiter |
| 2009/0163272 | A1 | 6/2009 | Baker et al. |
| 2009/0201270 | A1 | 8/2009 | Pikkujamsa et al. |
| 2009/0204563 | A1 | 8/2009 | Gerber et al. |
| 2009/0253517 | A1 | 10/2009 | Bererton et al. |
| 2010/0005424 | A1 | 1/2010 | Sundaresan et al. |
| 2010/0180297 | A1 | 7/2010 | Levine et al. |
| 2010/0267437 | A1 | 10/2010 | Ansari et al. |
| 2010/0298049 | A1 | 11/2010 | Ansari et al. |
| 2011/0202424 | A1 | 8/2011 | Chun et al. |

OTHER PUBLICATIONS

Search results on YouTube.com for "GameBrix," <http://www.youtube.com/results?search_query=gamebrix&aq=f>, no internet archive version available, internet accessed on Jun. 24, 2011, 2 pages.

Soloder.com website, <htto://www.soloder.com>, internet archive date Mar. 30, 2008, 2 pages.

Wikipedia.org, "Game Maker," <http://web.archive.org/web/20071115041511/http://en.wikipedia.org/wiki/Game_maker>, internet archive date Nov. 15, 2007. 6 pages.

YoyoGames Website, <http://www.yoyogames.com>, internet archive dated Mar. 30, 2008, 5 pages.

* cited by examiner

```
Code Listing 1:
<object name="cannon" type="player" color="0xff59c7">
  <shape>
    <perimeter>
      <circle x="0" y="0" radius="32"/>
    </perimeter>
    <visual priority="2" type="swf"
url="assets/gameAssets/canon.swf" assetID="53"/>
    <physics source="perimeter" density="1" bounciness="0.5"
friction="0"
           solid="true" anchored="true"
           collisionSoundURL="assets/gameAssets/tap.mp3"
      assetID="58"
           collisionSoundPriority="2" />
  </shape>
  <controller>
    <always>
      <targetTypeNearest targetType="mouse"/>
      <lookAtTarget/>
    </always>
    <mouseButton>
      <shoot projectile="RedBall" xOffset="50" yOffset="0"
impulse="editable"
           onePerLife="true"/>
    </mouseButton>
  </controller>
</object>
```

Figure. 5

PLEASE NOTE THAT HORIZONTAL TABLE CATEGORIES (E.G. "RULE RELATED") ARE STRICTLY FOR ORGANIZATIONAL PURPOSES, AND ARE NOT VISIBLE AS DIVISIONS WITHIN THE XML OR AS3 API.

| | ABILITIES | DESTROY | SCORESELF | SCOREOTHER | ADDLIFE | THRUST | SHOOT | REGULATESPEED | LOOKATTARGET | EXPLODE | MOVETOTARGET | TARGETTYPENEAREST | CONTROLLER | —INPUT—MOUSEBUTTON | KEYPRESS | —AUTOMATED—ALWAYS (EVERY CYCLE) | COLLISIONATMYEDGE | COLLISIONWITHTYPE | SIGHTONTYPE | REGULARINTERVAL | SHAPE | SHAPE_VERTS, TEXTURE | TYPE | REORIENT RULE | DESTROYABLE | —VISUAL (+BB/RAD) | —PHYSICS | MOVE JOINT |
|---|---|---|---|---|---|---|---|---|---|---|---|---|---|---|---|---|---|---|---|---|---|---|---|---|---|---|---|---|
| PLAYER OBJECTS | | | | | | | | | | | | | | | | | | | | | | | | | | | | |
| PADDLE | | | | | | | | √ | | | √ | √ | | √ | | | √ | | | | | √ | √ | | | √ | √ | √ |
| CANNON | | | | | | | | | √ | | | √ | | √ | | | √ | | | | | √ | | | | √ | √ | |
| SHOOTER MARBLE | | | | | | √ | | | | | √ | √ | | √ | | | √ | | | | | √ | √ | | | √ | √ | |
| GOLF BALL | | | | | | √ | | | | | √ | √ | | √ | | | √ | | | | | √ | √ | | | √ | √ | |
| SCORE/TARGET OBJECTS | NOTE THAT SCORE VALUE IS ASSIGNED INDEPENDENTLY TO ANY OBJECT DURING SET CREATION | | | | | | | | | | | | | | | | | | | | | | | | | | | |
| GEM | | | | | | | | | | | | | | | | | | √ | | | | √ | √ | √ | √ | | | |
| BRICK | | | | | | | | | | | | | | | | | | √ | | | | √ | √ | √ | √ | √ | | |
| PEG | | | | | | | | | | | | | | | | | | √ | | | | √ | √ | √ | √ | √ | | |
| MARBLE | | | | | | | | | | | | | | | | | | √ | | | | √ | √ | | √ | √ | | |
| GOAL [-] | ADDED TO WIN BIN DURING SET CREATION, WITH THE WIN CONDITION SET TO "COLLECT ALL" (EX. ROCKET SHIP PIECES) | | | | | | | | | | | | | | | | | | | | | | | | | | | |
| RULE RELATED | | | | | | | | | | | | | | | | | | | | | | | | | | | | |
| DEATH ZONE | | √ | | | | | | | | | | | | | | | | | | | | √ | √ | | | | √ | |
| WIN ZONE | ADDED TO WIN BIN DURING SET CREATION, WITH THE WIN CONDITION SET TO "COLLECT ANY" (EX. EXIT SIGNS) | | | | | | | | | | | | | | | | | | | | | | | | | | | |
| GOLF HOLE | | | | √ | | | | | | | | | | | | | | | | | | | √ | | | | √ | |
| BALL SAVER NET | | | | | √ | | √ | | | | | | | | | | | | √ | √ | | | √ | | | | √ | |
| STATIC WALLS AND DECORATI... | | | | | | | | | | | | | | | | | | | | | | | | | | | | |
| QUARTER CIRCLE | | | | | | | | | | | | | | | | | | | | | | √ | √ | | | | √ | |
| TRIANGLE | | | | | | | | | | | | | | | | | | | | | | √ | √ | | | | | |
| LONG TRIANGLE | | | | | | | | | | | | | | | | | | | | | | √ | √ | | | | √ | |
| RECTANGLE | | | | | | | | | | | | | | | | | | | | | | √ | √ | | | | √ | |
| HALF CIRCLE | | | | | | | | | | | | | | | | | | | | | | √ | √ | | | | √ | |
| FLAG ("BACKGROUND") | | | | | | | | | | | | | | | | | | | | | | √ | | | | √ | | |
| "LIVE" DECORATIONS | | | | | | | | | | | | | | | | | | | | | | | | | | | | |
| PINWHEEL | | | | | | | | | | | | | | | | | | | | | | √ | | | | | √ | |
| FLOWER | | | | | | | | | | | | | | | | | | | | | | √ | | | | | √ | |
| PLAYER PROJECTILES | | | | | | | | | | | | | | | | | | | | | | | | | | | | |
| BALL PROJECTILE | | √ | | | | | | | | √ | | | | | | | | | | | | | √ | | | | | |
| SHOT PROJECTILE | | √ | | | | | | | | | | | | | | | | | | | | √ | √ | | | √ | | |

Figure 6

| MISC. EXAMPLES | | | | | | | | | | | | | | | | | | | | |
|---|---|---|---|---|---|---|---|---|---|---|---|---|---|---|---|---|---|---|---|---|
| WANDER-OFF-EDGE BADDIE | √ | | | | √ | | | | | | | √ | √ | √ | | √ | √ | √ | √ | |
| TURN-AT-EDGE BADDIE | √ | | | | √ | | | | | | | √ | √ | √ | | √ | √ | √ | √ | |
| AGGRESSIVE CHASER | √ | | | √ | | √ | | √ | | | | √ | | √ | √ | √ | √ | √ | √ | |
| COWARDLY FLEE ENEMY | | | | | | | √ | | | | | √ | | √ | √ | √ | | √ | √ | |
| HOPPERS | √ | | √ | | | | | | | | | √ | | √ | | √ | √ | √ | √ | |
| AIMED RANGED ENEMY | √ | | | √ | | | √ | | | | | √ | | | √ | √ | √ | √ | √ | |
| DUMB RANGED ENEMY | √ | | | √ | | | | | | | | √ | | | | √ | √ | √ | √ | |
| LAND MINE | √ | | | | | √ | | | | | | | | | | √ | | √ | √ | |
| DRIFTING ROBOTIC TURRET | √ | | | √ | √ | | | √ | | | | √ | | √ | √ | √ | √ | √ | √ | √ |
| MOVING PLATFORM | | | | | √ | | | | | | | | √ | √ | | √ | √ | | √ | |
| PLAYER RACECAR | | | | √ | | √ | | | √ | | √ | | | | | √ | √ | √ | √ | |
| POWER UP - 1UP/AMMO | | | √ | | | | | | | | | | | | | √ | | | | |
| PINBALL BUMPERS | | √ | | | | | | | | | | | | | | √ | | | √ | |
| PINBALL SHOOTER | | | | √ | | | | | | | | | | | | √ | | | √ | |
| MATCH-3 BUBBLE | | | | | | | | | | | | | | | | √ | | | √ | |
| PLATFORMER PUZZLE GUY | | | √ | | | | | | √ | | √ | | √ | | | √ | √ | √ | √ | |
| RANGED PLATFORMER | | | √ | √ | √ | | | | √ | √ | √ | | √ | | | √ | √ | √ | √ | |
| OVERHEAD CHARACTER | | | | | √ | | | | √ | | √ | | √ | | | √ | | √ | √ | |
| OVERHEAD SHIP IN SPACE | √ | | | √ | √ | √ | √ | | √ | √ | √ | | √ | | | √ | | √ | √ | |
| RANGED SHIP ALONG LINE | √ | | | √ | | | √ | | √ | | √ | | √ | | | √ | | √ | √ | √ |
| SCROLLING SPACESHIP | √ | | | √ | √ | | √ | | √ | | √ | | √ | | | √ | | √ | √ | |
| PLAYER TANK (TOP) | | | | √ | | √ | √ | | √ | √ | √ | √ | | | | √ | | √ | √ | |
| PLAYER TANK (SIDE) | | | | √ | √ | √ | | | √ | √ | √ | √ | | | | √ | | √ | √ | |
| POOL BALL HOLE | | | √ | | | | | | | | | | | | | √ | | | √ | |
| SKI BALL HOLE | | √ | √ | | | | | | | | | | | | | √ | | | √ | |

Figure 6 (cont.)

*Code Listing 2:*
```
<attribute name="editorGeneralControls" value="lives"/>
<attribute name="lives" value="3" editable="true"/>
```

```
Code Listing 3:
    <randomInterval shortInterval="0.3" longInterval="0.4" >
      <emitPFX lifetime="R(10,15)" quantity="1" scale="R(0.75,1.5) to 0"
           color_r="1.0 to 0.0" color_g="1.0 to 0.0" color_b="1.0"
           impulse="R(0.5,1.75)" angleOffset="R(50,130)" gravity="false"
           visual="assets/gameAssets/brick.swf" inheritRotation="true"
           alpha="1.0 to 0.0" vAngle="R(-30,30)" xOffset="R(-12,-8)"
yOffset="8"/>
    </randomInterval>
```

```
Code Listing 4:
<game>
  <kit>
    <player>
      <piece kitID="3" baseID="24" startLives="2" color="0xff5c0a" alpha="1" score="0">
        <shape>
          <physics friction="0.5" bounciness="0" density="0.575" gravity="false"/>
        </shape>
        <controller/>
      </piece>
    </player>
    <goal type="all">
      <piece kitID="1" baseID="31" color="0xff5c0a" alpha="1" score="150">
        <shape>
          <physics friction="0" bounciness="0.2"/>
        </shape>
        <controller/>
      </piece>
    </goal>
    <interactive>
      <piece kitID="5" baseID="31" color="0xff8d0a" alpha="1" score="150">
        <shape>
          <physics friction="0" bounciness="0.2"/>
        </shape>
        <controller/>
      </piece>
    </interactive>
    <environment>
      <piece kitID="0" baseID="16" color="0x4d1024" alpha="1" score="150">
        <shape>
          <physics friction="0.8" bounciness="0" angularFriction="0" density="1.2" gravity="false"/>
        </shape>
        <controller/>
      </piece>
      <piece kitID="6" baseID="25" color="0x4d1024" alpha="1" score="150">
        <shape>
          <physics friction="1" bounciness="0" anchored="false" density="2" gravity="true"/>
        </shape>
        <controller/>
      </piece>
      <piece kitID="7" baseID="40" color="0xffee00" alpha="1" score="150">
        <shape>
          <physics friction="0.5" bounciness="0"/>
        </shape>
        <controller/>
      </piece>
    </environment>
```

Figure 48A

*Code Listing 4(cont'd):*
```
    <backgrounds>
      <piece kitID="4" baseID="68" ext=".jpg"/>
    </backgrounds>
    <songs>
      <piece kitID="2" baseID="46" ext=".mp3"/>
    </songs>
  </kit>
  <levels>
    <level bgImageKitID="4" songKitID="2">
      <object x="256" y="192" kitID="3" id="3"/>
      <object kitID="7" x="144" y="256" id="9"/>
      <object kitID="6" x="131.70000000000002" y="195.9" id="10"/>
      <object kitID="0" x="385.4" y="191.9" id="11"/>
      <object kitID="5" x="272" y="256" id="12"/>
    </level>
    <level bgImageKitID="4" songKitID="-1">
      <object x="256" y="192" kitID="3" id="13"/>
      <object kitID="5" x="192" y="144" id="14"/>
      <object kitID="6" x="192.7" y="75.44999999999999" id="15" rotation="1.5837762340493284"/>
    </level>
  </levels>
</game>
```

Figure 48B

OPEN GAME ENGINE AND MARKETPLACE WITH ASSOCIATED GAME EDITING AND CREATION TOOLS

Any and all applications for which a foreign or domestic priority claim is identified in the Application Data Sheet as filed with the present application are incorporated by reference under 37 CFR 1.57 and made a part of this specification.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention provides a video game development platform. More specifically, aspects of the invention relate to components of applications such as video games including the source code, graphics, sounds, and animations as well as a market place where any of the above are traded for currency, tokens, credits, or given to other people. These components can then be combined, using game editing and creation tools, to make video games.

BACKGROUND OF THE INVENTION

With few exceptions, a video game is almost always created by a highly-coordinated and highly-trained team of individuals. You require software engineers to write the code that dictates the behavior of the game objects, game rules, and other features of the game engine. There are artists and animators who define how the game objects and game levels look. There are sound designers who create sound effects and musicians who create music for the game. There are user testers and quality assurance testers who ensure that a game is fun and has no bugs. These teams of people must be well coordinated otherwise various game objects would not work together, the game levels wouldn't form a cohesive whole, there would be no consistent theme or story line, or the game would simply be not fun. Furthermore, if one does not have a team or person who knows some of each of the disciplines required to make a game, then the game would simply not exist. This is the current state of video game development.

DESCRIPTION OF THE RELATED ART

There are other groups performing work related to this invention. We briefly discuss each one, and make no admissions that any constitute prior art. We believe that all unique concepts described have not been used by any of these groups.

Yoyo Games Limited provides a tool called GameMaker, which is a download-only based tool which is used for the creation of games. The web site www.yoyogames.com allows users of GameMaker to share their games with other users.

A few of the main differences are as follows:

(a) GameMaker is a download-only tool; it must be downloaded and run on a computer and cannot be used within a web browser.

(b) Yoyo Games does not provide an architecture which allows the mixing of game objects from different genres of games.

(c) The design of the game maker tool does not allow game objects from one game to be shared with other games. They allow the sharing of assets such as art and sounds, but not complete game objects.

(d) There is no marketplace for the exchange of objects.

(e) They do not provide a web based repository of game components and game objects, there are only resource packs of sound and art that can be downloaded for GameMaker.

(f) There are many aspects of the interaction with GameMaker that make it difficult to use. Many of the unique aspects of this invention allow unskilled users to create games. While the premise of GameMaker is that it is much easier than programming (it is), this invention makes many unique contributions to the ease of creating games such as visual editing of the rules, the ability to edit properties of game objects, combining game objects and rules into a game template. These are only a few of the unique aspects of our invention which differentiate us from Yoyo Games and GameMaker.

For more information about GameMaker and YoyoGames refer to the wikipedia article at (http://en.wikipedia.org/wiki/Game_Maker), go to (http://www.yoyogames.com), or see a user generated video tutorial at (http://www.youtube.com/watch?v=dYAK6S4HcH0).

GameBrix: GameBrix is an online game creation tool and community. Their user interface is very similar to GameMaker's interface. Once again there is no focus on the search, trading, exchange, or recombination of complete game objects. Consequently, some differences between this invention and GameBrix are the same as those between GameMaker and this invention. However, GameBrix has an online game creation tool, whereas GameMaker's tool must be downloaded to the local machine. A summary of how their tool works can be seen by watching the videos on www.youtube.com. (http://www.youtube.com/results?search_query=gamebrix&search=Search).

Sploder: Sploder is an online game editor which allows the creation of a single kind of game. It is a level editor for a top-down view of a shooter game where you control a space ship and collect gems while shooting at enemies. While Sploder is much easier to use than either GameMaker or GameBrix, it only allows you to create one kind of game with very specific art assets and sounds. For more information you can examine (http://www.sploder.com). While they apply the concepts of tagging and rating to the games, they do not focus on the creation and exchange of game objects as a means to create games. Although complete game objects can be dragged onto the level directly (as opposed to GameBrix or GameMaker which require constructing new game objects from components).

Stencyl: A set of several game creation tools, one per game genre. The editing tool is download only, though the games can be shared and played online.

Whirled and Metaplace: There are two new companies who are working in the virtual worlds space. While there are some rumors that they will have game creation tools in addition to virtual world creation tools, they are not currently public.

Gamestar Mechanic: A web-based tool focused on teaching people about game design. Currently in private beta and thus little information is available.

While there are many groups working in the field, at the time of this writing they have not (to our knowledge) used the methods and techniques described as unique aspects of this patent.

SUMMARY OF THE INVENTION

What if the Internet could be used to distribute the entire process of making a game? What if you only needed to know the basics of computer usage (concepts such as drag-and-drop, etc.) to participate in the game development process? This invention proposes a system and method by which this can be accomplished.

The present invention provides a manner in which the components of applications like video games can be structured so that anyone with access to the Internet can contribute any game component or game object to a central or distributed repository of game components and objects. These game components and objects can then be bought, sold and traded in a marketplace. The marketplace is structured so that the most useful game components and objects can be easily searched, rated, reviewed, and retrieved.

With easy access to a very large library of game components and objects, new kinds of games can be easily created by combining the game components and game objects. For example, imagine being able to easily search for game objects such as a platformer character (eg. Mario from Nintendo's popular video game franchise) and combine that character with spaceships, Namco's Pacman or any other kind of game object from the library, and be assured that they would work together. A set of general and easy to use tools to combine these game objects is a difficult problem to solve. This invention provides several such techniques and methods.

The invention as a whole allows for the creation of entirely new kinds of games to be easily created by individual creators rather than requiring game development companies or teams of independent developers to form tightly coordinated teams.

There are several problems for which this invention proposes a set of unique solutions:

(1) A system or framework which enhances the likelihood (or ensures) that the game components and or game objects from a wide variety of game genres being placed into a central or distributed repository will work together. This means that game components can be combined to make a functional game object, and that game objects can be combined to make functional and complete games.

(2) A central or distributed repository of game components and game objects that can be easily reviewed and searched by other users. The game components and or game objects can then be traded, sold, or gifted between any pair of users.

(3) A tool or method which allows a user to combine the game components into game objects.

(4) A tool or method which allows a user to modify the rules of a game.

(5) A tool or method which allows a user to modify properties of game objects.

(6) A tool or method which allows a user to create a combination of rules and game objects.

(7) A tool or method which allows a user to combine the game objects into complete games.

(8) A method by which any player of a game can easily edit or remix the game.

(9) A system or framework which combines a subset or all of the above features.

(10) A system or method that allows any of the above to done with two or more people collaborating.

These are only a subset of the problems which aspects of this patent address, there are methods that apply to many game development related problems.

The combined set of solutions allows for a new method for creating applications like video games in a distributed manner. The current state of the art forces groups of game developers to work as a tightly coordinated group (or a single highly skilled individual) to create a game of any complexity.

Aspects of this invention can be applied to any software or tools platform meant for developing video games. In this description, we will focus on a particular approach for each problem that applies to a web site existing on the Internet where games are created using the flash platform developed by Adobe. However, it could be equally well applied to any platform including:

(a) Gaming Consoles such as those produced by Microsoft, Nintendo, and Sony.

(b) Portable game playing devices such as the Sony PSP, the Nintendo GameBoy, Nintendo Dual Screen (DS), etc.

(c) Cell phones (d) Downloadable PC games (e) Portable or wearable communication devices (f) Public kiosks and devices available in cars, buses, trains, planes or other areas (g) PDAs such as the palm pilot or other PDA (h) Music players such as the iPod, iPhone or other MP3 players (i) Televisions (j) Video players (k) Any device capable of displaying a video game Each platform could use a very similar architecture to the one proposed here, and have its own marketplace for game components and game objects. Thus, this invention proposes a method to greatly improve any kind of video game creation, no matter what platform the game is developed for.

The invention allows for multiple innovations in the development and creation of video games. A first allows complex games to be created with little or no coordination between individual contributors. One person could create, for example, a Pong paddle, and another person could create a platformer character. Aspects of the invention ensure that any two objects created to a given specification will work together. A particular example of how to enable this highly-distributed creation of a game is described in this patent. Furthermore, a central marketplace where individual game objects and game components can be exchanged is also described. This marketplace allows anyone to construct a set of game objects which allows others to create interesting game genres. Imagine taking a spaceship from an Asteroids game and putting in the same game as, say, Pacman. Or taking the shotgun from Doom and adding it to Super Mario? We propose a system, architecture and Marketplace, with associated methods, which enable this kind of recombination of game components and game objects.

A second aspect of the invention describes a set of unique tools and methods by which creators can easily remix any game objects matching the above specifications to easily create new games and game genres. This can be done using a set of unique and easy to use interfaces for editing the properties of game objects, as well as an interface to combine game objects into complete games. Our system provides a unique interface design such that game objects from many different kinds of games can be easily edited and combined together by even a novice user. These novice users might not have any knowledge of computer programming.

Aspects of the invention change the way games are made from centralized teams to a distributed process, and provide a set of easy to use tools with unique features that allow even unskilled users to easily create new games. The cost of production of video games can therefore be decreased, and a much greater variety of games can be developed by allowing each person participating in the production to profit from their work.

For purposes of describing the present invention, the following terms are defined as set out below:

"Video display game" is defined as a game which can be displayed on a video display of any kind. Video display games include computer games, console games, cell phone games, or any other kind of game which is presented to the user on a video display. A video display game is commonly referred to as a video game. The usage of any specific terminology herein also includes and may alternatively refer to and of the aforementioned types of games presented on a video display.

"Game component" is defined as a component of an application such as a video display game can be one of the following:

(1) Some amount of computer source code, in either compiled or un-compiled form. Source code may be used to define the behavior, or any other aspect of a game object. Behavior may also be composed of predefined behaviors or actions.

(2) An image, texture, skin, visual effects or other art which can be seen on the display which represents the game world or a game object within the world.

(3) A sound or set of sounds which are heard by a user of the application.

(4) An animation or set of animations defined either as a set of frames or programmatically using source code.

(5) A description of the physical dimensions of a game object.

(6) Any physical, visual, auditory or behavioral property of a game object.

Game components may also be referred to as game assets.

"Game object/Game piece" is defined as any entity in an application such as a video game which can be interacted with by a human player. A game object is composed of one or more game components such as the ones listed in the definition of a game component. Some examples of game objects are the walls or pieces in Tetris, the character Mario in games created by Nintendo, the paddle or ball in Pong.

"Game genre" is defined as sets of games that can be grouped together if elements of their game-play are similar. Some examples of common game genres are first-person shooters (FPS), real-time strategy (RTS) games, massively multiplayer online games (MMOGs), platformers, breakout style etc.

"Tags" are a string of characters forming a word that a user can create to label a game component, game object or a complete game. When any of these items have one or more tags, it is possible to create a system to find all game components, game objects, or complete games that have been tagged with a string. For example, one could tag a game object with the strings "gun," "western," "shotgun." A user could search for all game objects that have the tag "gun" associated with it.

"Game canvas" is similar to a painter's canvas, in that it is the space upon which a user of the invention will create their game. They can do so by adding game objects to it, setting the background picture or other actions defined in the description.

"Personal library/bag" is similar to the concept of a shopping cart on e-commerce sites. This is a place where game creators can store a set of game components and game objects which can then later be used to create games. We may also refer to the personal library as a palette (like an artists palette of paints) or a shopping cart (or bag or something else . . . ).

"Game Kit/Game Template" is defined as a combination of a set of game objects and rules which work well together. For example, Pacman could be described as a game kit which includes the following game objects: pacman, 4 ghosts, regular collectible pellet, and a power pellet. The kit would also include the rules and or objectives of the game. In the case of pacman, the objective is for the player controlled character (Pacman) to collect all pellets. A game kit may is also referred to as a game template.

"Library/Piece Library/Repository" is defined as the repository of all available game objects in the system. It can be sorted, filtered, searched and is organized according to categories.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 5 is an XML based file that is used to construct an example game component that can be used to construct a particular cannon game object.

FIG. 6 is a spreadsheet showing a number of different game objects from common game genres that can be built using the correct combination of shapes, controllers, and abilities.

FIGS. 48A and 48B are an XML file that displays the code listing behind the game example shown in FIG. 47.

DETAILED DESCRIPTION OF THE INVENTION

In the following description of the various embodiments, reference is made to the accompanying figures, which form a part hereof, and in which is shown by way of illustration various embodiments in which the invention may be practiced. It is to be understood that other embodiments may be utilized and structural and functional modifications may be made without departing from the scope of the present invention.

An aspect of the invention allows for a website where anyone can come to participate in the creation of a game. There are three main audiences for the website. Users who have little experience or qualifications to make game assets, game components, or game objects, and a different set of users who have game development expertise such as knowledge of programming, art, sound, game design etc. The third set are users who play the games. While they do not directly contribute to the game creation, they do indirectly participate by affecting aspects of the content created by the other two groups (for example the ratings of games).

Users who are not skilled programmers, artists, or designers are still able to participate through the use of unique graphical tools that allow anyone to create games in a manner somewhat similar to using a drawing program. Game objects can be dragged and dropped onto the game canvas. They can be rotated, resized etc. Furthermore properties of these game objects (such as the number of lives of the player, or the mass of an object) can easily be changed using sliders and other visual controls.

Skilled game developers are able to participate by creating game assets, game components, or game objects either directly on the website using a set of online tools, or using a tool of their choice and uploading the result to the website. These game assets, components, and objects can then be used by other (potentially unskilled) users to create games.

Figure 1:
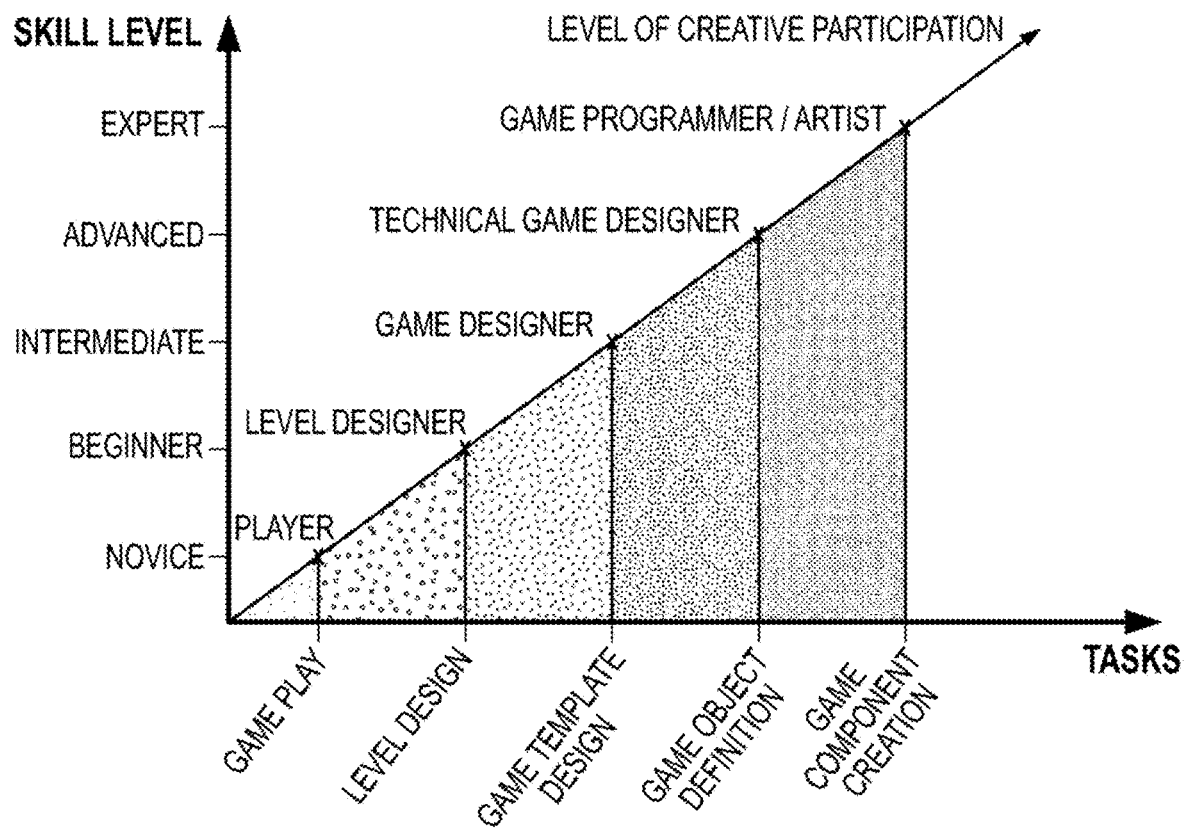
FIG. 1 is a chart showing that the level of creative participation increases with skill level, but even the most novice users can participate.

Aspects of our invention allow people of these varying skill levels to participate in the creation of a game while only using a very specific skill set. This is shown in FIG. 1.

Note that a player need not be concerned with level creation, and a level designer need not be concerned with the specification of a game kit. In the other direction, a programmer or artist need not be concerned with level design, and leave that task to game designers.

Furthermore, many metaphors from what is commonly referred to as Web 2.0 web sites can be applied to these games, game assets, game components, or game objects. Game assets, components, objects and complete games can be tagged, searched, rated, voted upon, commented upon, etc. This allows the highest quality content to be easily found by users of the website.

All of this content can be easily shared with others either by sending a URL to someone or by using the tools provided by existing social networks (e.g., Facebook). The complete games can be embedded into other websites (such as blogs, social networks profiles, personal websites) and played directly. In addition, users can embed widgets that aggregate their activity (be it game playing, or content creation) into other websites.

An objective of this invention is to foster creation through shared play and self-expression. More specifically, we enable anyone to easily create, share and play games. Aspects of the invention provide a web-based tool that allows for the collaborative creation of single and multi-player casual games without programming. Aspects of the invention will change the way games are made by dramatically lowering the cost and expertise required for game creation.

Figure 2:
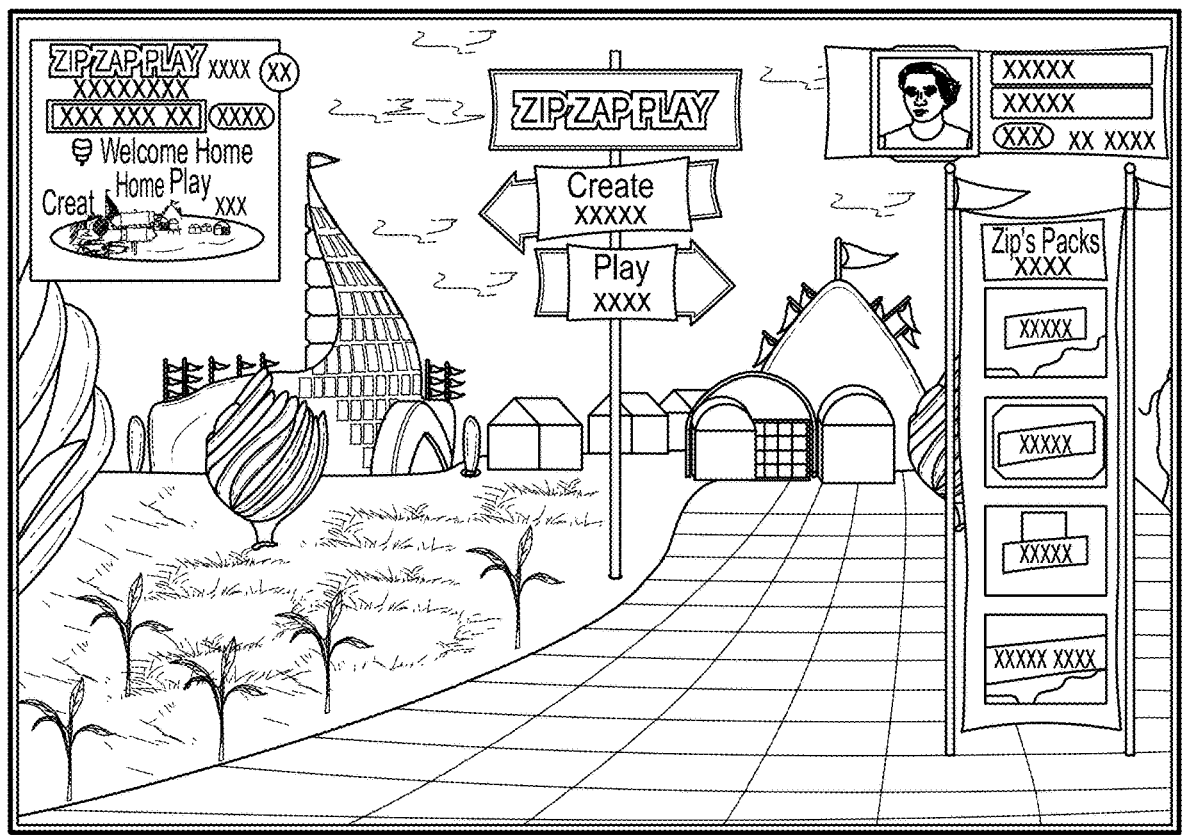
FIG. 2 is an example homepage for the website in one embodiment of the invention. Users can play a game right from the page, by clicking to play more games or to start creating their own.
Figure 3:
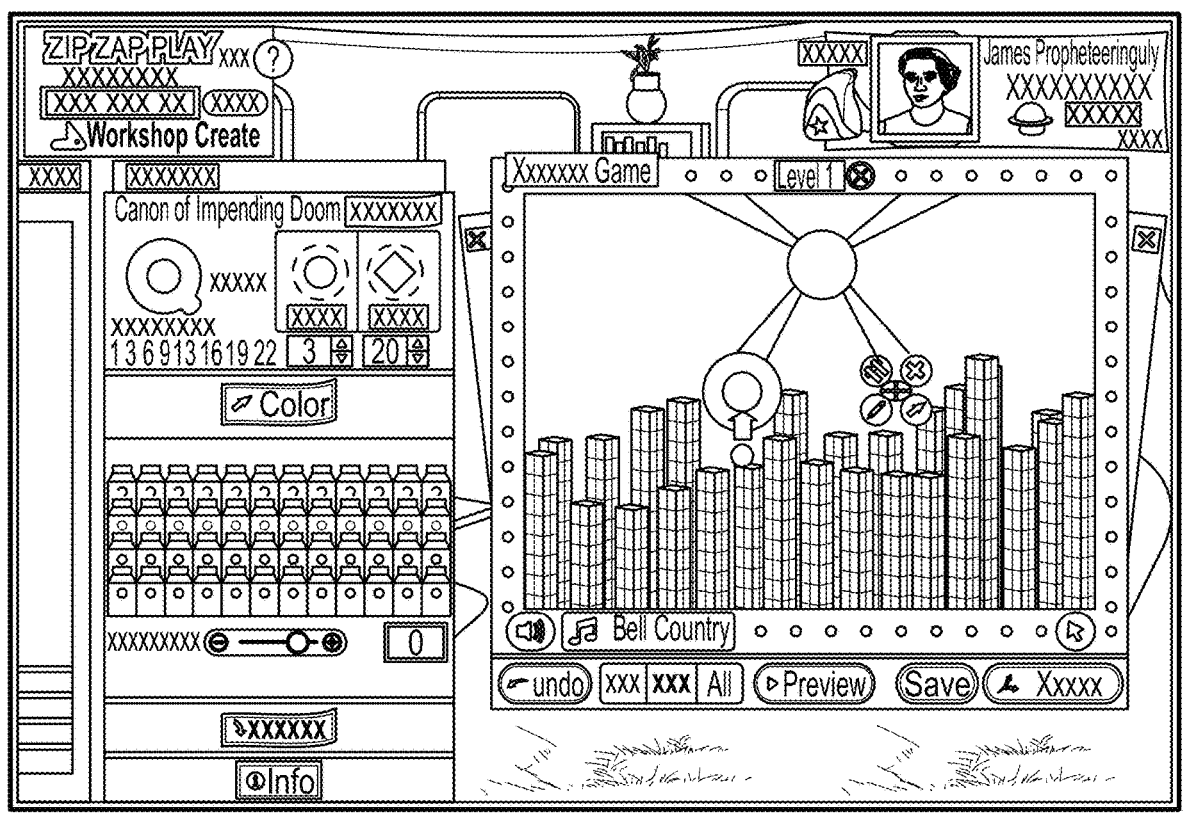
FIG. 3 is an example of the game editing tool that allows users with little game development expertise to create games.

FIG. 2 and FIG. 3 give the reader an introduction to how one embodiment of the invention may look at first glance. Specific aspects of the invention are described below.

Solution to Problem 1: We require a system or framework which enhances the likelihood (or ensures) that the game components and or game objects from a wide variety of game genres will work together.

Approach to Problem 1:

In recent articles regarding video game engines, several approaches have been proposed to solve this problem. Our approach is loosely based on component based game engine architecture. (Chris Stoy. Game Object Component System. In Game Programming Gems 6, pages: 393-403. Charles River Media, 2006). We will briefly give the reader an overview of the important concepts and then describe aspects of our invention in more detail.

The central idea to component based architecture is that any game object is made up of game components. Our architecture has several types of game components that can be used to make a game object. We describe them as follows:

(a) Shape Component: This contains information about the shape of the object and is composed of two sub-components:
  i. Physics Component: This describes the position, size, velocity, density, elasticity, and friction, and any other physical properties of a game object. Several physics components may be linked by joints or motors.
  ii. Visual Component: This game component describes how the game object appears on screen. It may contain a texture, image, color, gradient, polygon definition, definition of particle effects, animations or any other visual aspects of a game object.

(b) Actions Component: Each game object can have several actions/abilities or capabilities. For example a "thrust" or "apply force to self" ability might cause a game object to be pushed into the air, or shot forward somehow. An object with the explode ability could explode and apply forces and damage to things around it. We will describe these in more detail below.

(c) Controllers Component: A controller maps inputs (aka: stimuli) from either a human (moving the mouse, hitting a key on the keyboard), or from an algorithm (artificial intelligence, or simple state machines) to the activation of abilities. For example a mouse click could be used to make a platformer character jump into the air using a thrust ability.

The components can interact with each other using a set of messages and or function calls. For example, the controller component may send a message to an action component indicating that a certain ability should be used. For example a mouse button press may cause a player object to jump.

Furthermore, game objects also interact with each other by sending messages. These can be of the form "destroy object," "score object," or other messages. Each game object defines how it handles each message. In this way, an object who receives the "destroy object" message, may choose to ignore the message if it is—invulnerable (temporarily or permanently). The concept of game objects sending each other messages allows each object to decide which messages it sends and how it handles any messages it receives.

The implications of the messaging between game components and game objects are that components and objects can be decoupled from each other. All a developer needs to know about a game component or game object is which messages are sent and received by it.

The game component and game object messaging system is an aspect of the architecture that enhances the likelihood that any game components or game objects written by a 3rd party will work with those of the original developer.

To ensure compatibility, an aspect of this invention proposes a particular set of messages to be sent between game objects to ensure that game objects (even from different game genres) will be able to work well together in almost all cases. The choice of this set of message types is an advance from the current state of the art as it is defined such that game objects across different game genres will be able to function together.

A potential implementation constrains object-to-object message to "destroy" or "score" in order to minimize the complexity of the central machinery. This limitation enables the use of objects from many different kinds of games to work together.

Destroy message: When received by an object, it causes that object to be destroyed or killed. This might happen when a bullet hits an enemy, or the player falls into a trap.

Score message: This is used to increase or decrease the player's score. When a platformer character collects a coin, or kills an enemy, this can be used to change the player's score.

Add life message: This is used to increase the player's number of lives. When the player object collects a medkit object, it regains a life.

Other messages: Other messages could be used as well. For example, a damage message could be sent that would cause an object to decrease its health (and similarly, a heal message might cause an object to increase its health). Moreover, objects that help the player (eg. power-ups) could send any number of messages such as, "make invincible," "increase speed," etc. and objects that hinder the player (aka: power-downs) could send messages such as "decrease speed," "prevent jump."

Using only a limited number of inter-game object messages we propose that many different kinds of game genres can be constructed.

Each game object is given a type that helps define how it responds to certain message. Possible types of objects include: player, enemy, treasure and world. An object of type "world," for example, ignores "destroy messages" since it is indestructible. An object's type is also used to determine what types of actions or abilities it can have. For example, an object of type "player," has the ability to target the mouse, while objects of other types might not.

Figure 4:
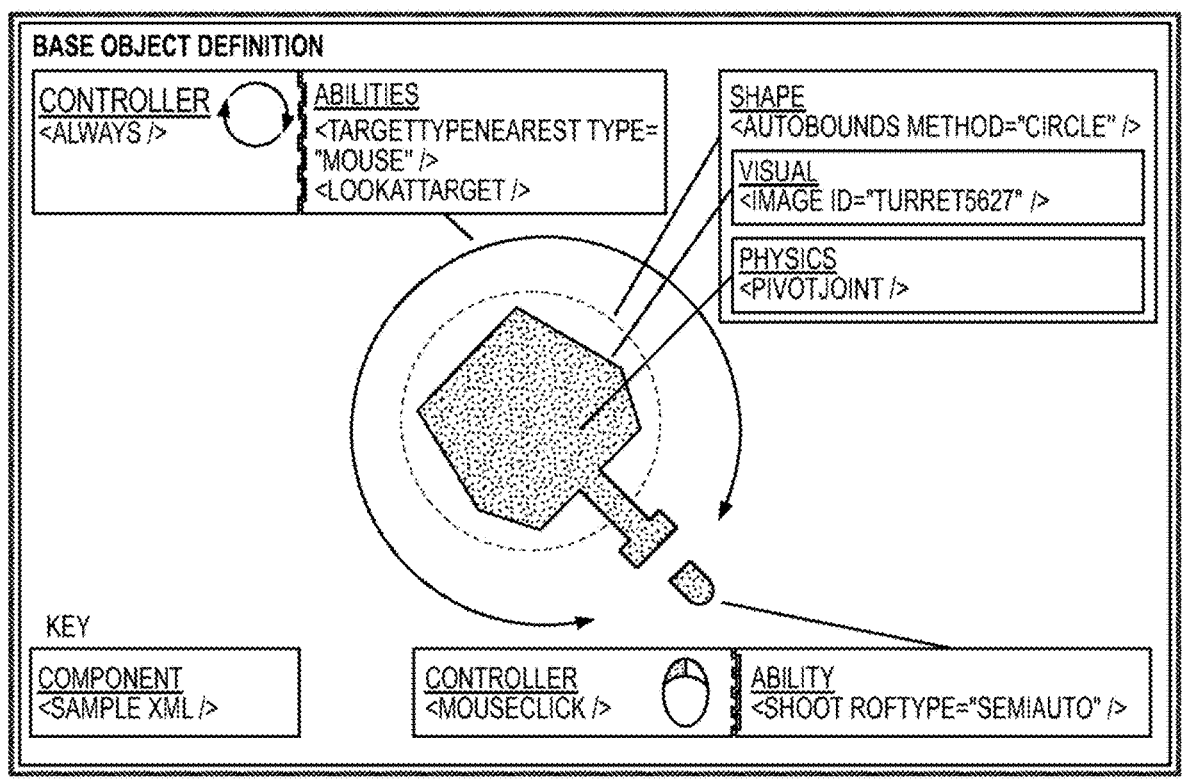
FIG. 4 is a schematic of a game object composed of game components.

FIG. 4 shows how a cannon game object is composed of several components. The cannon is discussed in more detail in the example below.

An example of a game object built with game components:

To illustrate an example of how a particular game object can be built from game components, we construct a cannon game object from game components using an XML based file format shown in FIG. 5. The XML code provides an example of several of the features described above.

First, the definition of the game object is built with several different game components. The shape component and its sub-components are described. The polygon outline of the shape is information that may be shared by the physics component and the visual component. Physical properties of the game object are described in the physics tag which represents the physics game component.

Below that is the visual game object component. In this particular case, we use a visual component that is defined by an Adobe flash file format, but in general any combination of texture, image, vector based graphics object could be described here.

Below the definition of the shape of the object the abilities and controller section are defined. The cannon has only three abilities: the ability to use the mouse as a target, the ability to point at the mouse's current location and, lastly, the ability to shoot a-projectile. These abilities are used by the controller. In this case the controller causes the cannon to always point at the mouse by using the first two abilities, and also causes the cannon to use the shoot ability when the mouse is clicked.

Having both the game components and game objects use a common messaging system rather than directly calling functions in code ensures that all game components and game objects written by any person (on the internet or from another company) will work with those developed by the original company who develops a game engine in the manner proposed by this invention. This messaging system is an aspect of the invention that enhances the likelihood that the game components and game objects will work together.

Game objects from many different game genres can be constructed using abilities, shapes, controllers and game assets. A description of each proposed set is listed below, followed by a description of how they can be combined to create many different kinds of game objects form many genres of games.

Game Component Abilities: Game objects can have one or more abilities. These allow a game object such as a platformer character to jump in the air, to shoot at other enemy characters, to run left and right, etc. Listed below is a set of different abilities:

(a) Destroy: Transmits destroy message upon collision. This will cause an object being hit by this object to be destroyed.

(b) ScoreSelf: Transmits score message to self upon collision. This will cause the object to change a player's score before disappearing.

(c) ScoreOther: Transmits score message upon collision. This will cause an object which collides with this object to add their score to the player's score.

(d) Addlife: Increment the player's life counter by 1.

(e) Thrust: Exert impulse in direction of facing. Thrust can be used to cause a platformer character to jump in the air or to cause a golf ball to shoot forward.

(f) Shoot: shoot ability is used by cannons or paddles that can shoot other objects (such as bullets).

(g) Regulate Speed: Set min/max speeds on this game object.

(h) LookAtTarget: Causes this game object to be oriented towards an object's current target.

(i) MoveToTarget: Causes this game object to move towards, or directly to, the current target coordinates.

(j) Explode: Destroys the object and swells its collision radius briefly to transmit destroy messages to other objects nearby.

(k) TargetTypeNearest: May be set to Mouse for a player input object.

Game Component Controllers: A controller allows a game object to use abilities at certain times. For example a developer could use a mouse-click controller to cause the shoot ability to activate. There are two main types of controllers, those that are triggered by human input, and those that are triggered by some automated game event. When a controller is triggered, it causes an ability to be used. We describe a few of the events that can be used to trigger a controller below:

(a) Input Controllers:
  i. Mouse Click: The mouse button is clicked.
    1. Optional parameters: Event (upon click, while held, upon release)
  ii. KeyPress: A key is pressed.
    1. Required parameters: Key
    2. Optional parameters: Event (upon press, while held, upon release)

(b) Automated Controllers:
  i. Always: Every cycle/frame of the game.
  ii. CollisionAtMyEdge: Upon a collision event registering with one or more sides of a given object's bounding box.
  iii. CollisionWithType: Upon a collision event against an object of a given type (eg. Player, Enemy, Treasure, World . . . ).
  iv. SightOnType: Upon line of sight being achieved between an object and a given type.
    1. Required parameters: Range, which Types obscure vision
    2. Required parameters: Interval duration
  v. RegularInterval: Every 300 ms, etc.

Game Component Shape Properties: The shape component of a Game Object describes two things: how the object looks (its visual appearance), and the object's physical properties such as its mass, coefficient of friction, movement limitations, etc.

Some of the parameters used to describe the shape of an object are described below:

(a) Vertices: x/y coordinates to define an object's geometric shape.

(b) Texture: What texture an object should use, most useful if a visual sub-component is not specified (see below).

Physics Properties: defines the mass, friction, elasticity and other physical properties of an object for use by the physics engine. It may be comprised of several rigid bodies connected with joints, and motors. Motors may be controlled using controllers.

Reorient Rule: Control over how an object orients with regard to its facing and/or motion. If a character must remain upright, independent of its angle of motion, that would be specified via a reorient rule. That a game arrow reorients based upon its direction of movement would be specified via a reorient rule.

Shape Subcomponent:

(a) Visual: Points to an Adobe Flash file (.swf), which in turn provides a game object's art and animations. It may also point to other visual assets such as images, or other visual formats.

(b) MoveJoint: Constraints applied to an object's motions, such as sliding only upon a given line, or rotating around a particular point.

FIG. 6 shows a number of different game objects from common game genres can be built using the correct combination of shapes, controllers, and abilities. As illustrated by the spreadsheet, an aspect of the invention provides the ability to construct game objects from a wide variety of different games using the above scheme of abilities shapes and controllers. Furthermore, the simple messaging system allows them to work together when placed in the same game.

A unique aspect of the above XML format (see FIG. 5) is how properties of game objects, their shape, action or controllers etc. can be marked as editable. In the above example the impulse force of the cannon (how fast/hard it shoots an object) is marked as editable in the file format. The format also has the ability to set maximum and minimum ranges for an editable property. This further allows for a GUI editor tool to automatically provide a slider or other graphical interface for the editing of the property. This aspect of the invention allows for the automatic creation of a GUI interface for modifying game object properties. The ability to set maximum and minimum values allows the creator of a game object to specify reasonable ranges for properties. This further increases users' ability to safely and meaningfully manipulate properties of an object they did not create.

There are a number of different ways that a property can be marked as editable and its ranges specified. However, simply marking a property of a game object as being editable specifying its ranges is a unique aspect of this invention. Furthermore, applying this concept of specifying editable properties and ranges to aspects of a game object such as physics properties (coefficient of restitution, density, mass, moments of inertia), colors, point values, game rule properties, and others is unique.

Another unique aspect of the invention is that game components (also known as game assets) can be shared by multiple game objects. In Code Listing 1 of FIG. 5 two methods are shown which can accomplish this sharing. The graphics used by the object can reference an external server on the Internet or a local file (e.g. assets/gameAssets/canon.swf). Alternatively, a database or other system may be used to track unique identifiers of various assets (e.g. assetID="53"). Knowing the unique ID of an asset allows one to load the asset either from a local file or a remote server.

Some examples of assets that can be shared by objects using this approach may include:
(a) Sound effects
(b) Background music
(c) Art assets
(d) Physical definitions of objects
(e) Abilities or Controllers
(f) Any code specifying the behavior of an object
(g) Particle effect behavior or visual definition
(h) Text or speech bubbles associated with an object
(i) Other game components that are shared between multiple objects One benefit of the re-use of game assets by multiple objects is the reduction of how much data must be loaded to play a given game. For example if two game objects share the same sound effect, then it only needs to be loaded once.

The simple messaging system provides a way to ensure game objects can communicate with each other in a general fashion across game genres in a logical manner. The combination of shapes, controllers, and abilities allows us to quickly build a wide variety of game objects. Another aspect of this invention proposes that one way to have game objects from different genres of games physically interact with each other in a general way is using a physics engine.

A physics engine allows one to specify the physical properties of a game object. Some of these properties include its position, size, mass and elasticity. Once these properties are specified, the physics engine is able to determine how these game objects will interact in a game. As you have seen in the specification of the shape component of the game object, we can specify such properties such as mass and friction which are then used by the physics engine.

This allows us to have game objects from very different game genres work well together in the physical sense. If one specifies the mass, elasticity and shape of an object, and then applies thrusts (or forces) to them using the physics engine and controllers, the physics engine can then predict how objects interact physically, no matter what game genre a particular game object may belong to.

Another proposed aspect of the invention may aid developers in creating new game objects that work well with previously created game objects. If the user can easily see what messages are sent and received by a given game object then it is easier to determine how best to interact with that game object. Some ways that a developer might examine the messages are:
(a) Looking at a data file which lists the messages sent and received by the game object.
(b) Examining the object in a graphical user interface shows the messages sent and received by the object.

In summary, our approach extends the Game Component architecture in a unique manner. We have created a particular grammar of inter-object messages such that game objects from many different styles of games can be made to work together. We have a system to create game objects from components that is flexible enough to create game objects from and for multiple genres. This allows for the following unique features of a game engine:
(a) The re-combination or remixing of game objects that typically would not be seen together. One example might be a Space Invaders ship in a Breakout style game. This enables mixing game objects from almost any game genre together.
(b) The restriction of messages to a predefined set allows for game objects from the many genres defined above to work together. This selection of messages is unique.
(c) The ability to easily examine which messages any game component or object sends or receives. This allows 3rd parties to easily create new game components or game objects that work with an existing library of components or objects.
(d) The combination of the messaging system with a general physics engine is a unique method to ensure that game objects from different game types can work together meaningfully in a physical sense.
(e) Making a game object out of abilities, controllers and shapes is unique.
(f) Having an XML (or similar) file format directly specify properties of a game object that are editable is unique.
(g) Further having the file format specify the acceptable range of editable properties is unique
(h) Marking the following properties of a game object as being editable and or specifying the acceptable range of those properties is unique:
  i. Mass
  ii. Coefficient of restitution
  iii. Density
  iv. Moments of inertia v. Size properties vi. Color of any aspect of the object vii. Amount of points of gaining viii. Number of lives or health ix. Any other property used in game (i) The sharing of game components or assets between objects is unique.

To our knowledge this is the first effort to create a game engine architecture which will allow game objects created by any person on the Internet to work well with a large library of game objects created by other users on the Internet with little to no coordination. This allows for the fully distributed creation of games. The above approach applies equally well to almost any game genre, multi-player or single player etc.

Solution to Problem 2: We require a central or distributed repository of game components and game objects that can be easily reviewed and searched by other users. The game components and/or game objects can then be traded, sold, or gifted between any pair of users.

Approach to Problem 2:

The Internet has shown that any given website can serve as a good method to provide a repository of news articles, audio, video, art assets. When the content uploaded to these repositories is uploaded by anyone with Internet access, there are several systems which can be put in place to make the repository useful. We discuss some of them below as well as how they are applied to our repository of game components, game objects and complete games.

There are several Websites that allow for upload of user submitted content. Some popular examples are youtube.com and digg.com. These sites incorporate mechanisms whereby the most useful and popular content can be determined via several mechanisms. Some of these mechanisms include:

(a) Website users voting for content they like and against content they don't like.

(b) Website users rating content they like.

(c) Website users tagging content with a word or set of words. These tags can then be used by any user to search through the content.

(d) Indirect creation of content ratings or rankings by looking at how much content is used. An example of this is ranking a video higher if it has been viewed more times.

(e) Website users' history of viewing content (or usage of the content, such as number of plays of a movie and number of rentals). The history of their content ratings, votes, and tags can also be used to infer what other content that user might wish to view or use. This system is commonly referred to as a recommendation engine. Two websites which use a recommendation system are netflix.com and amazon.com. Their presence is typically indicated to the user with labels such as "Recommendations for you," or "Customers who bought this item also bought."

(f) Website users have the ability to mark content as being inappropriate. Inappropriate content can then be removed by the software controlling the repository, or by a human moderator.

(g) Content is often grouped into categories by users or by the Website's editorial staff.

An aspect of this invention proposes that all of the above methods can be equally well applied to content required to make video games. Game components, game objects, and games can all be voted upon, rated, tagged, recommended and marked as inappropriate etc.

In order to allow a user of the repository to find high-quality game components or game objects of the type they seek, any or all of these mechanisms may be put into place. Listed below are some designs for applying these concepts to games and game objects.

Figure 7:
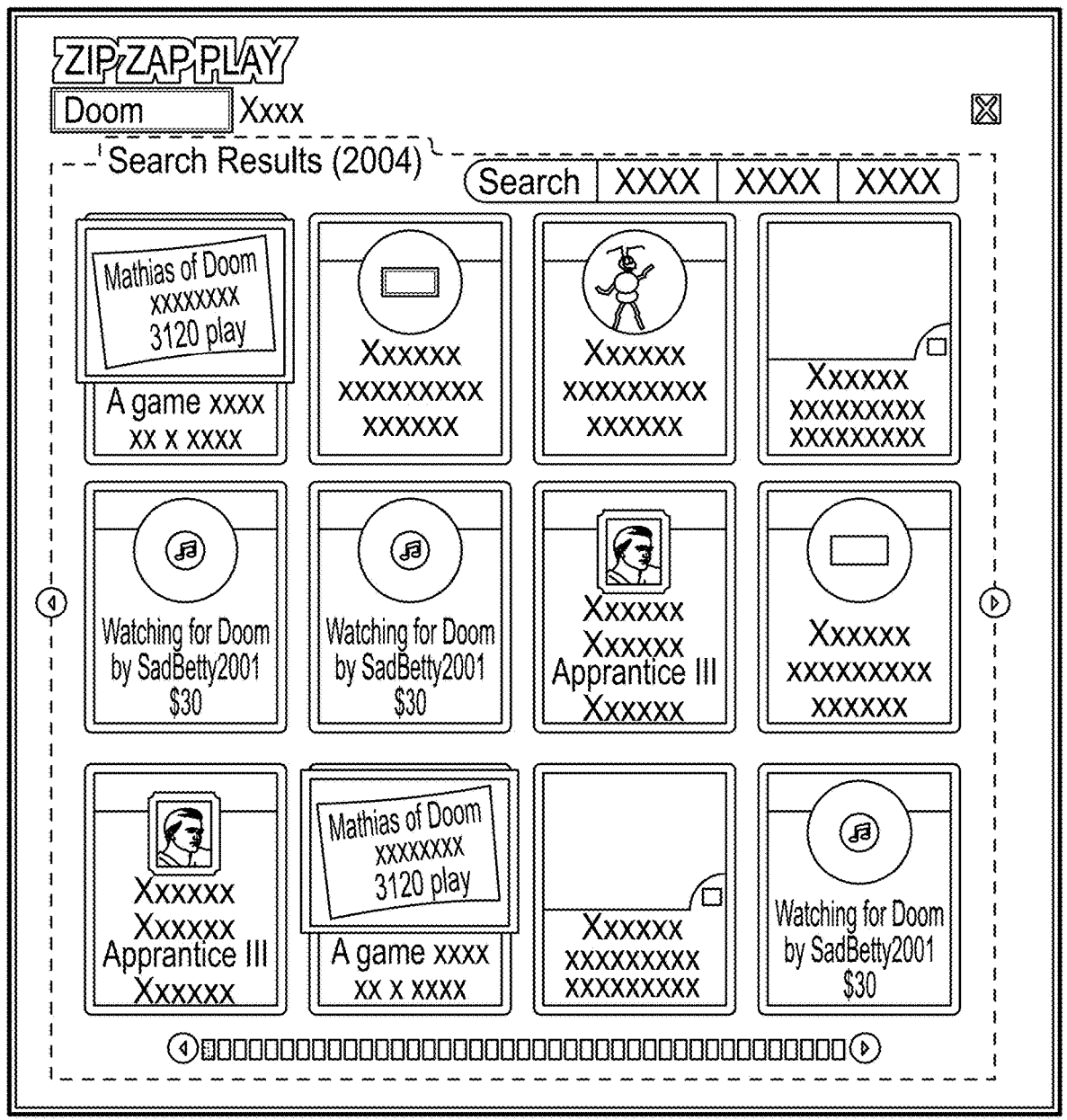
FIG. 7 shows the result of a search for new game objects that a creator might wish to put into their game.

FIG. 7 shows the result of a search for new game objects that a creator might wish to put into their game. Shown in the figure are results of a search that include any relevant content, be it game objects, people and games. Users can use search filters (top right) to filter results down to one or more of these categories.

Figure 8:
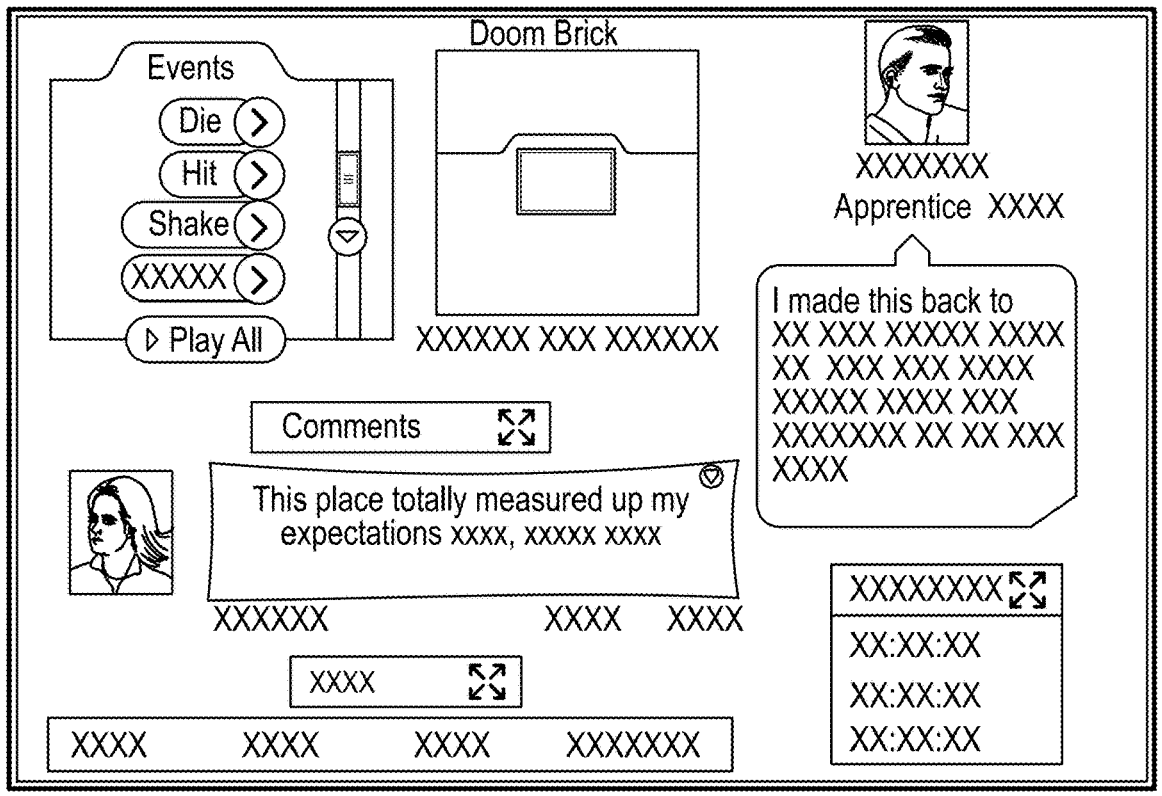
FIG. 8 shows a user interface by which a user can tag or add a comment to a game object.

FIG. 8 shows a user interface by which a user can tag or add a comment to a game object. Clicking on the comments or tags in the view shown in FIG. 8 will expand the view to show all comments, tags and history. In this expanded view (which is very similar to that shown in FIG. 9), users can add new comments, tags to the game piece.

Figure 9:
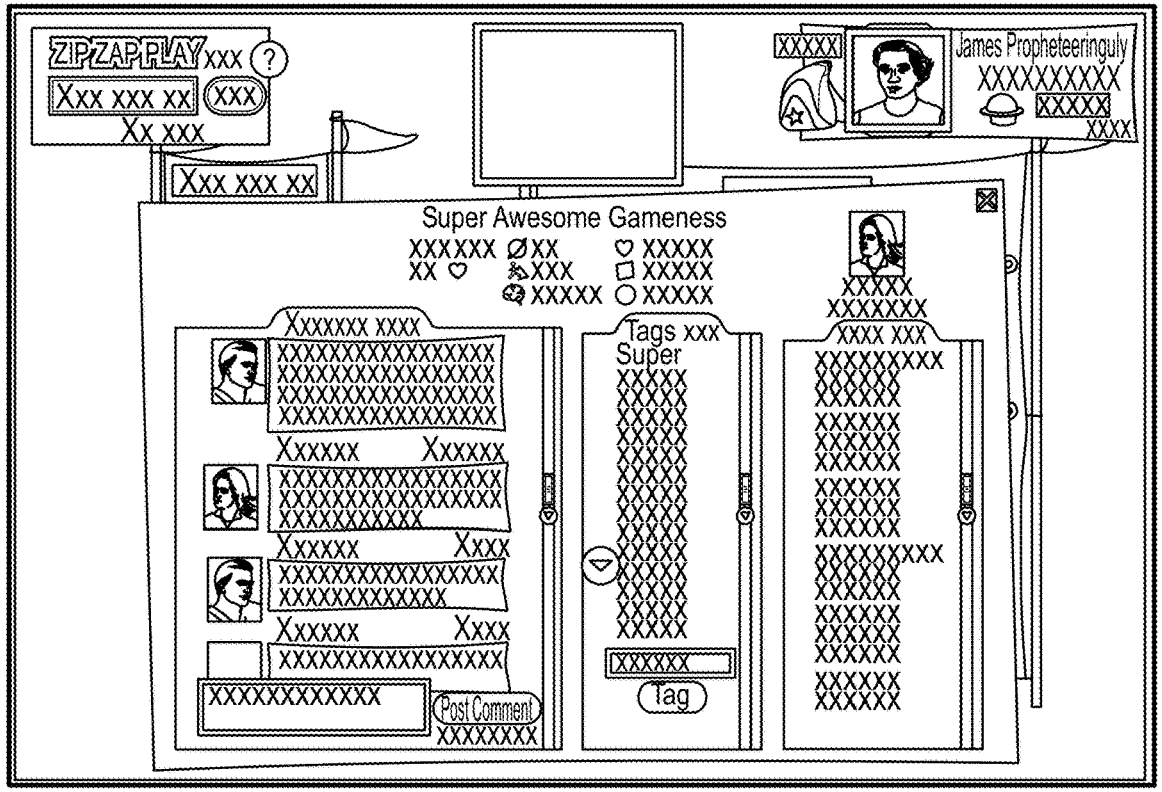
FIG. 9 shows a pervasive search box that includes tagging and commenting on a game.

In the top left of FIG. 9, the pervasive search box is displayed whereby a user can search the objects in the repository using tags that others have attached to game components, game objects or games. This is just one potential application of some of the mechanisms above.

Figure 10:
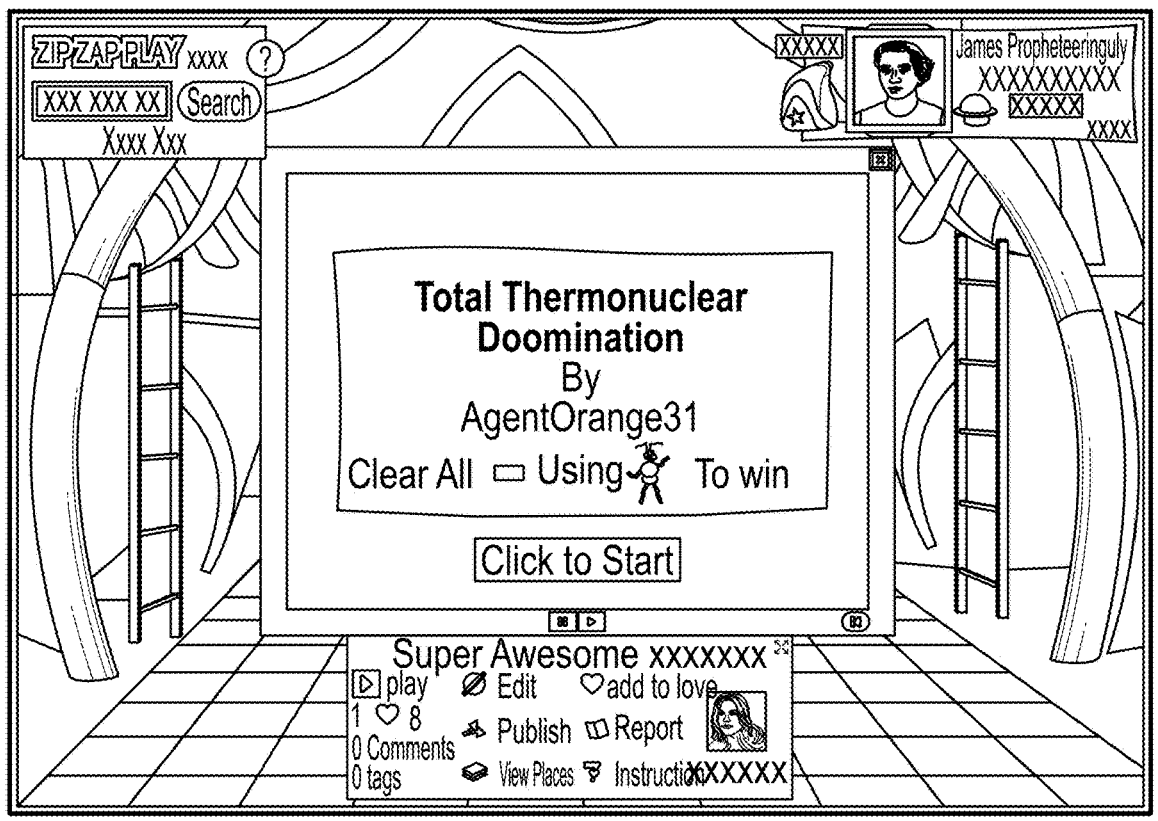
FIG. 10 displays game playing screens showing the various options at the bottom, including "View Pieces" and "Edit."
Figure 11:
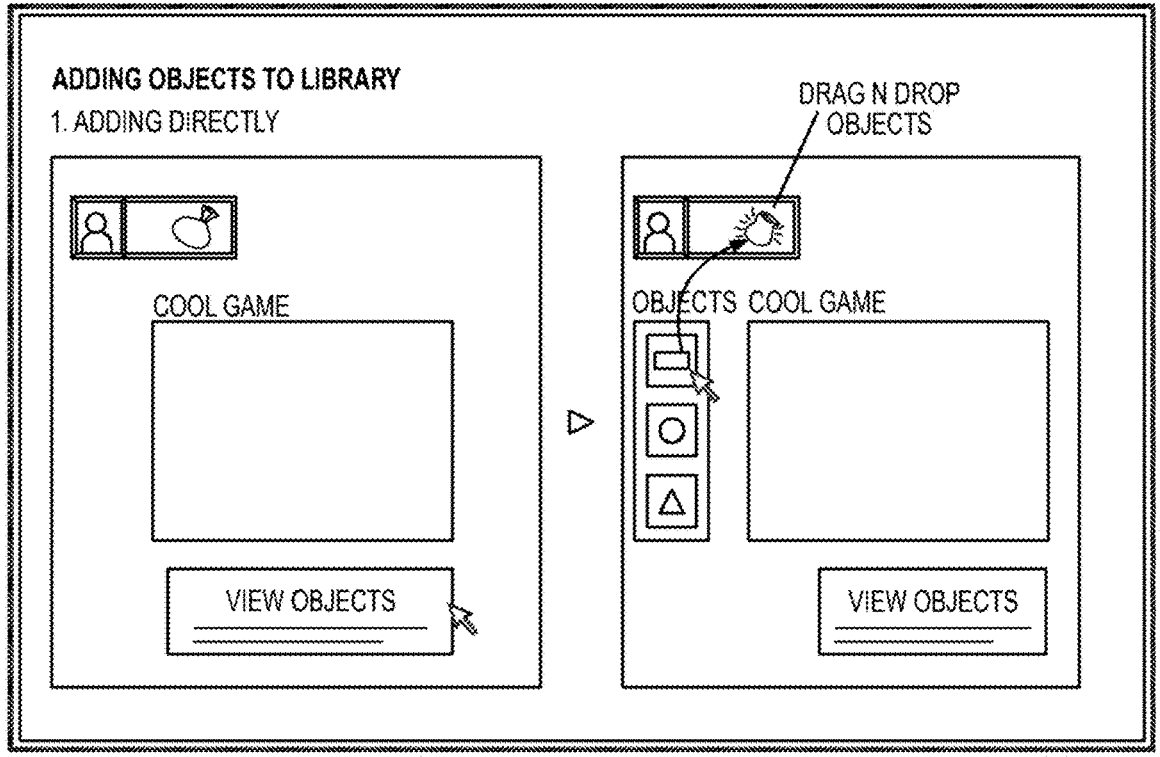
FIG. 11 displays how a user who is playing a game clicks on "View Pieces" to see what game objects are used to make the game. They then take game objects that interest them and add them to their personal library.

Another way for a user to find new game objects is to take game objects used by an existing game and to add them to their personal library (represented in this invention by the My Bag in FIG. 9). The concept of taking game objects from existing games and using them to make new games is unique. FIGS. 10 and 11 show different methods that allow users to take game objects from existing games as they are playing them. Users add the game pieces to their personal library to later add them to their own games.

Figure 12:
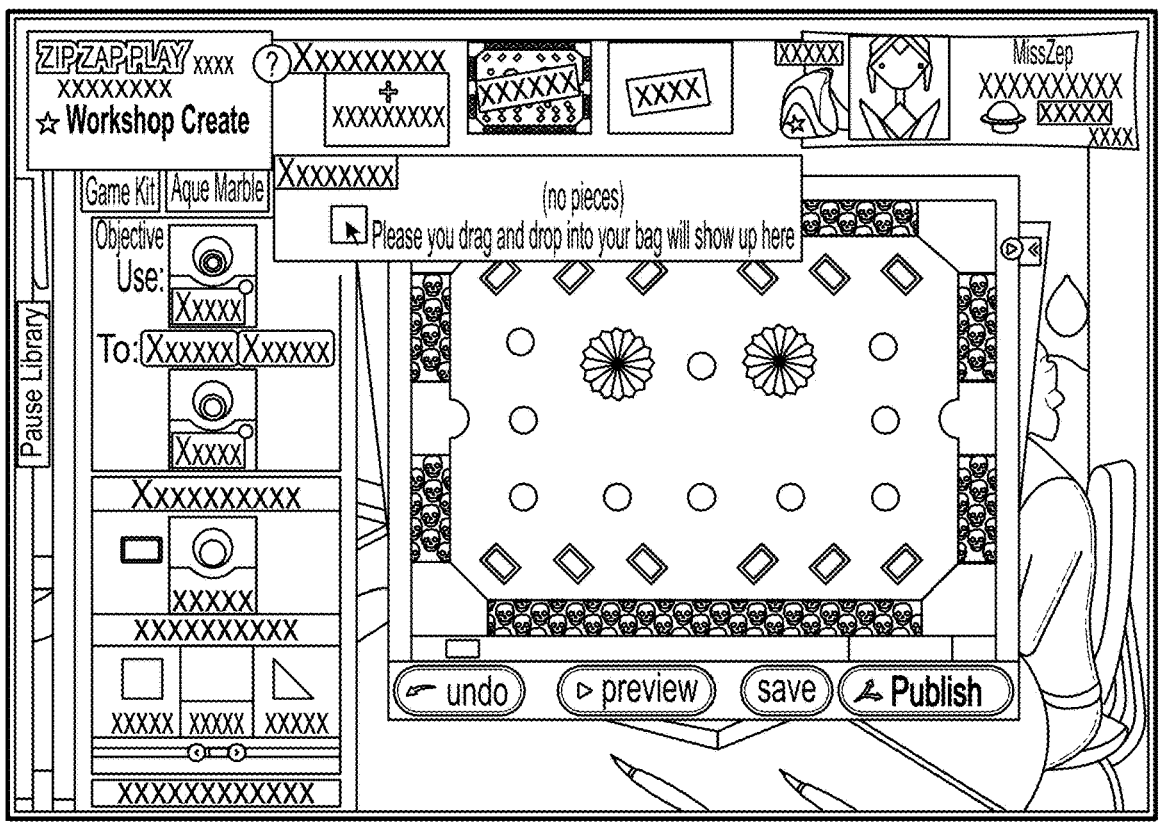
FIG. 12 depicts dragging a game piece into the personal library while editing a game.
Figure 13:
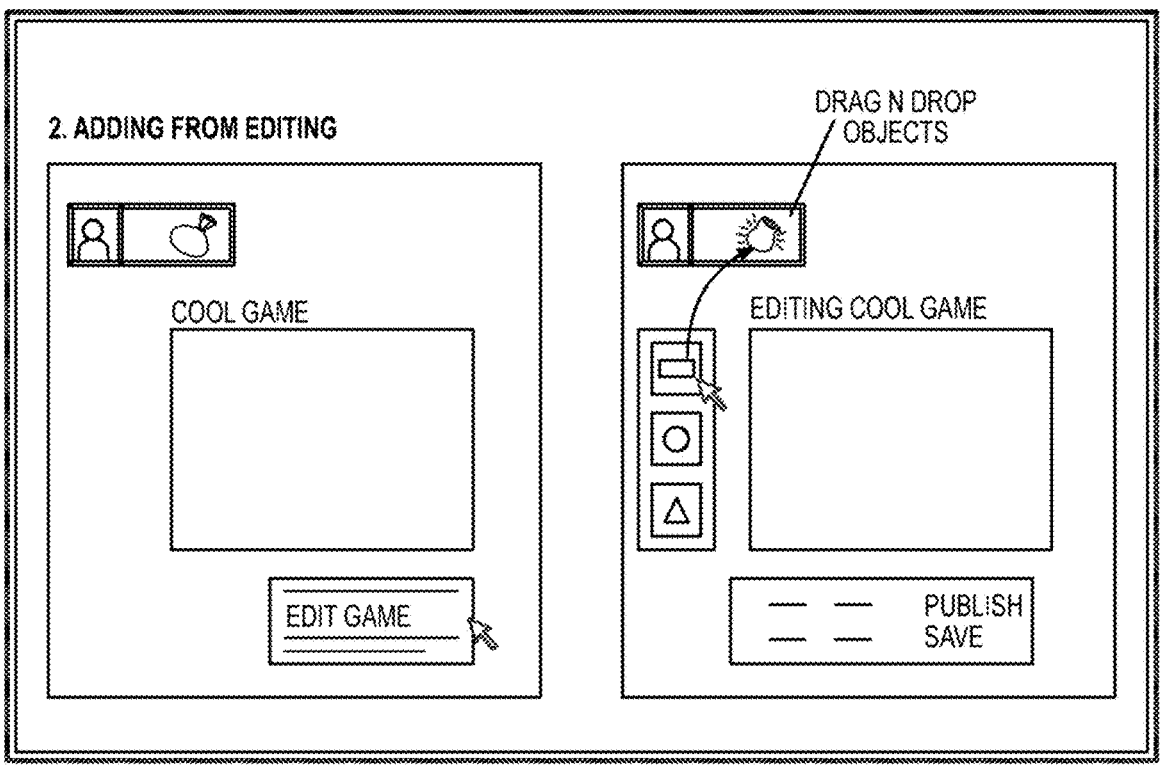
FIG. 13 displays how a user who is editing a game can examine the objects used to make up the game and add these objects to their personal library using a drag and drop interaction.

FIGS. 12 and 13 show how a game piece can be dragged while editing the game and dropped into the users' personal library. One other way that a user may take pieces is by dragging them directly from the game canvas (either when playing or editing the game into their bag).

Another aspect of this invention allows for users to be able to easily distinguish objects that are used in any given game from objects that are part of the repository at large. Indeed the introduction of the Piece Library and the Game Kit allows for a clear separation. The Piece Library contains all game objects that are available. Meanwhile, the Game Kit contains only those objects that are used in the game it represents. Objects can be dragged from the Piece Library to the Game Kit (or to the Game Canvas) to add them to a game. (Similarly, they can dragged from the Game Kit back to the Piece Library to remove them from the game.) When a game object is added to the game, it is removed (or hidden) from the Piece Library so that there can be no confusion between the repository as a whole and the game specific repository.

If, while browsing the Piece Library for an object to add to their game, a user finds a game piece that does not fit with the current game but might be useful to them at a later time, they can drag it to their personal library. The Game Kit and the user's Bag allow users to organize the content of the repository of all game objects to their needs, based on a specific game (as is the case for the Game Kit) or based on possible future games (as is the case for the Bag).

By default, the content of the repository of all objects, the Piece Library, can be filtered to show only objects that have been created by trustworthy parties. These parties can be the original creator of the repository, sanctioned 3rd parties, and people the user designates as trustworthy (by adding them as 'friends'—in the social networking sense of the word—or by otherwise marking them as someone whose content they are interested in.) In a way, this is similar to Google's SafeSearch for its images search, where only images that have achieved a certain threshold are displayed in the search results. This default can be overridden should the user wish, but ensures a pleasant first-time experience, with high-quality content displayed in the repository (and the rest of a content a click away).

In addition to being able to find useful content in the repository, an aspect of this invention also proposes that the content can be exchanged between users. There are several ways content can be exchanged between users:

(a) A user can allow another to use a game component, game object or game for free.

(b) A user can ask for compensation from another user for an unlimited or limited license to use the game component, game object or game. Compensation might take the form of:
  i. A virtual currency managed by the repository
  ii. A real currency such as US Dollars, Euros or other internationally recognized currency
  iii. An in-kind exchange where the license to use one game component, game object, or other game is traded for a license to use another game component, game object, or other game.

The exchange or purchase of game assets, or games for playing is not new. It is common in games such as World of Warcraft where swords, armor and other items used by characters in-game are traded between people. That being said, it has only been used to exchange game assets that are used to play a game.

However, the exchange or purchase of complete game objects or a subset of game components such as the physical or behavioral definition of a game object is unique. A further unique aspect is that these components are being traded by end users in order to create games, as opposed to the trading or exchange of virtual objects used while playing games.

Users may specify the price for which their content will be made available by other users. Alternatively, they can leave it up to repository owner to determine the price of the content based on a mathematical function. For example, all content can start out at a fixed price and, based on demand (and/or other factors) the price can be changed automatically by the repository owner. One method might be to have the price increase as a particular game asset or game object is used more by creators. Users then do not have to worry themselves with determining a fair and profitable price for their content. This is another unique aspect of the invention as applied to game components and game objects.

Furthermore, users can specify which groups or which individuals have access to their content. Indeed, users can create game objects to use in their own games, which others will be able to play, but not have to let others use their game objects for their own purposes.

Figure 14:
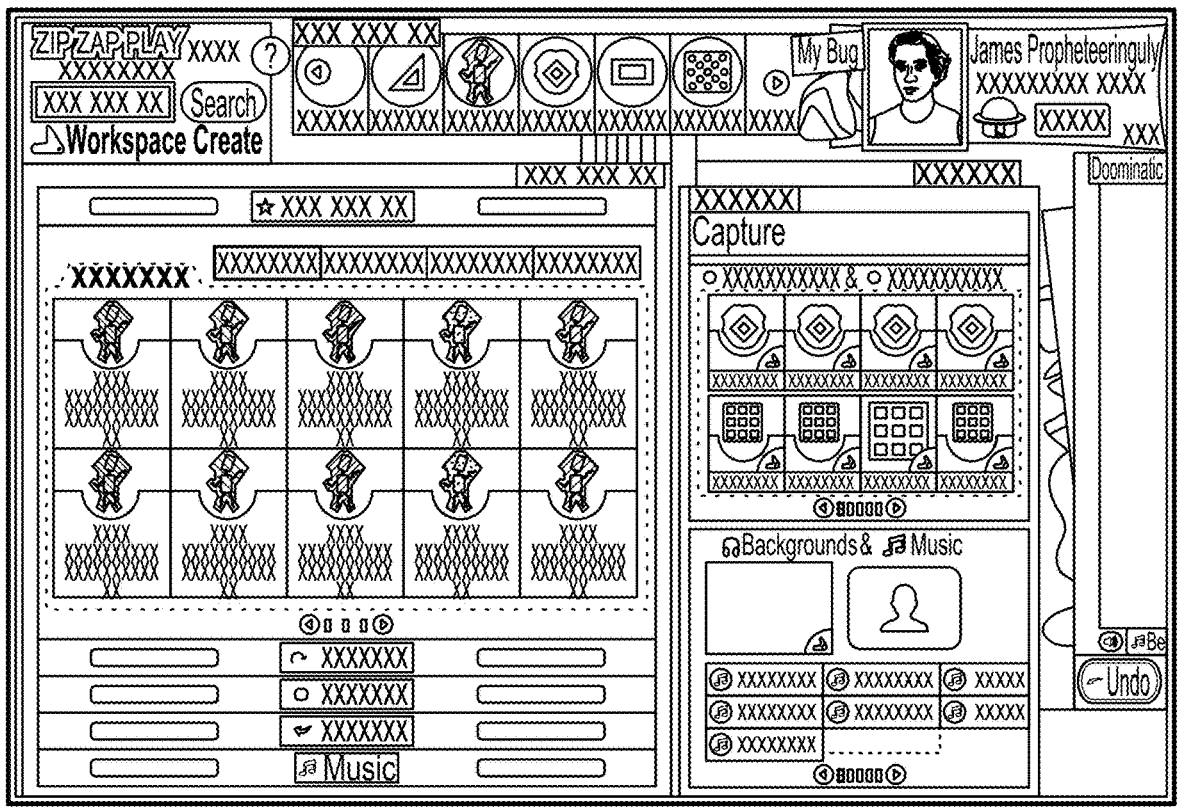
FIG. 14 displays the Library as the repository of all available game pieces. The Game Pieces hold pieces that are found in a specific game and My Pieces is the user's personal library of game objects.

FIG. 14 also illustrates an interface whereby a user may purchase complete game objects. A game creator can search or browse for game objects that work well with a particular game concept such as a fantasy themed platformer, or a science fiction based breakout game. These game objects can be added to their personal library and subsequently used to create video games.

Another unique interaction proposed here is the ability for a user to test any game object before they pay for it. A method for allowing users to do this is to let them place game objects directly into their games while in development. The repository owner may decide to limit the ability of users to show or share a game with other people until they have paid for the game objects or game assets.

An aspect of the personal library is similar to the concept of a shopping cart on an E-Commerce website. A user places game objects or components of interest in the library for later use. In the case of this invention, these game objects and components can be used to create games, but these games may not be shared or shown to other people. The user can then create and save games in their personal storage space using these objects. When the user wishes to share the game with others, they must pay for the objects which cost some amount of currency or virtual currency.

Figure 15:
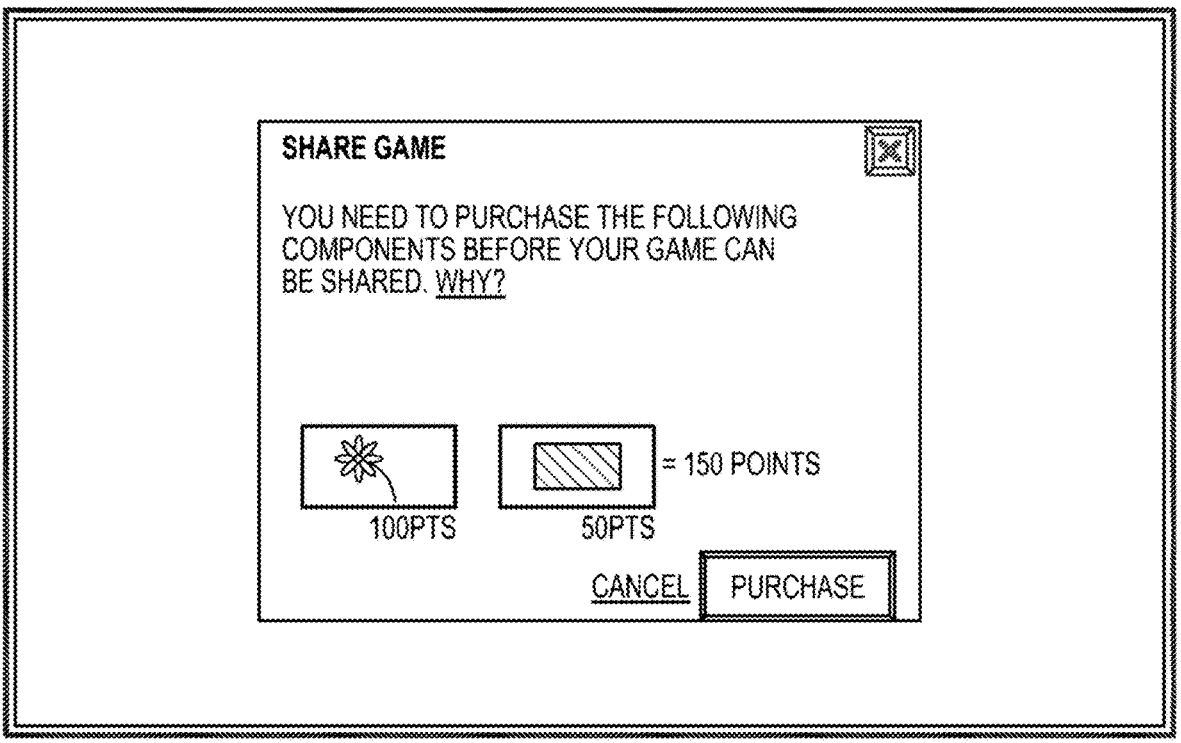
FIG. 15 displays how users are notified of which game objects they still need to purchase when sharing/publishing their game.

This concept of allowing full personal use of game objects before paying for them is unique. When the user has completed the game they are working on, they can pay for the required game objects at that point. FIG. 15 shows how the user might be informed of how much they might need to pay in order to share a game with their friends.

Figure 16:
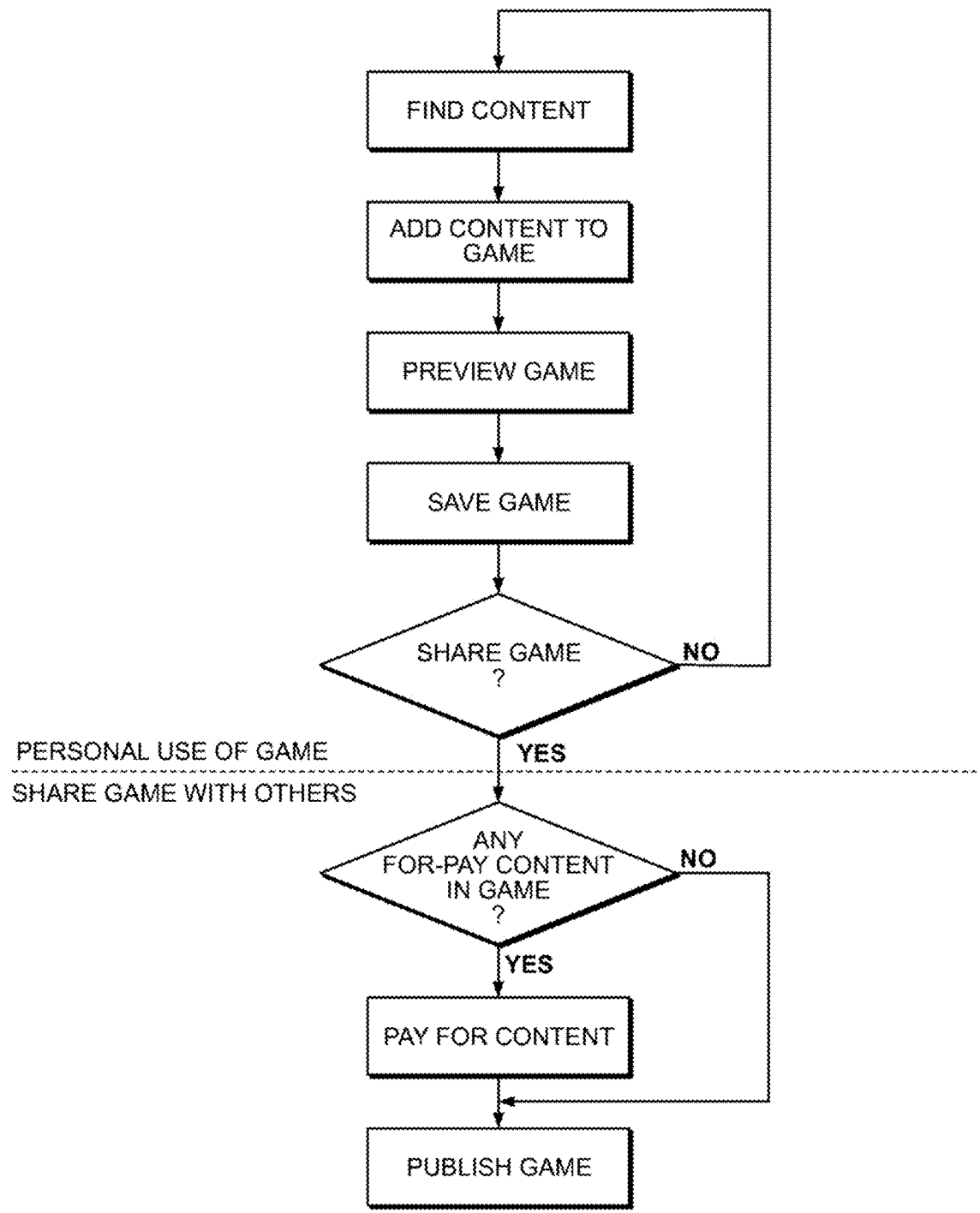
FIG. 16 is a flowchart indicating how users only pay for content when they want to share it with others.

FIG. 16 shows the actions that a user can perform for free as part of their personal use of for-pay content and what actions require purchasing of for-pay content.

Another unique concept included within the invention is the ability for the repository owner to charge 3rd parties to exchange game objects and game components. This would typically allow the owner of the repository to charge a fee to those participating in the transaction. A known example of this is the website ebay.com where eBay is a 3rd party which facilitates the sale of various goods between 2 parties. Many of the methods used on ebay.com can be applied to a marketplace for game components or game objects including:

(a) Fees for listing an item for sale.

(b) Fees charged to either or both parties as a percentage of the value of the transaction (in either virtual or real currency).

(c) A fixed fee per transaction.

(d) Varying the amount of the fee depending upon the kind of license to the content being exchanged.

The application of these concepts to game assets, game components, and game objects is unique. To our knowledge no one has developed an open marketplace which has any of the features above.

The application of methods for finding useful content, the exchange of such content between users, and the ability of a 3rd party to charge for such an exchange is unique when applied to game assets, game components, and game objects.

The website which allows users to upload, search, rate, tag, and purchase the above items from other users is also a unique invention. These ideas are unique in part because there has previously been no reason for game developers (companies or individuals) to exchange any of the above items. Indeed, there is no mechanism which guarantees that game assets, game components, and game objects will work together when produced by different parties.

This brings us to another aspect of the invention. Examine the definitions of problem 1 and 2 below.

Problem 1: A system or framework which enhances the likelihood (or ensures) that the game components and or game objects from a wide variety of game genres will work together and Problem 2: A central or distributed repository of game components and game objects that can be easily reviewed and searched by other users. The game components and or game objects can then be traded, sold, or gifted between any pair of users.

The combination of a solution to both of these problems is also unique. Furthermore, this combination has the capacity to revolutionize the way video games are created, no matter what the platform or genre of game. An embodiment of the invention applies to the distributed creation of Adobe Flash based games. In particular, the invention may be used to create casual games, although the method applies equally well to traditional "hard core" games on any console, PC, cell phone, or other device on which video games can be played.

Some of the unique aspects described in this section are:

(a) Applying user-generated voting, rating, ranking, tagging, commenting, marking as inappropriate, direct or indirect to game components and game objects.

(b) Recommending game components and game objects to users based on their use of other components and game objects.

(c) The ability for users to take game objects from an existing game (both while playing the game and while editing the game) and adding them to their personal library.

(d) The separation of pieces into a large library containing all pieces and a smaller library of pieces used only for a specific game. This aspect of the invention allows a user to deal with potentially thousands of objects in the piece library.

(e) The concept of a personal library of game objects or game pieces that can be collected from a particular game.

(f) The purchase of complete game objects (including behavior, physical, visual, sounds etc.) for use in game creation or game play.

(g) The ability for users to upload game objects and sell or exchange them with other users. This allows talented creators to make a profit and potentially earn a living by creating game objects or game components.

(h) The use of a mathematical function or other method to automatically change the price of content such as game components and game objects.

(i) A method to allow people to try all content for free, but ask them to pay for it only when they share that content with other people.

(j) An open marketplace where game assets, game components and game objects are traded between users with a fee being applied to transactions.

Solution to Problem 3: We require a tool or method which allows a user to combine the game components into game objects.

Approach to Problem 3: In Code Listing 1 of FIG. 5 we have already shown that a game object can be constructed from components using an XML-based file format. Any file format could be used to store how a game object is composed of components. What we further propose in this section is a unique tool for combining game components into game objects.

Figure 17:
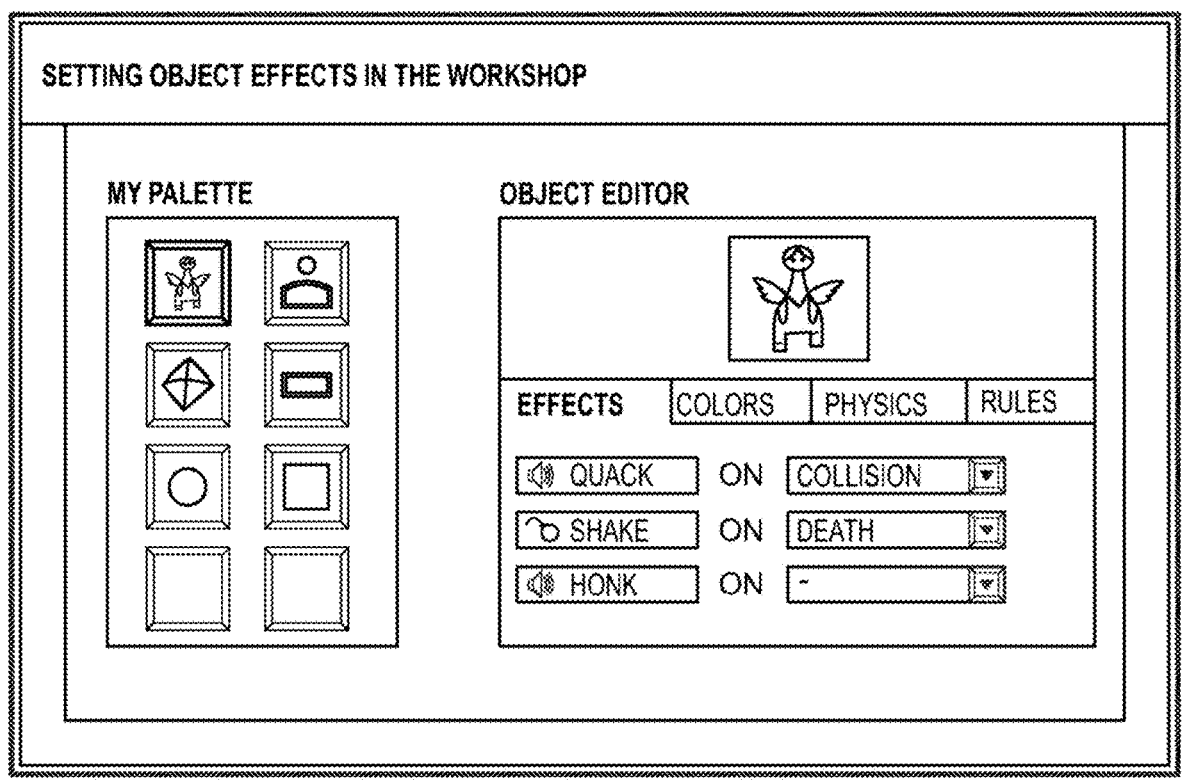
FIG. 17 displays how users can select which sounds are played by a game object and when.

FIG. 17 shows how an aspect of the tool embodied by this invention may be constructed. In this case, a user can select what sound or audio is heard from a particular game object. One can specify if a sound is played on collision, or played when a particular message is sent to the object. This allows the user to choose which sound components are used in the game object. Note that he/she can also easily test the sound before selecting it.

This same technique can be used to select or preview the visual game component or physics game component of a game object. One could imagine selecting a Pacman visual component or a spaceship game component using a similar menu. One could select a particular physics game component for an object which might specify a set of physical properties.

The physics or art components might be specified directly while editing the object. For example drawing a shape might represent the physical representation of the object. A user could then color in the object to define its visual component (in this case they might be creating a texture directly on the object).

A unique aspect of this part of the invention is that it provides an easy to use interface to construct an object from game components. Game components can be previewed while editing the object. A web-based tool which allows you to easily select and preview game components while constructing a game object is a unique aspect of the invention.

Figure 43:
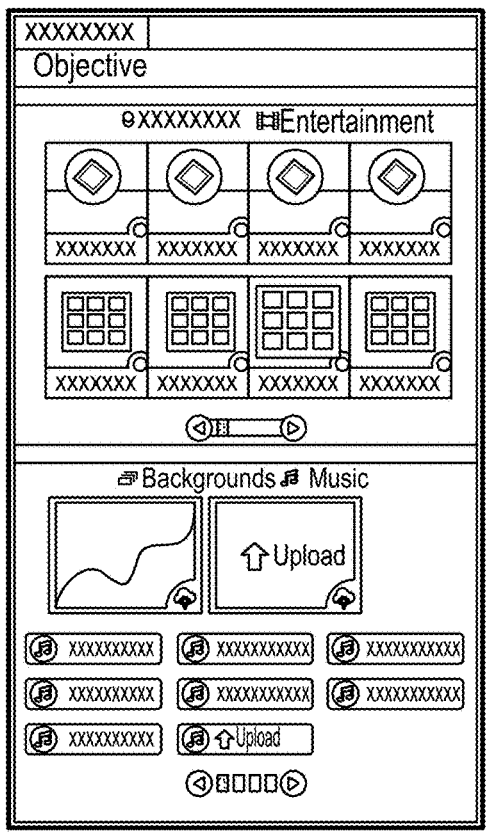
FIG. 43 illustrates how a user can upload their own music pieces and background from the game kit.

Another unique aspect is shown FIG. 43; the user has the ability to upload a picture from the user's hard-drive to be used as the game's background picture. Users can also upload or customize images to be used as the visual component of a game object. Similarly, they can upload or customize the sound effects that an object makes. The idea of allowing a user to upload a component of an object while editing a game is also a unique concept. This is discussed more in Problem 5.

Figure 18:
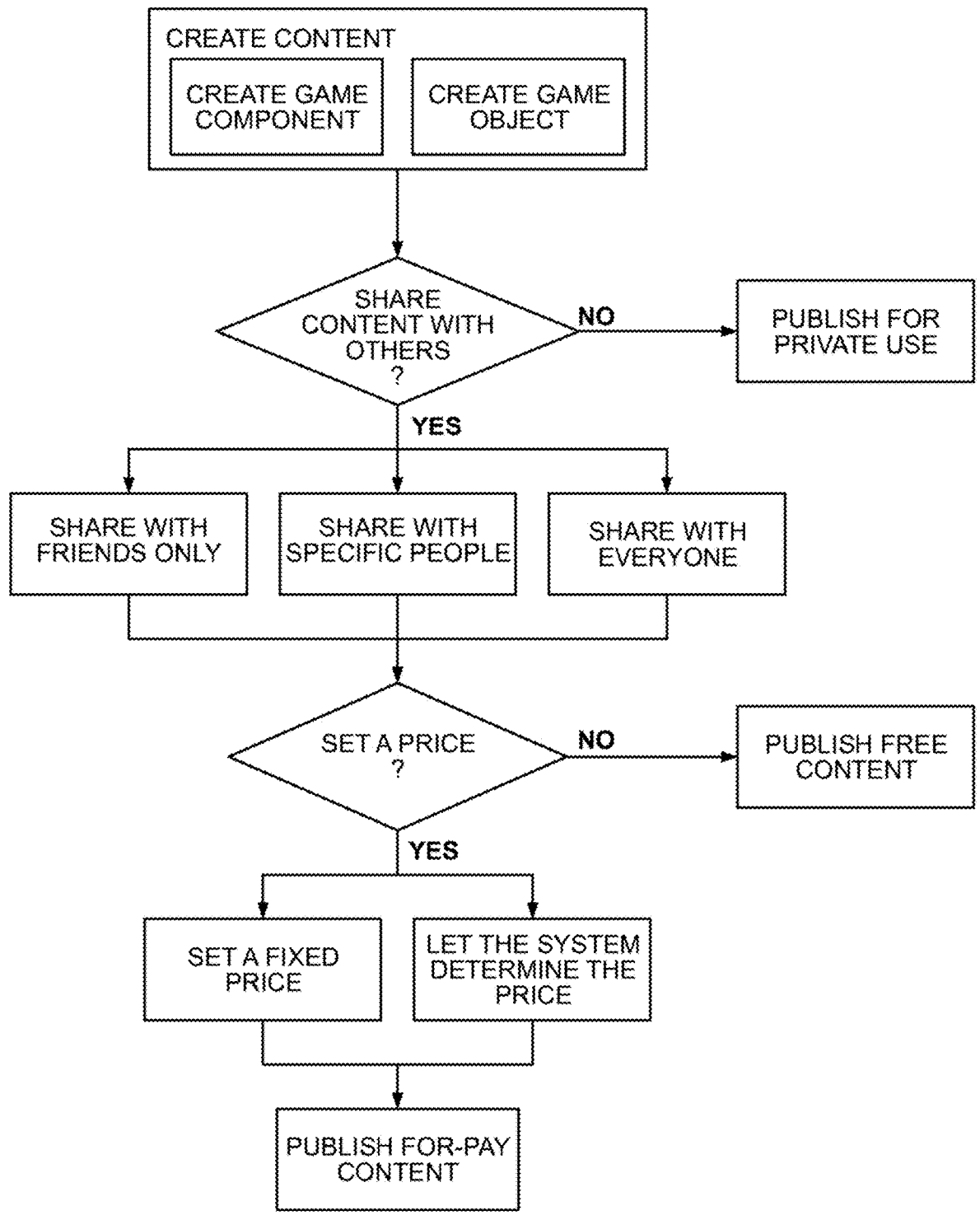
FIG. 18 is a flowchart indicating the steps involved in publishing content. Users can make their content available for free or for pay to a select few or to everyone.

Furthermore, users can decide how they want to share the content they are creating. They can reserve it for their own private use or share it with specific people (individuals or groups of individuals) or make it publicly available to anyone. If they do decide to share their content, they can share it for free or set a price to it. The price can also be determined automatically by the system. FIG. 18 illustrates the steps involved in publishing content.

In summary the invention includes at least the following unique concepts:

(a) Easy selection and testing of sound effects for a game object upon certain events using a graphical user interface. The events might be destruction, damage, collision or any other events defined by the object.

(b) The selection of a visual game component of a game object using a graphical user interface.

(c) The selection of the abilities of an object using a graphical user interface and the selection of the parameters of an ability using a graphical user interface.

(d) The creation of the physics or visual components of a game object by drawing using the mouse or other pointing device.

(e) The use of a graphical user interface to combine game components into a game object.

(f) The ability to upload an image to be used as the background image for a game or level.

(g) The ability to upload a sound to be used as one of the sounds for a game object.

(h) The method by which users can decide who has access to their content and at what price.

Solution to Problem 4: We require a tool or method which allows a user to modify the rules of a game (Rules editing).

Figure 19:
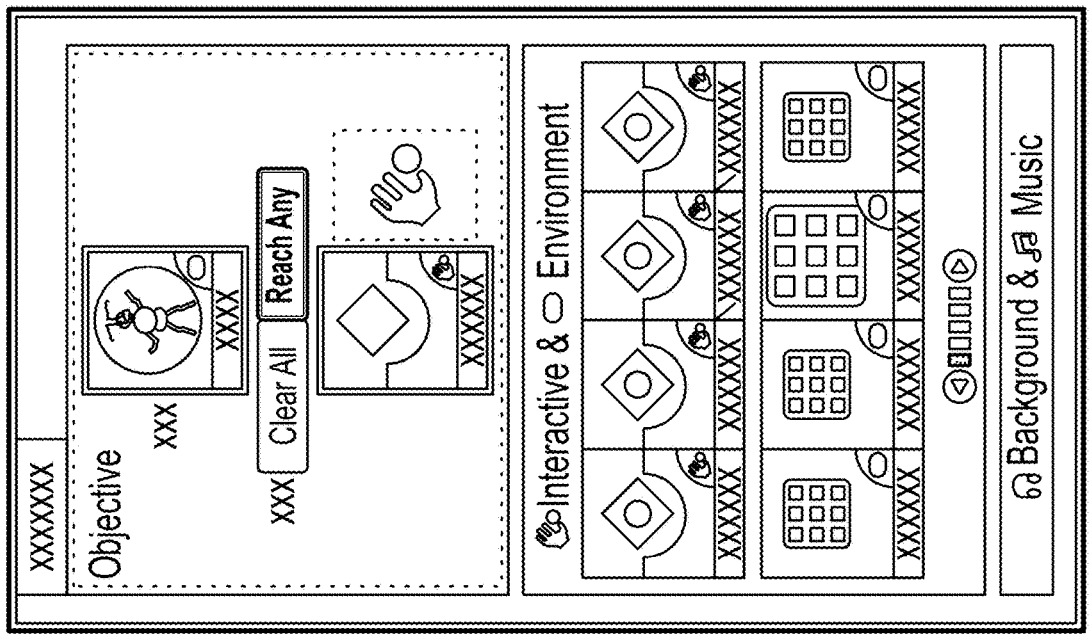
FIG. 19 shows how the game rules can be easily edited by dropping new pieces into the "Objective" area.

Approach to Problem 4: An aspect of the proposed invention is the ability of an end user to be able to easily change the rules of a game without requiring any scripting or programming. FIG. 19 shows a few of the options that a user of the game editor might use to configure the rules of a new game.

Figure 20:
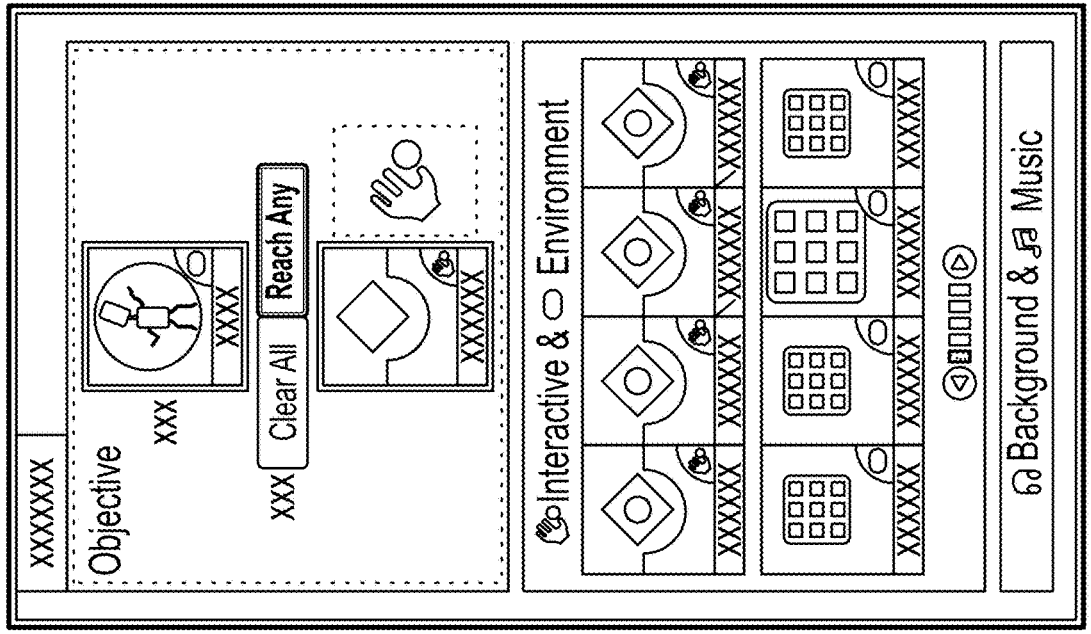
FIG. 20 displays a graphical method by which the user can set the rules of a game.

One aspect of the rules of the game are its winning and losing conditions. The winning conditions of most game genres can often be defined in one of the following ways:

(a) collect all game objects of a certain type
(b) destroy all game objects of a certain type
(c) reach a game object (such as the exit of a level)
(d) achieve one of the above goals in a specified amount of time
(e) achieve a certain score
(f) remain "alive" for a specified amount of time FIGS. 19 and 20 illustrate a way in which the game creator could easily specify the winning conditions of a game. In this particular interface the user is able to decide what a platformer character (cute guy) must do to win each level of the game. They have selectable options: which object or objects the player must interact with, and how the player must interact with these objects. A typical platformer could be specified by choosing the platformer character as the player object, "Reach any" as the condition and then dragging the exit game object into the slot on the right. A Breakout style game would be specified by choosing the paddle as the player object, the "Clear all" option, and placing destroyable breakout bricks on the right. A shooting game such as asteroids would be specified by selecting the spaceship as the player object and the "Clear all" option, and then an asteroid on the right. Users could also specify a game where mom than one type of objects had to be cleared from a level for the winning condition to be satisfied (for example a breakout-style game where both bricks and gems would need to be cleared). To do so, they can simply add one or several additional game objects to be included in the game's goal. The game editor automatically performs a logical AND of the game objectives when the "clear all" option is used, and a logical OR of the game objects when the "reach any" option is chosen.

One can see how a very large subset of all video games made to date can be specified using the above interface including all genres mentioned in the approach to Problem 1.

The following can be easily specified to define the rules for a game:

(a) Which object will be controlled by the player.

(b) Which of two objectives this player must achieve ("Clear all", or "Reach any"); only requiring two options for the game objective is unique.

(c) Selecting one or more game objects for which the objective must be achieved by dragging them into the slots.

When choosing the game objects that the rules apply to, you need only drag the game object from the palette (or personal library), into the slot for the rules.

Figure 21:
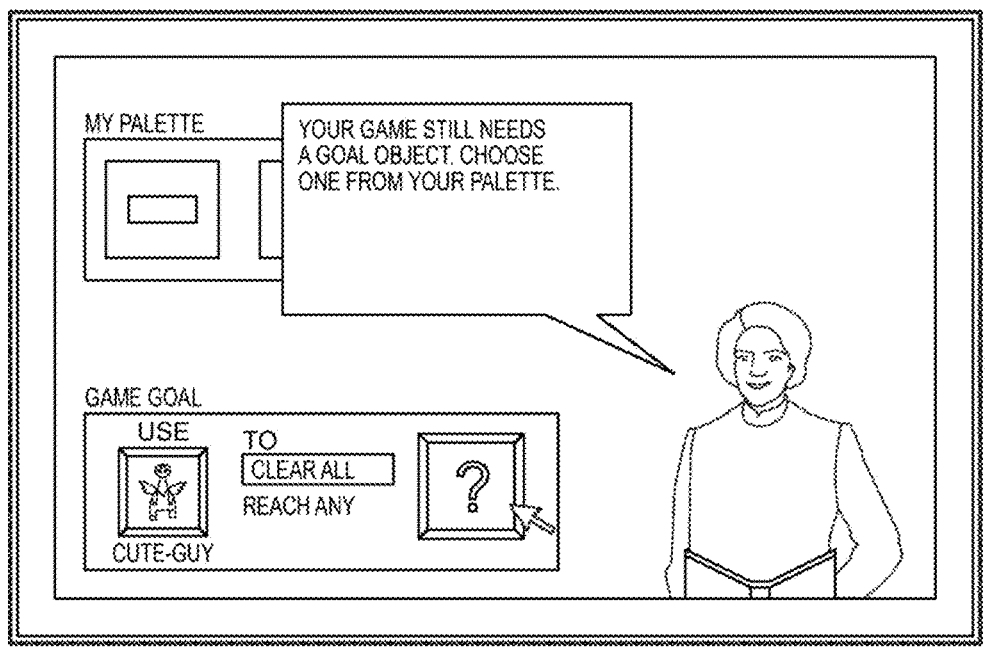
FIG. 21 shows a warning message when the rules of the game are incorrectly specified.

A further innovation is the ability to automatically warn the user if they do not correctly specify the rules of a game for example if they forget to specify which game objects the objective is referring to. FIG. 21 shows an example of a potential warning message.

Alternatively, the rules editor can prevent user error and omissions by enforcing the player slot to never be empty and at least one game object to be in the goal slot at all times. When a new game is created from scratch, the software picks a player object, a condition and a goal object at random. The user can then make modifications to the resulting rules, but never in a way that would break the rules. Furthermore, the player object and the goal objects are automatically instantiated in every new game level. This ensures that every level of the users' game is winnable at all times.

Figure 22:
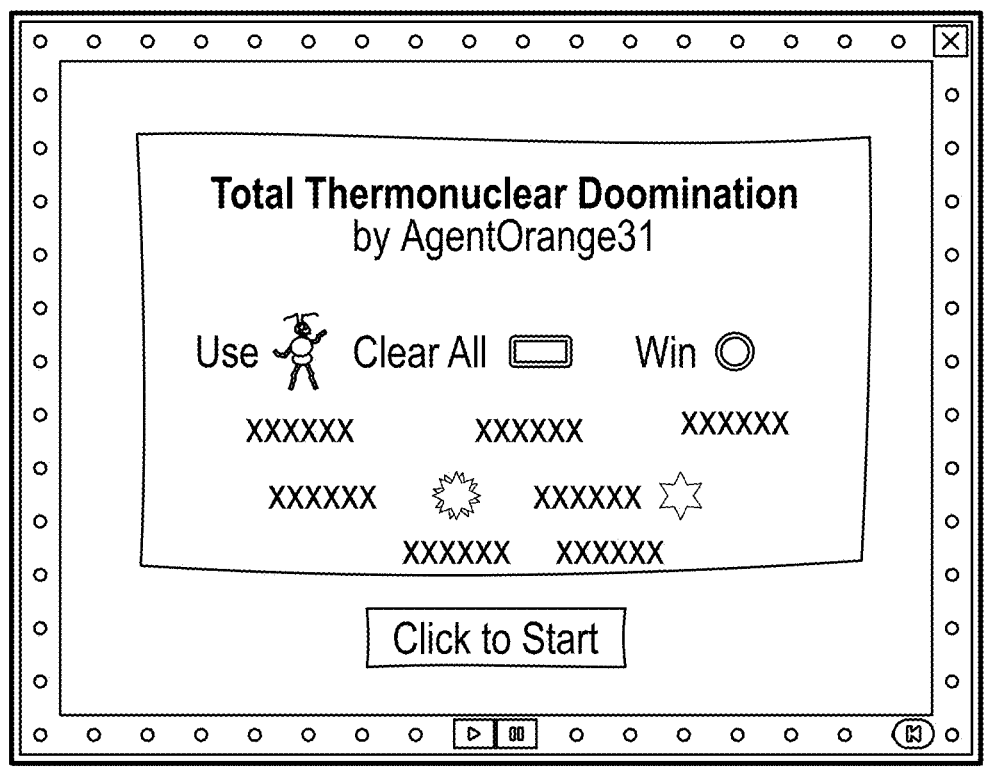
FIG. 22 shows how instructions for playing the game are automatically generated and displayed on the game start screen.

This potential embodiment of the rules interface further allows for the automated generation of game instructions in either text or visual form. FIG. 22 shows one potential embodiment of how instructions can be automatically displayed to the user. Having a consistent method for creating and communicating the rules of any game to a player is a unique aspect of the invention.

Another unique aspect about the automatically generated rules shown in FIG. 22 is that the visual aspect of the game objects are used in the display of the instructions to the player.

Existing level editors for games do not let you choose the winning conditions of the game as this is typically hard-coded into the game code itself. Our method allows the creator to easily define the win conditions without programming. Some of the unique aspects are:

(a) The ability to define many game genres with limited options: player object selection, one of two objectives, and one or more game objects which are required by the objective.

(b) The use of drag and drop interaction to select the game objects that are used in the rules of the game.

(c) The ability to automatically warn the creator if they have incorrectly specified the rules of a game.

(d) Ensuring the creator's game is always winnable by picking default game objects for the rules, while allowing them the freedom to make changes to the rules.

(e) The automatic generation of instructions to display to a player for any game.

(f) The display of the rules using the visual aspect game objects.

Solution to Problem 5: We require a tool or method which allows a user to modify properties of game objects.

Approach to Problem 5: An aspect of this invention is the ability of a game object creator to specify which properties of that object will be useful to be changed within the game editing tool. Code Listing 2 in FIG. 23 illustrates this concept.

Figures 23, 24:
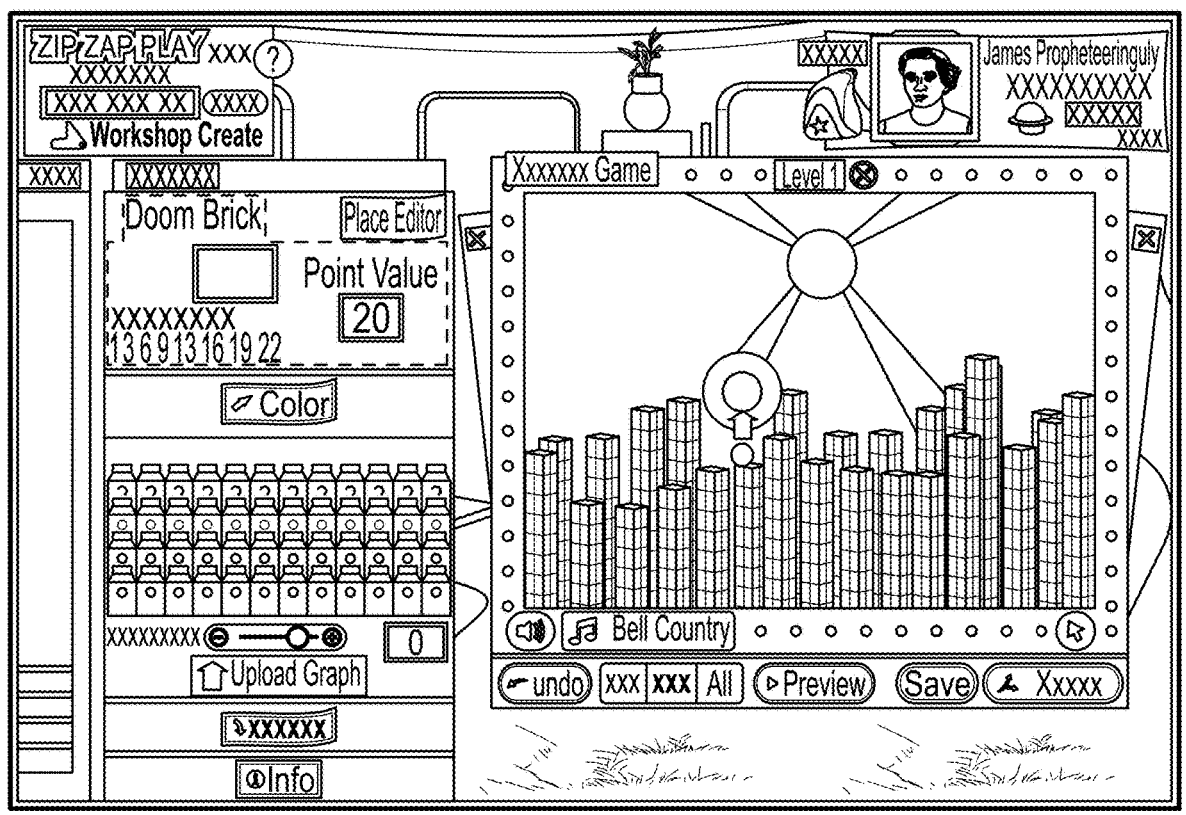
FIG. 23 is an XML based file that is used to make an attribute (equivalently a property) of the game object is marked as being editable.
FIG. 24 shows an implementation of the visual properties editor.

In Code Listing 2 of FIG. 23, an attribute (equivalently a property) of the game object is marked as being editable. In this case it is the number of lives or shots that a game player will have.

When an attribute of a game object is marked as editable, it will be one of the properties that can be edited from within the game editing tool graphical user interface (GUI). An aspect of the invention allows any game object to have its properties edited by clicking on the object. The user is then presented with a user interface which corresponds roughly to the types of components used when the game object was created. The GUI allows you to edit aspects of the visual component, physics component, sounds, animations, and particle effects, and lastly the rules for a given object. Furthermore, the upper and lower limits of a given property (such as number of lives) could be specified in the code about by adding upperlimit="10" and lowerlimit="1" to the code listed above in FIG. 23.

FIGS. 24 through 27 show examples of the kinds of properties that can be exposed to the editing interface.

FIG. 24 shows an implementation of the visual component editor. The user is allowed to easily select the color of the game object. This lets him or her create visually interesting levels simply by changing the color of game objects being placed in the world. One could imagine creating a breakout level where the bricks are positioned and colored so that the level looks like a mushroom or some other object.

Figure 25:
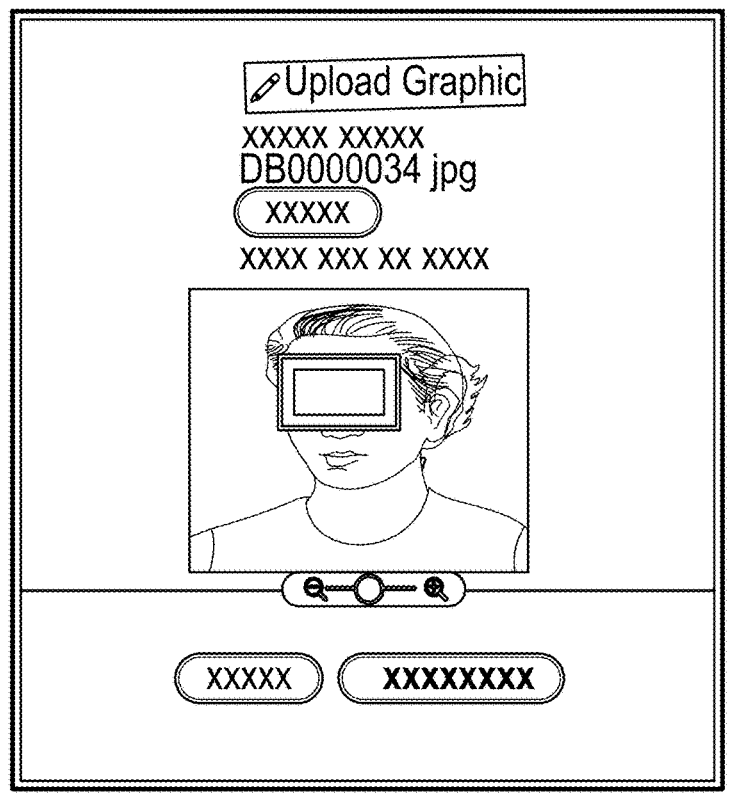
FIG. 25 shows how users can position their uploaded graphic while previewing how it will get cropped to the shape of the object.

In addition, users can upload their own graphics onto existing game pieces by clicking on the Upload Graphic button in the visual properties editor. FIG. 25 shows how they are able to position a picture onto the object using panning and zooming while being able to see how their picture will be cropped to the size and shape of the object.

Furthermore, users can authorize access to their content on other websites and that content can be pulled in automatically. For example, users can give access to pictures they have on Flickr, Photobucket, or any other repository of pictures accessible via the internet or their local computer. These pictures will then show up as options for them to place on game pieces. However, they need not choose a single picture to place on a game piece, they can decide to place an entire set or stream. The cannon can then shoot a different picture each time it fires or a series of environment blocks can become a collage of different pictures with very little effort on the user's part. The same applies to video, music or any other content.

Another example is getting users' friends' pictures or icons from instant messaging applications and social networking applications. Users can then populate their games with their friends by creating game pieces with these icons and pictures on them.

Another aspect of this invention is the ability to customize such content driven pieces to the player of the game. If a game player has given authorization to access their content, games they play can display that content as opposed to the game creator's content.

Figure 26:
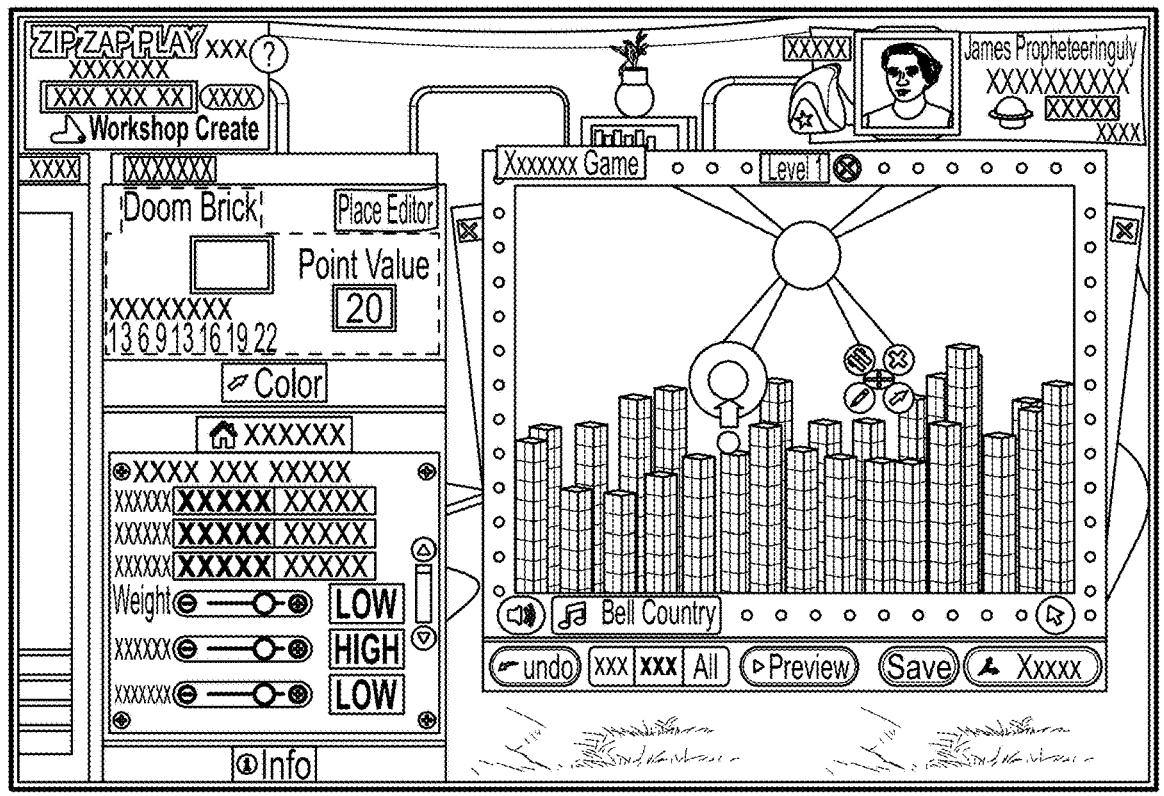
FIG. 26 shows the physics component editor.

FIG. 26 shows some of the physics properties that can be edited. In this example, you can set the mass of the object (how heavy it is), the initial speed and direction the object moves when the level starts, the elasticity of the object (how bouncy it is), whether or not the object is solid, and whether or not the object is fixed in place (doesn't ever move). However, the specifics of which properties can be edited may be specified by the code, such as illustrated by Code Listing 2 in FIG. 23.

Figure 27:
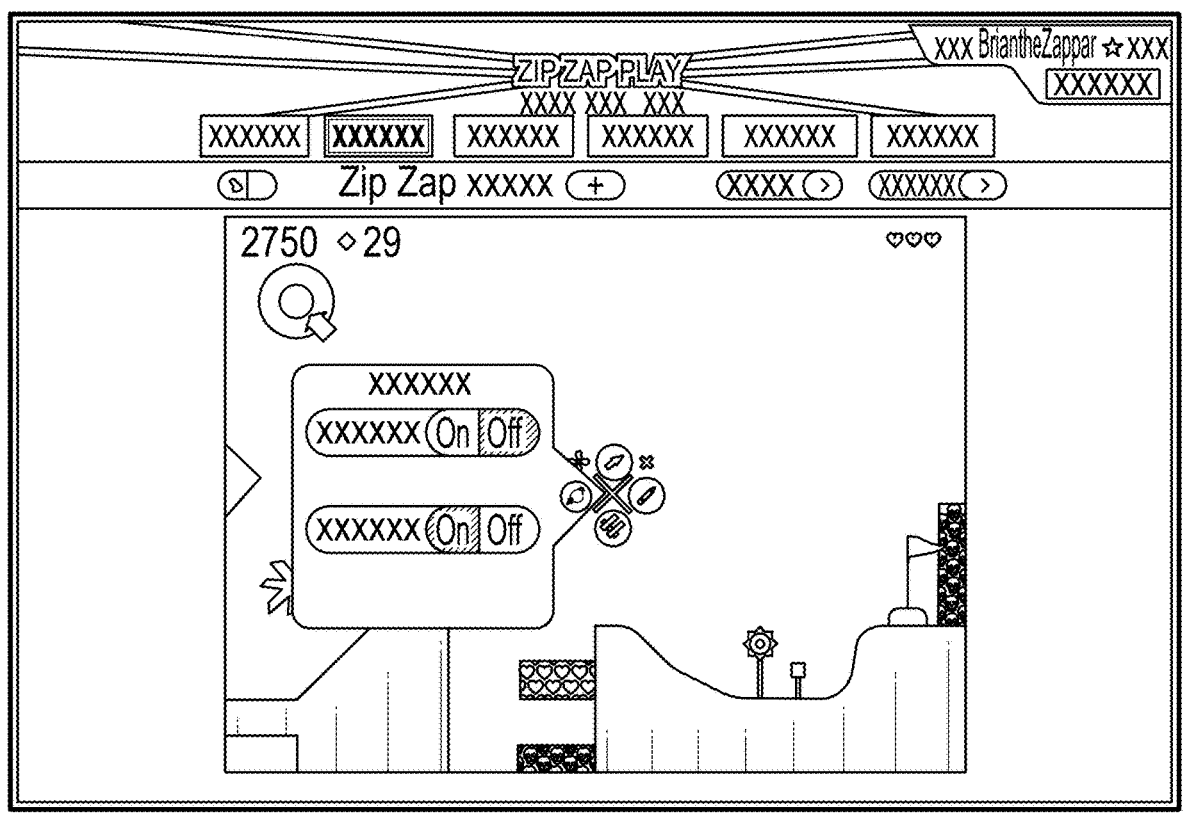
FIG. 27 shows the sound, animation and visual effects edit menu.

FIG. 27 shows some of the effects that can be changed for a particular game object. These may include what sound effects are played when the object runs into something, what particle effects are emitted when certain messages are received, or which animations to play depending on which messages are received.

Figure 28:
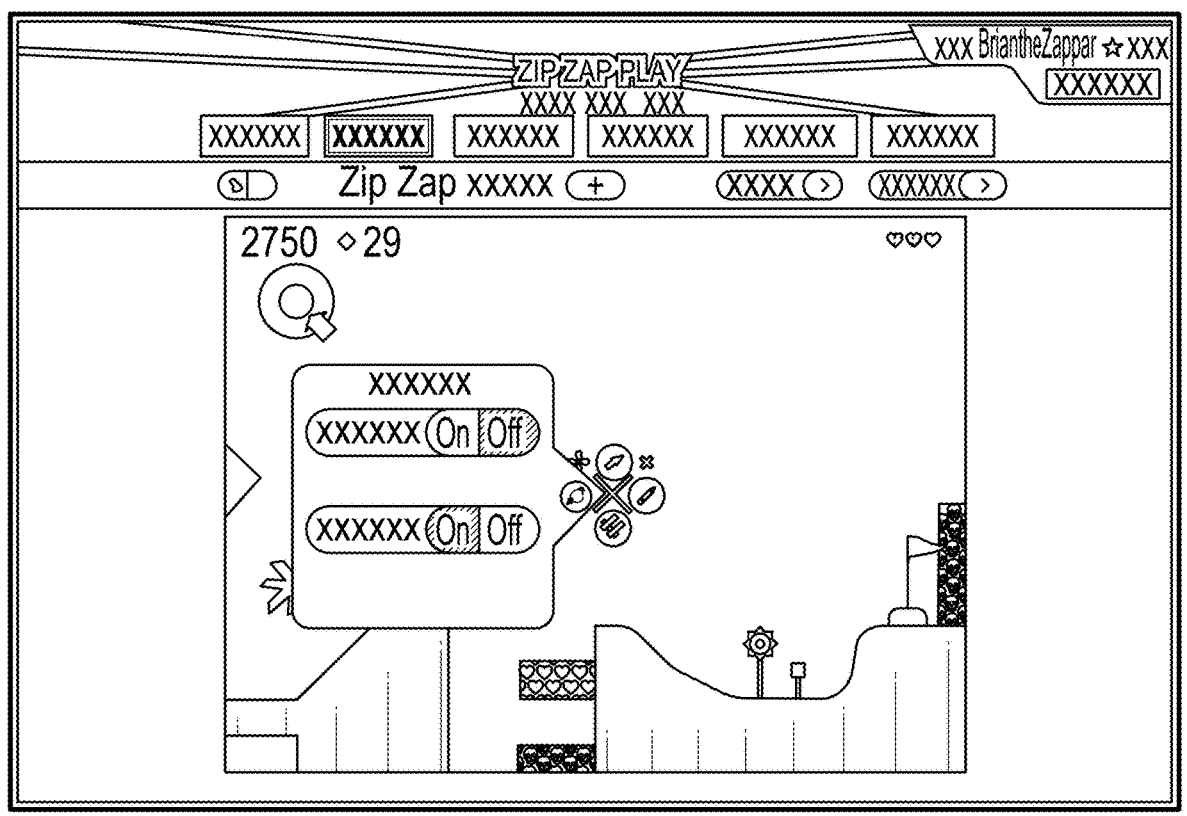
FIG. 28 shows the Game Object rules edit menu.

FIG. 28 shows some aspects of which rules can be changed for a particular game object. These may include such items as how many lives or how much health a player controlled game object has, how much damage an enemy inflicts to the player, how much health a particular item gives to the player, and some more advanced options for specifying exactly what messages a game object might send.

Figure 29:
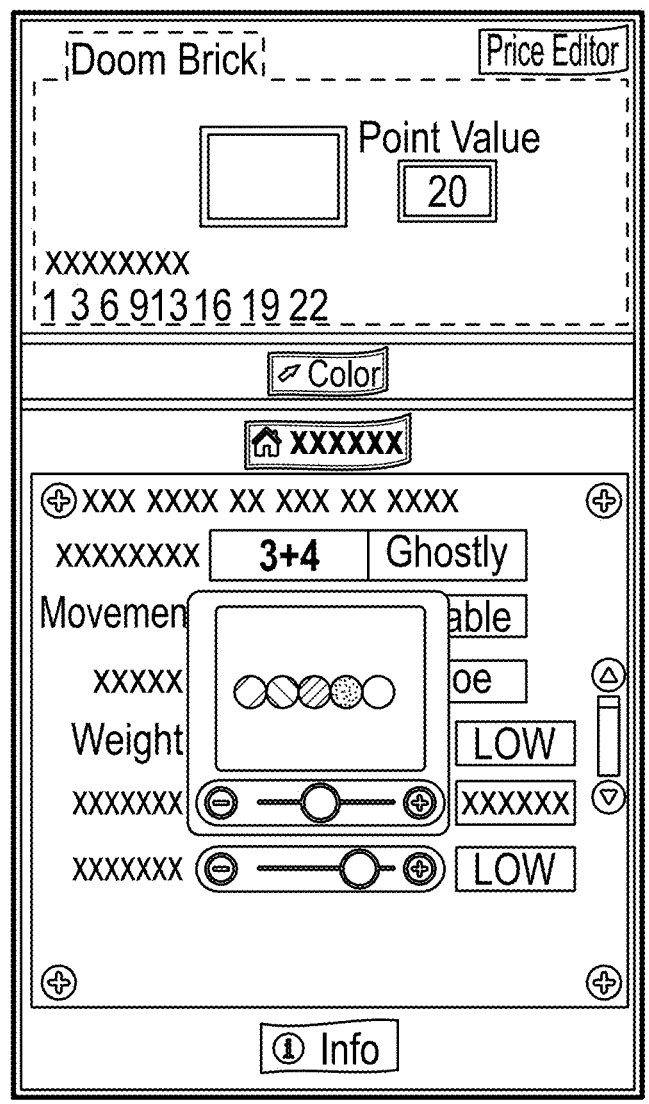
FIG. 29 shows an animated preview of how fast the brick is going to move based on the Start Speed property setting.

An aspect of the invention allows users to preview the effects of setting some or all of the properties above. For example an animation shows how setting the mass of an object affects how heavy it is or how it will bounce. As a user changes the mass of the game object, the animation shows how fast the object will fall (see FIG. 29).

Figure 30:
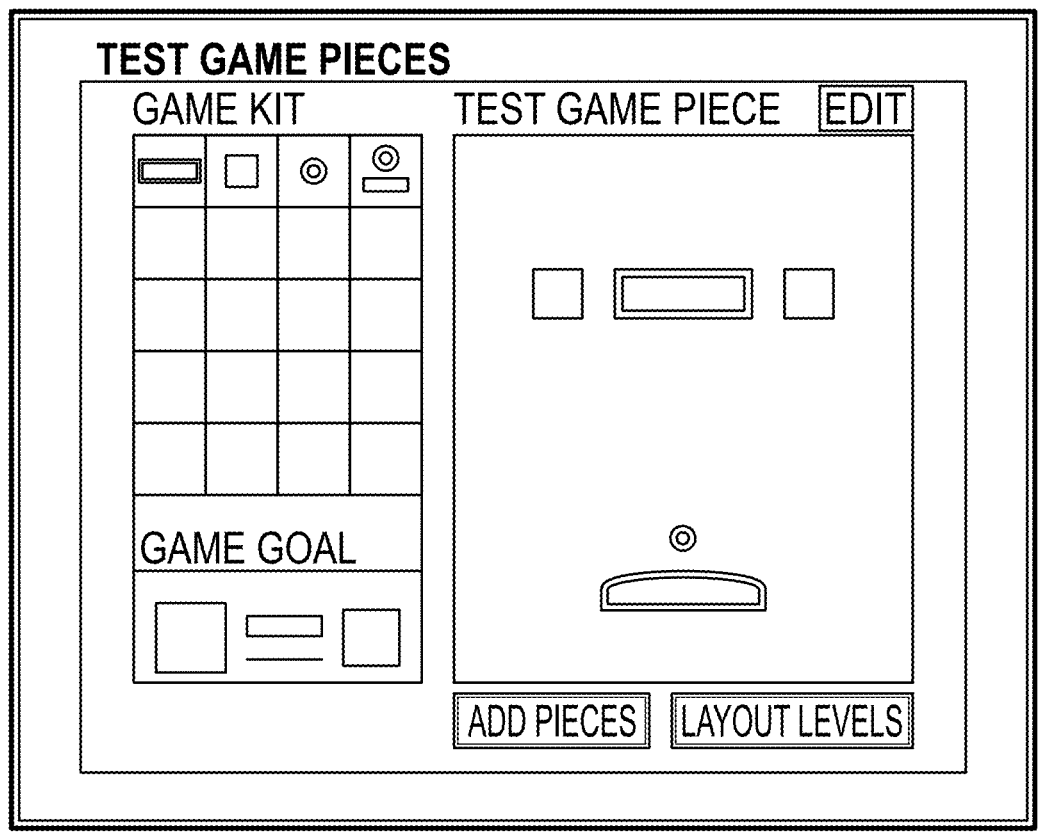
FIG. 30 displays the test sandbox for an object. As one modify properties of a game object they may want to test that game object with a few other pieces in the game template/kit. This figure is one possible version of a game object testing environment.
Figure 31:
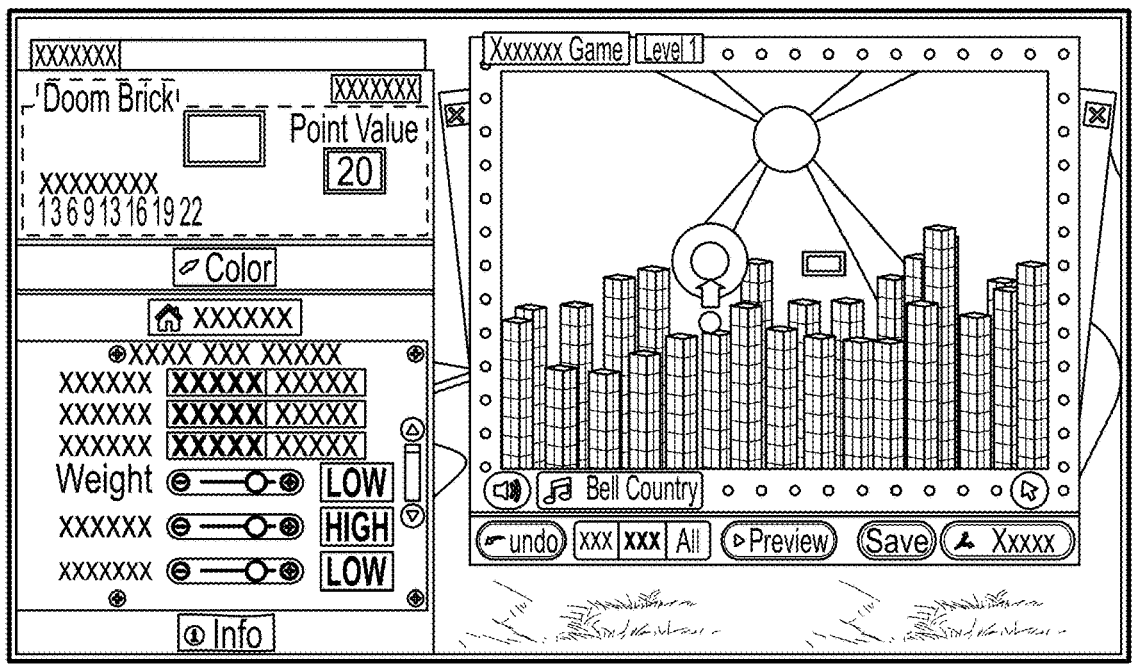
FIG. 31 illustrates how a game can be previewed while still being able to see the settings in the Piece Editor.

An alternative to the test sandbox object in FIG. 30 is presented in FIG. 31. The positioning the property editor alongside the level canvas. This allows users to quickly test their modifications to a piece's properties and go back to the property editor. In addition, they can see the properties while they preview the level.

Figure 32:
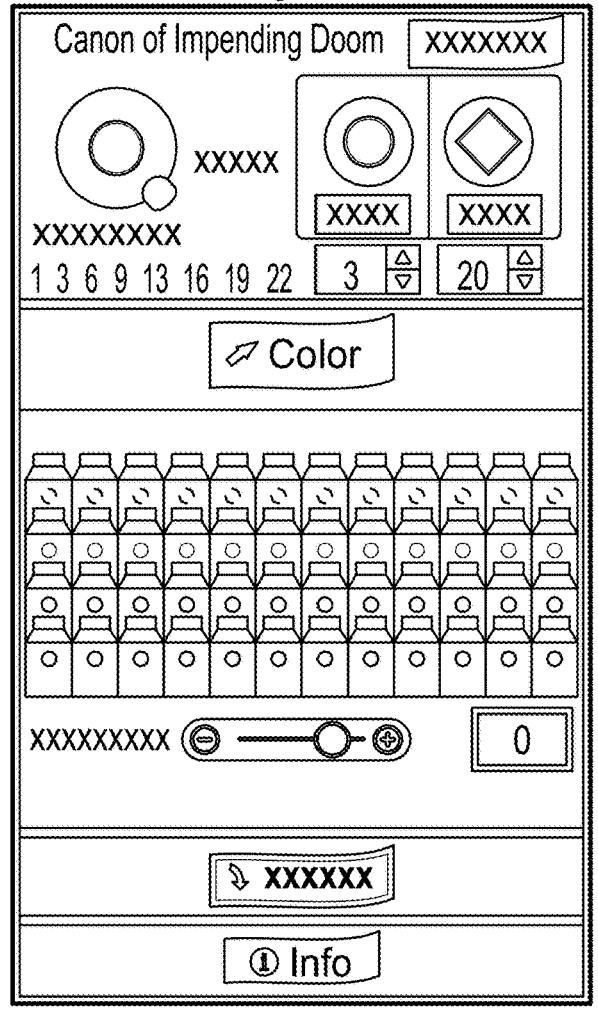
FIG. 32 shows how the projectiles of game pieces can be modified.

Let's consider game pieces that "shoot" projectiles (such as cannons, paddles, etc.), we will call them 'shooters'. Not only can the properties of shooters be modified, but also the properties of their projectiles. In fact, their projectile or projectiles can be replaced by virtually any other game piece by dragging that piece from the library and dropping it into one of the projectile slot (see FIG. 32). The projectile's properties can be edited by first selecting the shooter and then selecting the projectile in the Piece Editor. The ability for users to change the projectiles of a shooter piece and edit their properties is unique.

A specific type of game object may be used to allow users to tell a story within the game. One embodiment of this aspect allows a user to add a text or speech bubble to any object in a game, or alternatively to add a speech bubble directly to the game canvas unassociated with another game object.

This approach enables the use of the game editor to tell stories to players of their game. In a platformer style game, the player character might see speech or text bubbles appear when they approach friendly characters, enemies or other game objects. In a puzzle game, the player could be given hints on how to solve the next piece of the puzzle. These can be used to tell any story. One example might be to have the first enemy of the game tell of a captured princess that the player must deliver. Another might be to use the graphics customization and the game editor to create a game that tells the story of the creator's day at work. In this case, the player runs into a manager "enemy" that states "You must file your expense reports immediately," but upon being convinced by a few shots from the players fun cannon game object might state "OK, OK, you can have the day off."

It is not a requirement, for the text to appear in a bubble, any display of text to the user/game player would work as well. The container for the text may also take on any shape. Instead of a bubble, the text might be displayed inside any game object or game component.

We now discuss two embodiments of this aspect of the invention which make telling stories possible.

Figure 33:
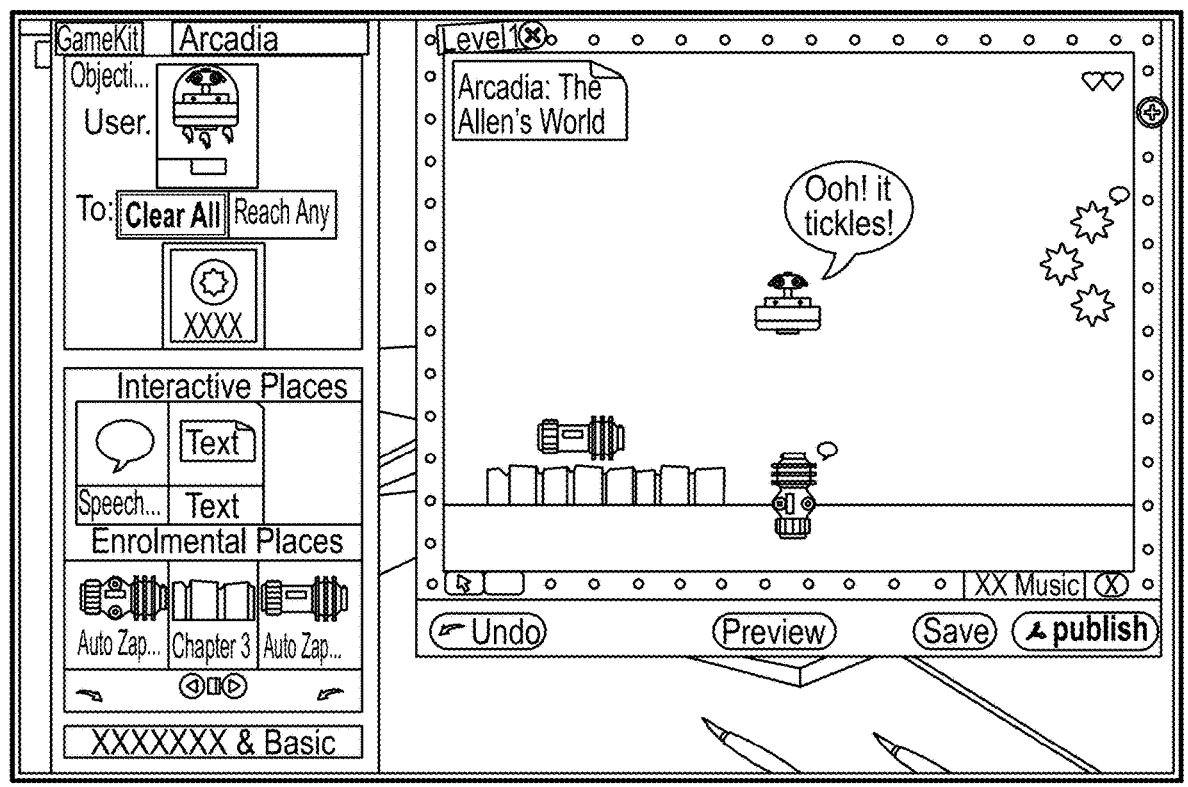
FIG. 33 shows how speech bubbles can be associated with a game object, or how text elements can be placed on the game canvas. The appearance of text can be edited in the piece editor (not shown).

FIG. 33 shows two methods of allowing the user to add text a game. In the first case, a text bubble (labeled speech in the figure) is added to the game kit and then dragged on top of an existing game object. After associating with the game object, the text bubble can be positioned and resized. Once associated with a game object, various aspects of the speech bubble can be edited in the game object properties editor.

Many aspects of the text bubble could be modified. These aspects include but are not limited to:

(a) Controlling when the speech bubble is displayed to the player: This can be controlled using the stimuli system discussed in Problem 1. For example, one might have the speech bubble appear using the following stimuli:
  i. onCollision: When the player collides with the object the text appears
  ii. always: the text is always displayed to the user
  iii. death: the text is displayed to the user when the object is killed, destroyed, or otherwise removed from the game
  iv. first sight of player: the text is displayed when the player comes within view of a game object
  v. level end: the text is displayed when a level ends (different text upon win or loss is possible)
  vi. level start: the text is displayed when a level begins
  vii. damage/healing: text is displayed by the player or another object when damage or healing occurs
  viii. player comes within radius: text is displayed when the player comes within a certain distance of another object
  ix. timer event: text is displayed after a certain period of time from any of the above stimuli.
(b) Setting text or bubble properties:
  i. font: the font style of the text bubble may be modified
  ii. font size: the font size of the text within the bubble may be modified
  iii. position and size: the width, height, relative location, or rotation of the speech bubble may be modified
  iv. color/transparency: the color or transparency of the bubble or the text may be modified
(c) Automatic language translation: if the text is written in one language by the game creator, but the player of the game speaks another language the text may be automatically translated by an algorithm. Alternatively, other users may be able to translate a game into their own language.
(d) Ability to show random or sequential text strings in the bubble according to stimuli: it is possible to specify multiple text strings which are randomly selected to be displayed to the user depending upon any stimuli. Alternatively, a sequence of strings may be displayed to the user depending upon any stimuli.

(e) Inclusion of graphics, sounds or other game components in the bubble including other game pieces and uploadable graphics as per previous section on game pieces: another alternative to text is to allow a user to upload a custom graphic to the text bubble which appears, this would allow a game creator ultimate flexibility in what was displayed in the bubble. It is not necessary that the bubble must contain text or graphics. Any game component or asset might be used.

(f) Using a symbolic language within a text bubble: language could be used to indicate quests, enemies to kill while not requiring translation Adding a text/speech bubble to the canvas: another method by which text might be added to the canvas. This is shown in FIG. 5J as the Text game piece. Instead of associating a text game object directly with another game object, a text game object may be placed directly on the canvas. All of the same aspects mentioned above may also be modified for a text bubble not associated with another game object.

Figure 34:
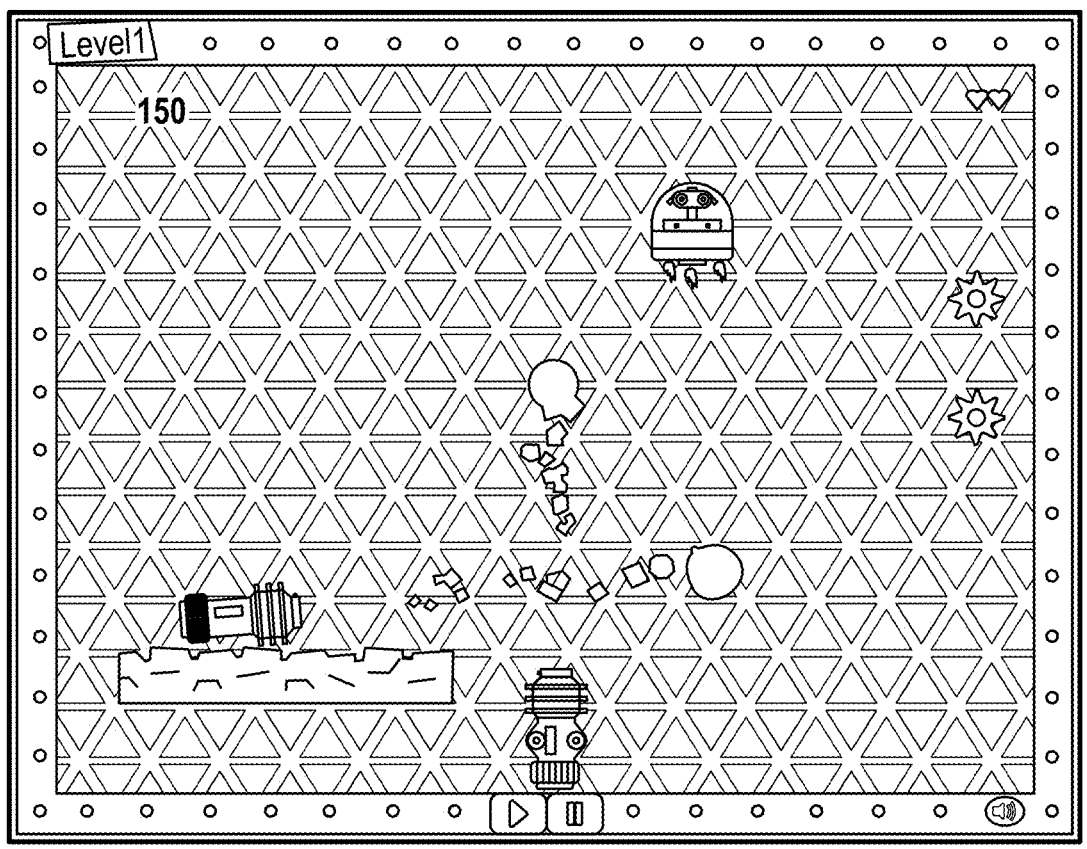
FIG. 34 depicts rotating and fading brick particle effects following the spaceship and balls.
Figures 35, 36:
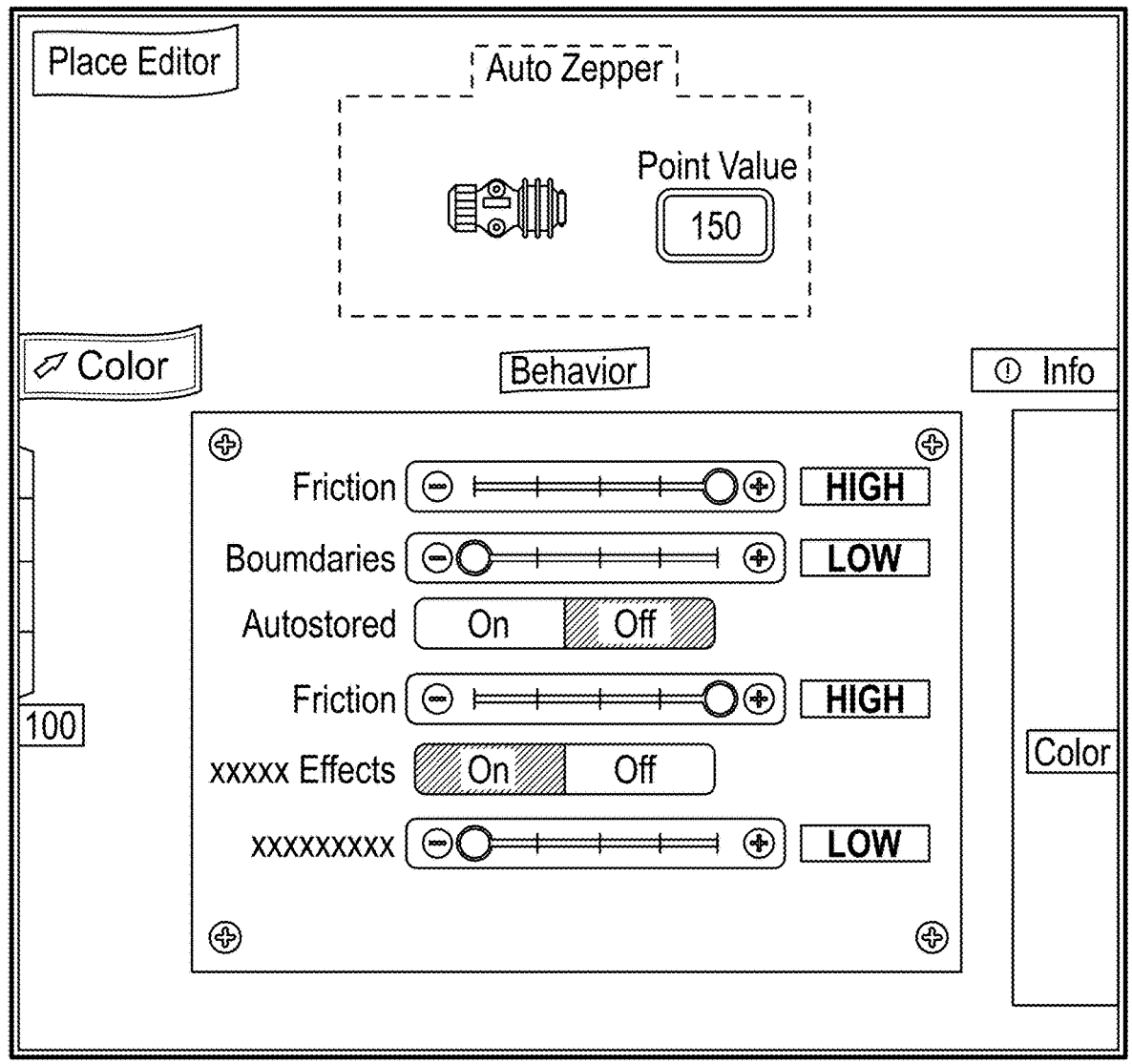
FIG. 35 indicates how to edit particle effects in the Piece Editor.
FIG. 36 is an XML based file that displays a potential format for specifying particle effects of a game object.

Charging for access to editable text/speech bubbles: another aspect of this invention which is unique is the proposal that it may be possible to charge the user for the use of a text bubble game object or component within a game. This charge might be applied in a number of ways including but not limited to:

(a) virtual or real currency
(b) subscription fee
(c) per use fee (micro-transaction)
(d) one time fee for permanent access to the ability to use text bubbles Editable Particle Effects: FIG. 35 shows another unique aspect of this invention: the ability to edit particle effects. Particle effects can be used to simulate any number of natural (or supernatural) phenomena including smoke, water, fire, sparks, goo, fog, haze, hair, etc. Allowing the creator of a game to change various aspects of the particles associated with a game object delivers significant creative freedom to the game creator. FIG. 35 shows a method by which a graphical interface may be used. Interesting particle effects such as rocket exhaust following a spaceship or ball may be created such as seen in FIG. 34.

Another alternative to specifying particle effects using a graphical user interface is to specify them in code or in XML. Code Listing 3 in FIG. 36 displays a potential format for specifying particle effects in XML of a game object. The code in Code Listing 3 in FIG. 36 shows some of the potentially editable properties of a particle effect. Below we discuss each in turn. Each entry may contain a reference to the above code listing.

Some aspects of particle effects which might be modified using a graphical interface include but are not limited to:

(a) editable graphic of the particle via the graphic upload mechanism: Allowing the user of the invention to modify the graphic used for the particle allows them to simulate virtually any phenomena. Green circles or ellipses might be used to simulate a trail of slime, Yellow and red particles might simulate fire. Blue ellipses might simulate falling water. Notice that the particle visual is specified in the visual section of the code listing.

(b) allow the use of an animation for the particle: Having particles be animated (which may be done by using a flash SWF file for each particle, or by using a series of images), also allows for very interesting effects. For example animated gingerbread men flying out from a game object. In the listing above this is achieved by using a SWF file as the particle.

(c) alpha/transparency fade in/out: Having particles fade in or fade out can be used for any number of phenomena. Shows as the alpha value in the code listing.

(d) gravity or other forces applied to them: applying a force with a specified direction and duration allows for effects such as smoke (upward force/velocity), or water falling (affected by downwards force). This is the impulse value of the listing above.

(e) graphical effects such as blur filters or other filters: smoke effects can be made more realistic by using filters on the graphics including blur filters or other kinds of graphics filters.

(e) time duration of particle life: specifying how long a particle lasts can change the height or length of a particle effect. This is specified as the lifetime of the particle above.

(f) particles around the perimeter of the object: Interesting effects can be made by having the particles appear around the perimeter of an object.

(g) rotation of particle: specifying a rotation direction and speed of a particle allows for a number of interesting effects. Shown as the vAngle parameter in the listing.

(h) initial speed of the particles
(i) an offset position from the game object, e.g., The xOffset in the listing
(j) the number of particles
(k) how often particles appear: the encapsulating randomInterval tag in the code listing demonstrates this.
(l) randomizing any of the above aspects within a range of numbers: Any of the above aspects of particle effects might specified to be within a random range by the user. For example, randomizing the speed of spark particles emitted by a game object creates a more realistic effect. Any time the RO notation is used this specifies a range of random numbers.
(m) a transition from one value to another value of any of the above aspects of the particle effect. An example of this is the alpha value changing from 1 to 0 for the above particle effect.

The utility of editing aspects of particle effects is not limited to the few examples listed above, any number of interesting and fun effects can be created by editing particle effects.

This is the first time that any of the above attributes of a game object or other aspects of a game can be easily edited by a non-skilled end-user. There are many aspects of the above invention that allow the user to easily edit the properties of a game object:

(a) The concept of a visual preview or testing sandbox to allow a user to easily understand the effects of the setting of properties.
(b) The idea that the properties of any game object can be edited within a few clicks from anywhere in the game editing interface.
(c) The concept that an unskilled user can easily change physics properties of a game object.
(d) The concept that an unskilled user can easily change the rules and behaviors of a game object.
(e) The concept that an unskilled user can easily change the color, animations, and sound effects of a game object.
(f) The ability for users to change the projectile(s) of a shooter piece and edit their properties.
(g) The ability for users to easily replace the visual component of a game object by uploading a picture.

(h) The ability for users to access and subscribe to their content stored on other websites for the purposes of using that content with or as part of game pieces, backgrounds, music or other aspects of the game.

(i) The ability for users to add and modify text associated with game objects including any of the aspects mentioned in problem 5.

(j) The ability for users to add and modify text to the game canvas as described in problem 5

(k) The ability for users to modify any of the aspects of particle effects used in a game either via an XML file or a graphical interface.

Solution to Problem 6: A tool or method which allows a user to create a combination of rules and game objects.

Figure 37:
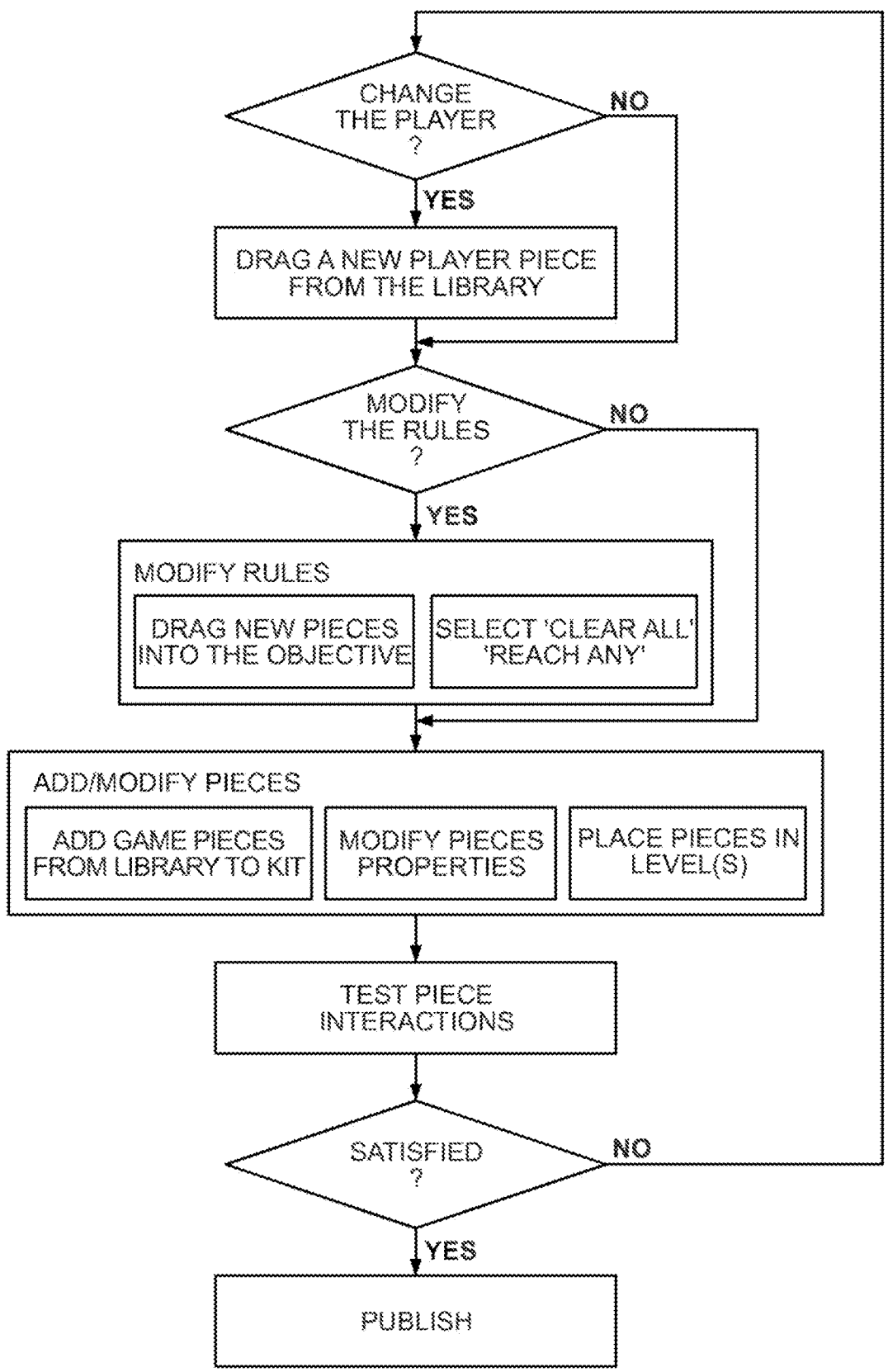
FIG. 37 is a flowchart the steps involved in creating a game template.
Figure 38:
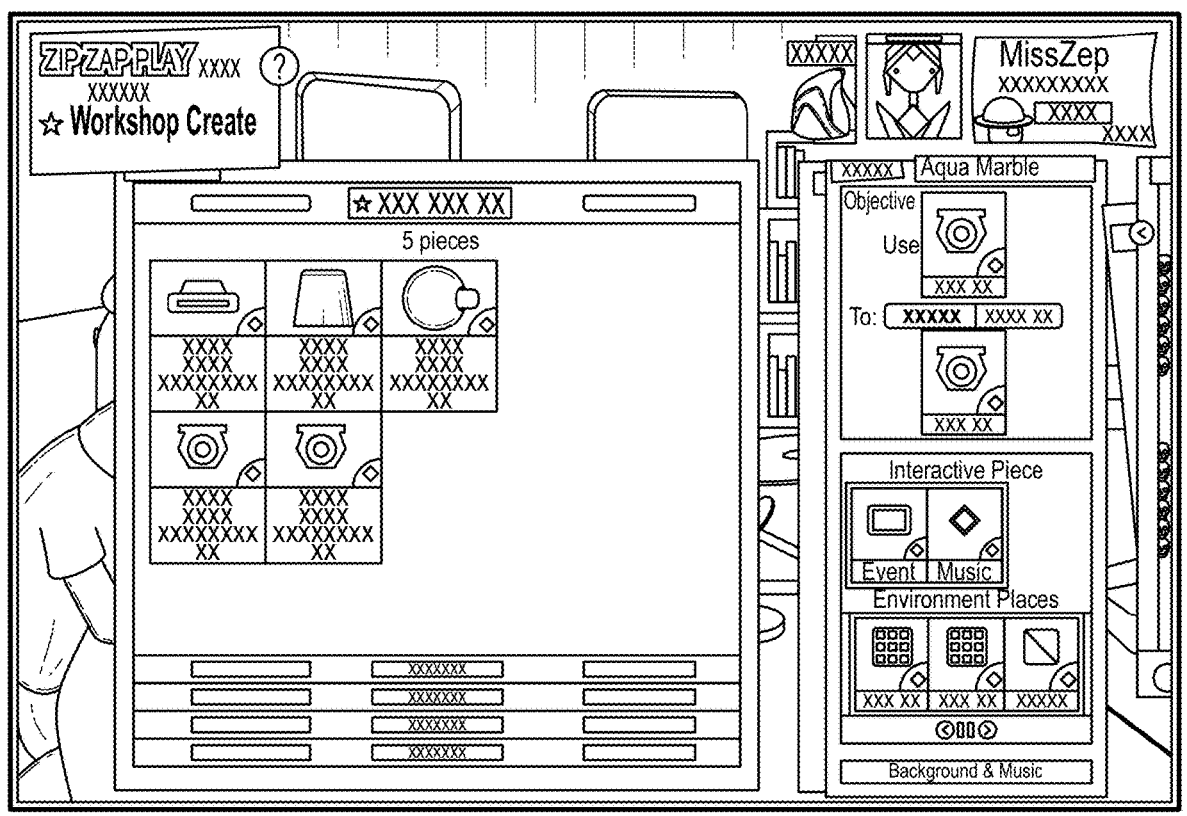
FIG. 38 shows player controlled game objects. These can be used in the rules/objectives.
Figure 39:
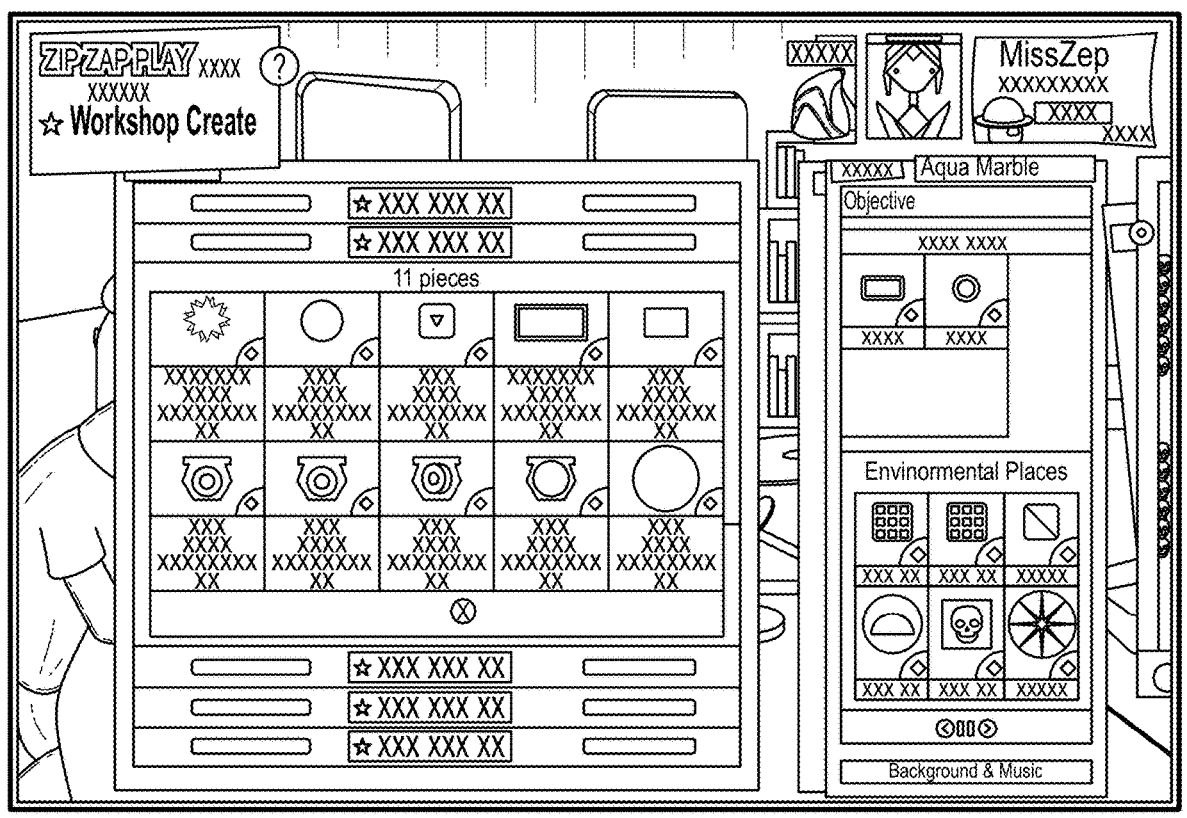
FIG. 39 illustrates interactive pieces that give the player points or lives. These can be set as objectives.
Figure 40:
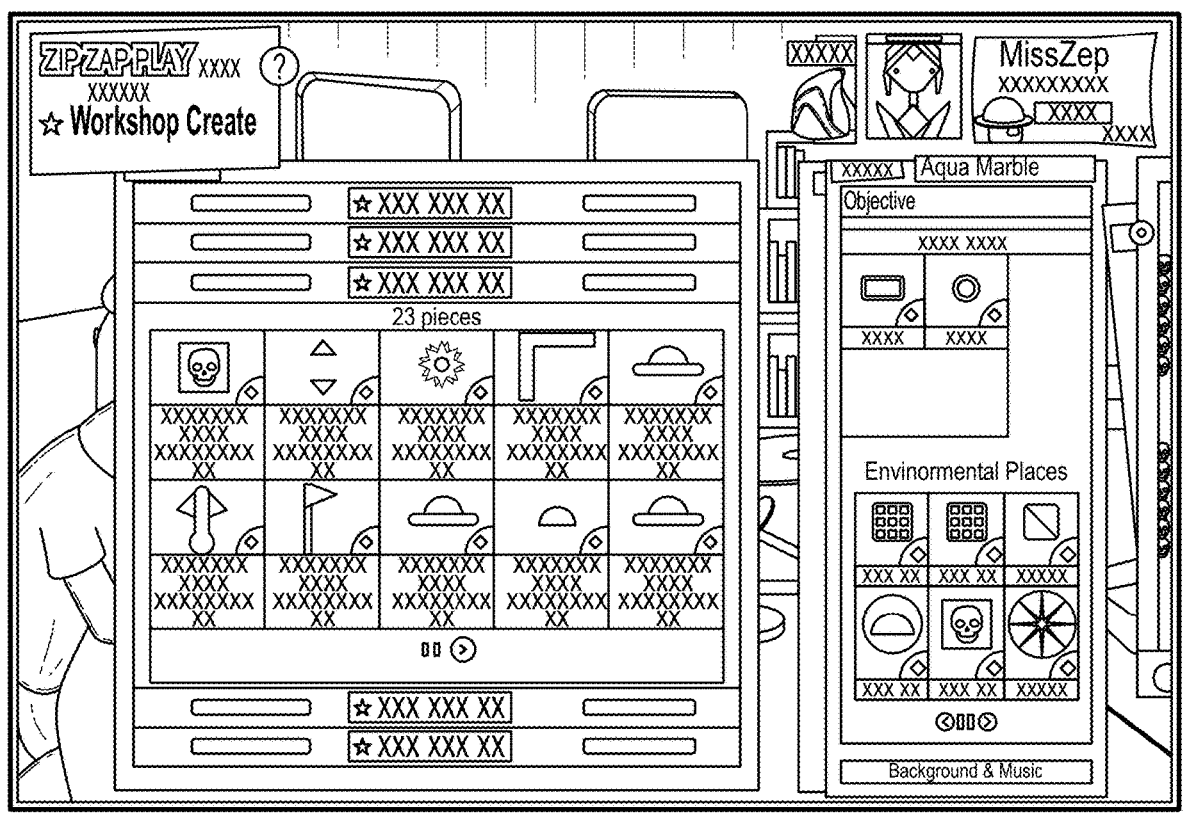
FIG. 40 shows environment game objects that make up the world of the game.

Approach to Problem 6: Another aspect of the invention is the ability to group a set of rules with a set of game objects into a game template. One definition of a game template is this: the combination of a set of game objects with a set of rules. Typically, a user will define a game template which ensures that all of the game objects in the template work well together, and conform to the rules. One could imagine having a game template for a Mario platformer, breakout, pinball, or any other game genre or type. FIG. 37 shows the steps involved in creating a game template starting from scratch. A game template may start with a randomly selected player object, an objective piece and a rule set. Another way to obtain a template is to use a game template from an existing game. Both methods ensure that a template always describes a winnable game. Note that changing the player and modify the rules do not have to happen in that order.

Various aspects of the invention therefore provide:

(a) Specifying properties of game objects, combine them into a group along with the rules or win condition. Put another way, this is the unique concept of a game kit or template that fully combines specified game objects with rules.

(b) Ensuring that a game template always describes a winnable game. This may be done using a randomly generated game template, or, alternatively, this can be done by using a game template from an existing game.

Solution to Problem 7: A tool or method which allows a user to combine the game objects into complete games.

Approach to Problem 7: An aspect of this invention is the organization of game objects into different categories. This allows users to easily combine objects into complete games. Indeed, both the library of all game pieces and the game template are organized according to these categories. The game pieces may be organized as follows:

(a) Player pieces: these pieces are controlled by the player. There can only be one per game. An example a player piece is the golf ball in a golf game.

(b) Interactive pieces: these are pieces that can give the player points, or lives. They can be set as game objectives. An example of an interactive piece is a brick in a breakout game.

(c) Environment pieces: these are pieces that cannot be set as game objectives. They populate the world. An example of an environment pieces is a square title that makes up part of a wall.

(d) Background pieces: these pieces are used as background for the game. They can be images, videos or animated content. There can only be one per level.

(e) Music pieces: these pieces are used as background music for the game. They can be any audio content. There can only be one per level.

FIGS. 38-42 show these different game pieces in both the library and the game kit.

Figure 41:
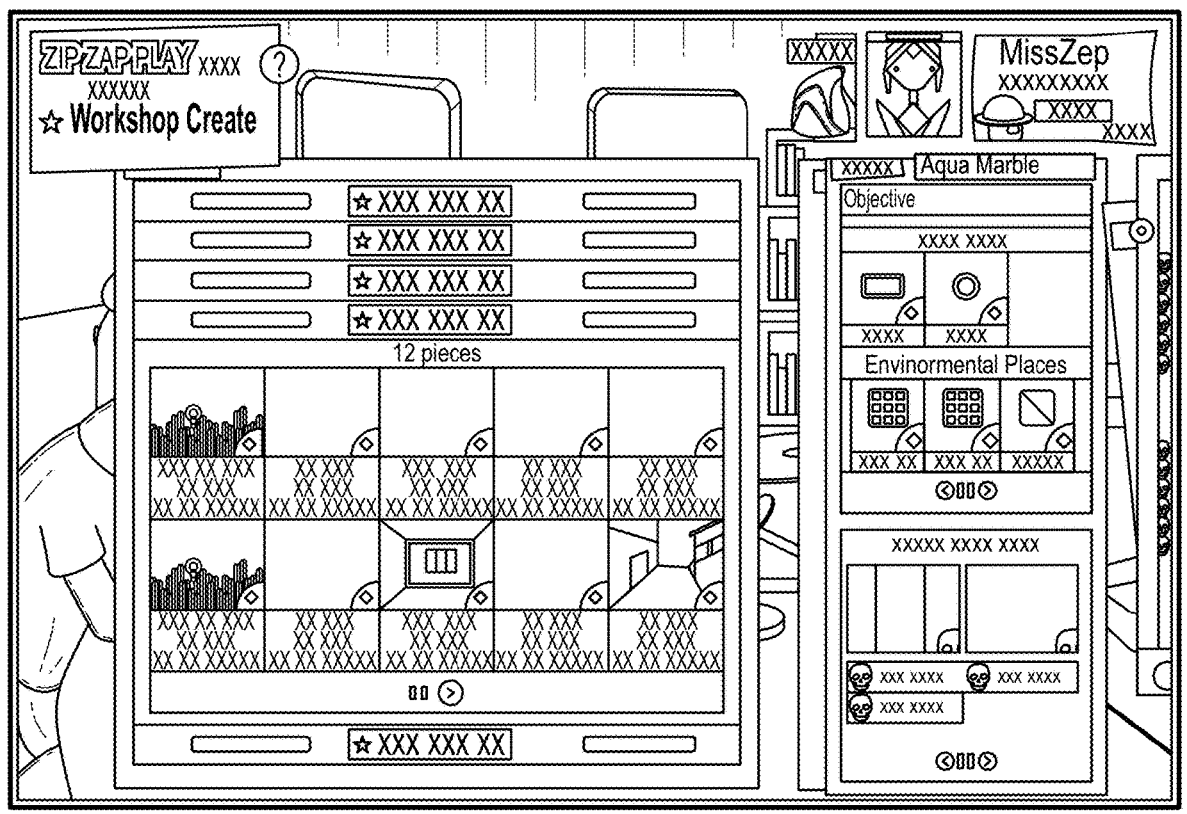
FIG. 41 depicts background pieces. There might only be one per level.
Figure 42:
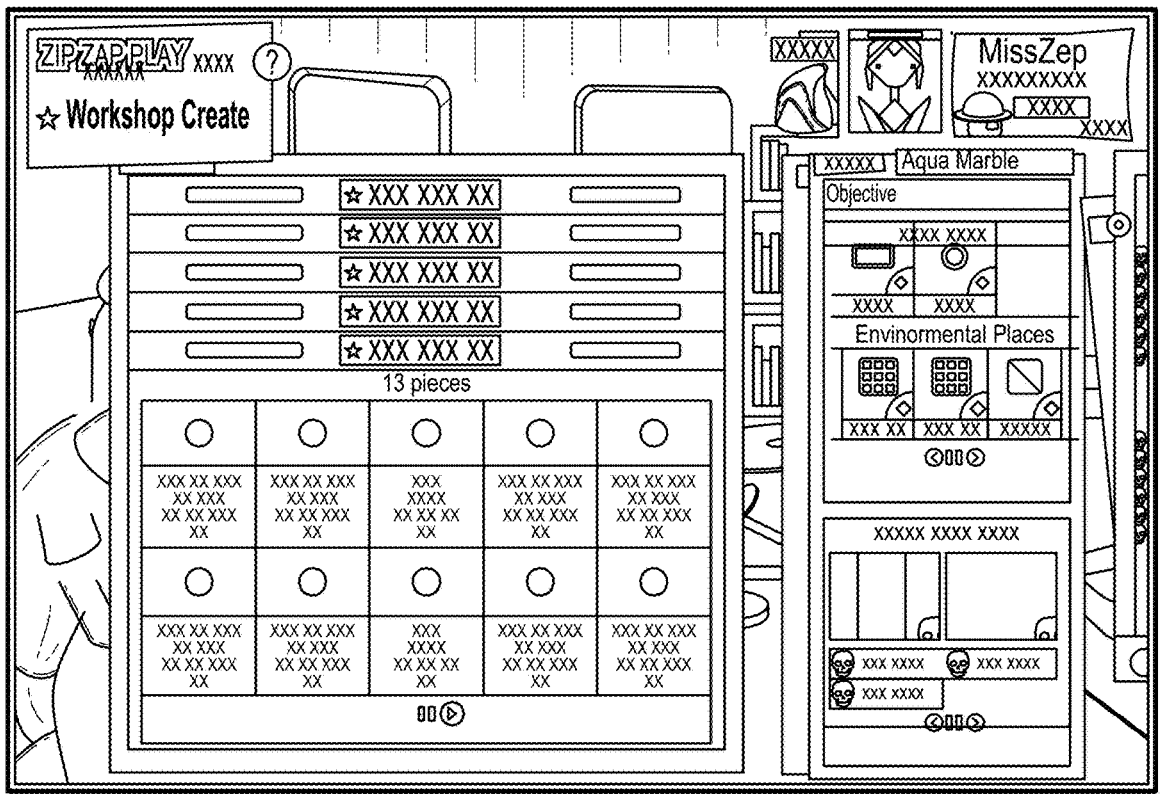
FIG. 42 shows music pieces. There might only be one per level.

In reference to FIG. 41, while there typically is only one background per level, multiple backgrounds may be used and the game may rotate between or among them in some predefined manner.

In reference to FIG. 42, again, similar to backgrounds, while there typically is only one musical selection per level, multiple musical selections may be selected as a sort of playlist through which the game proceeds.

In addition to the background and music pieces found in the Library, users can upload their own right from the game kit, as FIG. 43 shows.

Figure 44:
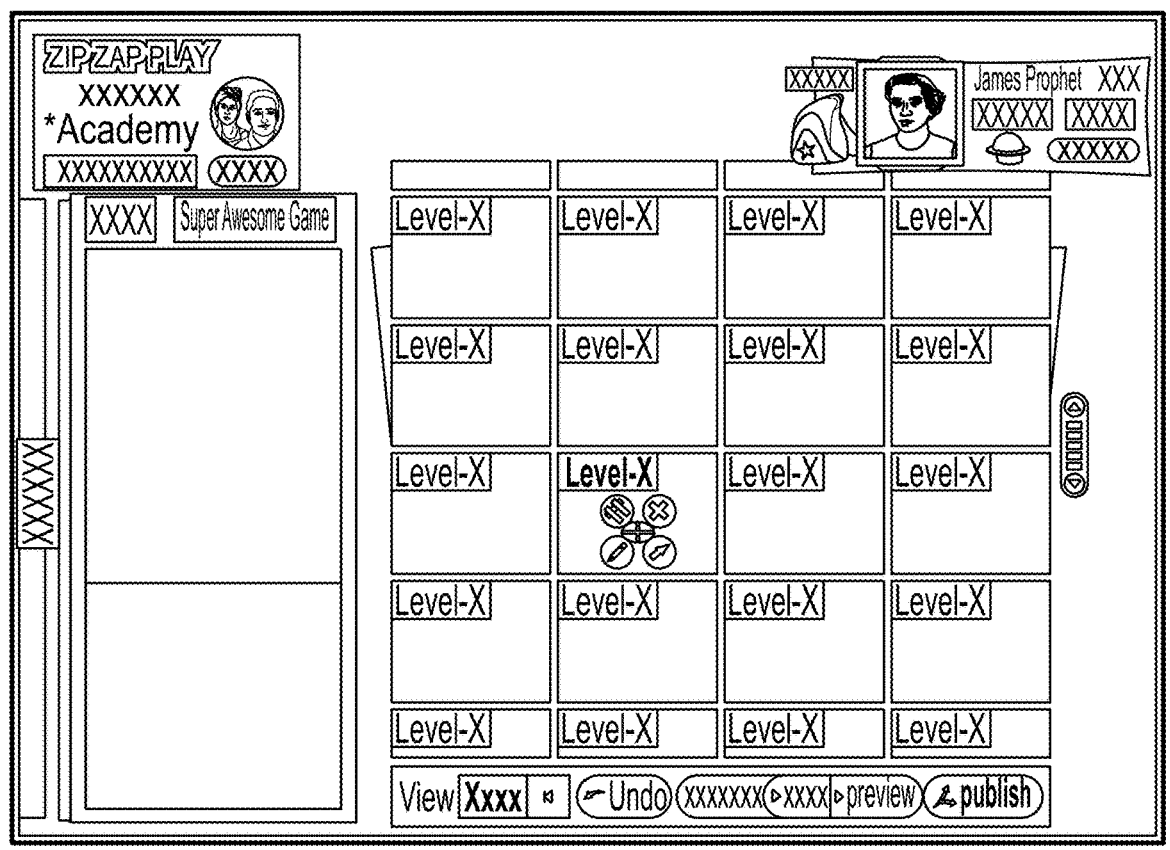
FIG. 44 illustrates how the multi-level view allows users to see and manipulate all the levels of a game at once.

Another aspect of this invention allows users to see and manipulate all the levels of a game at once. As FIG. 44 shows, all of the levels are represented by a miniature. Each level can be manipulated by bringing up the radial menu. They can be duplicated, edited, and deleted. Levels can be reordered using drag and drop interactions.

Figure 45:
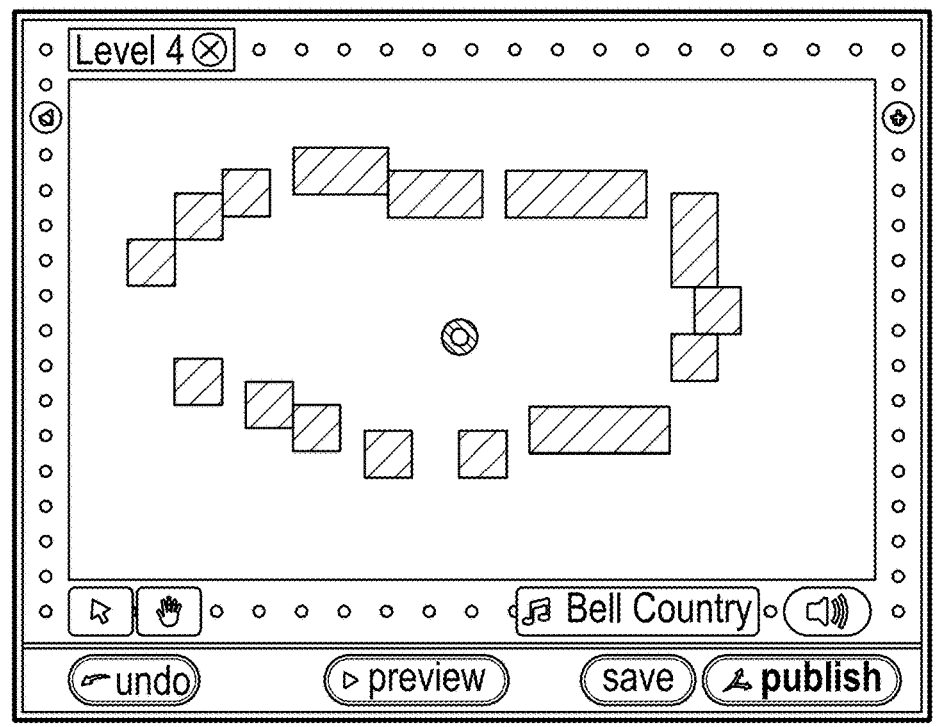
FIG. 45 shows how the stamping tool allows users to quickly build game levels by replicating game objects easily.

An aspect of the invention includes a unique stamping interaction. A user can select a game object to be stamped. Thereafter every time the user clicks on the game canvas, the game object is replicated. This continues until the user cancels the stamping interaction. Currently, the stamping interaction can be canceled by clicking anywhere outside of the game canvas. The stamp tool is shown in FIG. 45.

Figure 46:
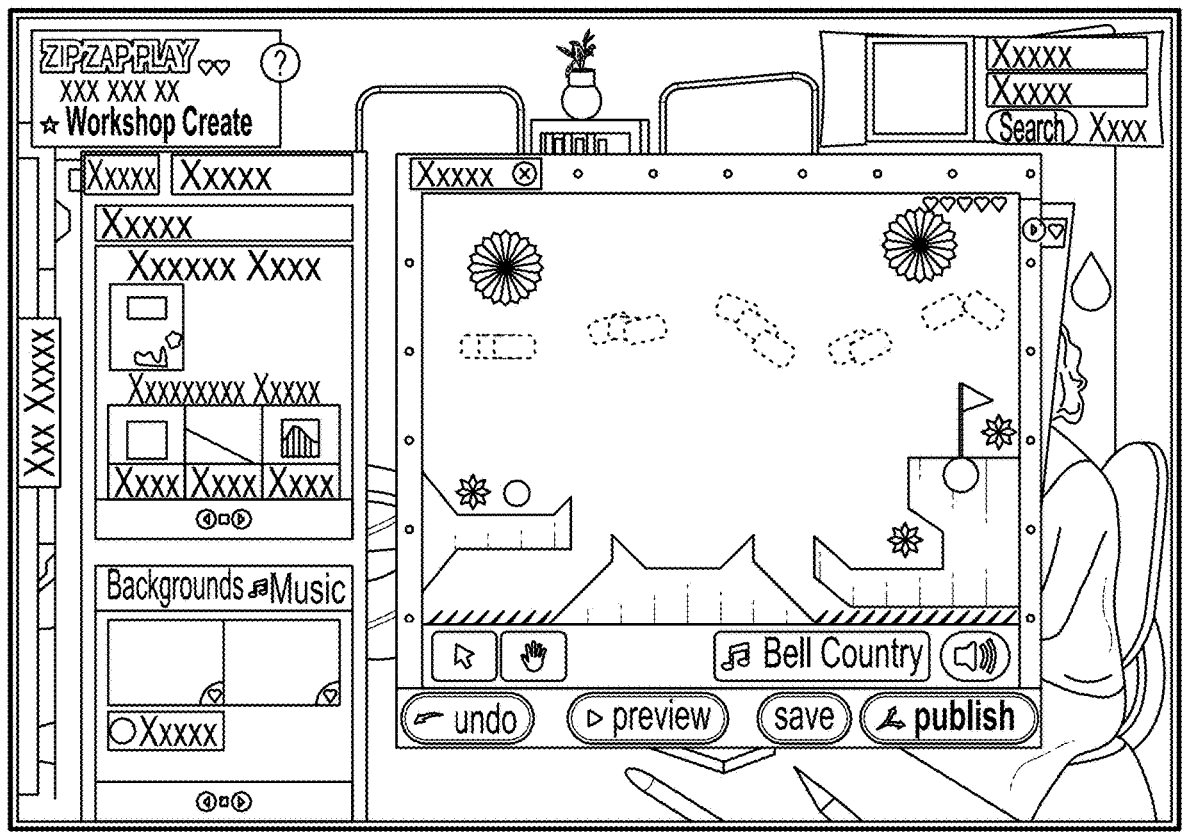
FIG. 46 illustrates how selecting the red brick in the Game Kit selects all the visible instances of the red brick in the current level.

Another unique aspect of the invention relates to the changing of properties of game objects in the game template. If an object's color or other properties are edited in the game kit then all pieces in the entire game will be changed at the same time. A unique method to demonstrate to the user that they are editing the properties of all objects in the game at once is to highlight all instances of that game object on the canvas at the same time. This can be a very useful feature, if for example a game creator decides that all enemies in a game should be tougher, or that they don't jump high enough. FIG. 46 shows a method for notifying the user that they are editing all game objects in the game at once.

There are several aspects to the inventive game editor that are unique. They are listed below:

(a) The concept of breaking up objects into categories: player controlled pieces, interactive pieces, environmental pieces, music and background.

(b) The library of all game objects and the game pieces of a specific game being organized according to the categories of game objects.

(c) Restricting which game objects can be used as objectives for the game.

(d) Restricting the type and number of game objects than can be controlled by the player.

(e) Restricting the type and number of game objects that can be used as backgrounds and music.

(f) The ability to upload images or videos to be used as the backgrounds.

(g) The ability to view and manipulate all the levels of a game at once.

(h) The ability to stamp multiple copies of a game object onto the game canvas.

(i) The ability to modify properties of many game objects at once by editing those properties of an object in the game kit rather than editing the properties of a specific game object on the canvas. This includes the notification to the user that they are editing all of the properties at once may be shown by highlighting all objects that the property modification affects, as well as potentially displaying all of the game levels which contain that object.

Other aspects may also be unique.

We can now describe how complete games along with their associated game kits, game objects and game assets are stored to disk. There are several unique aspects of this process that allow the system to scale to many objects.

First, we discuss the game file format and how game kits and levels are stored in it along with associated references to game objects discussed in Problem 1. The easiest way to explain the file format is to show an example level along with the actual file.

Figure 47:
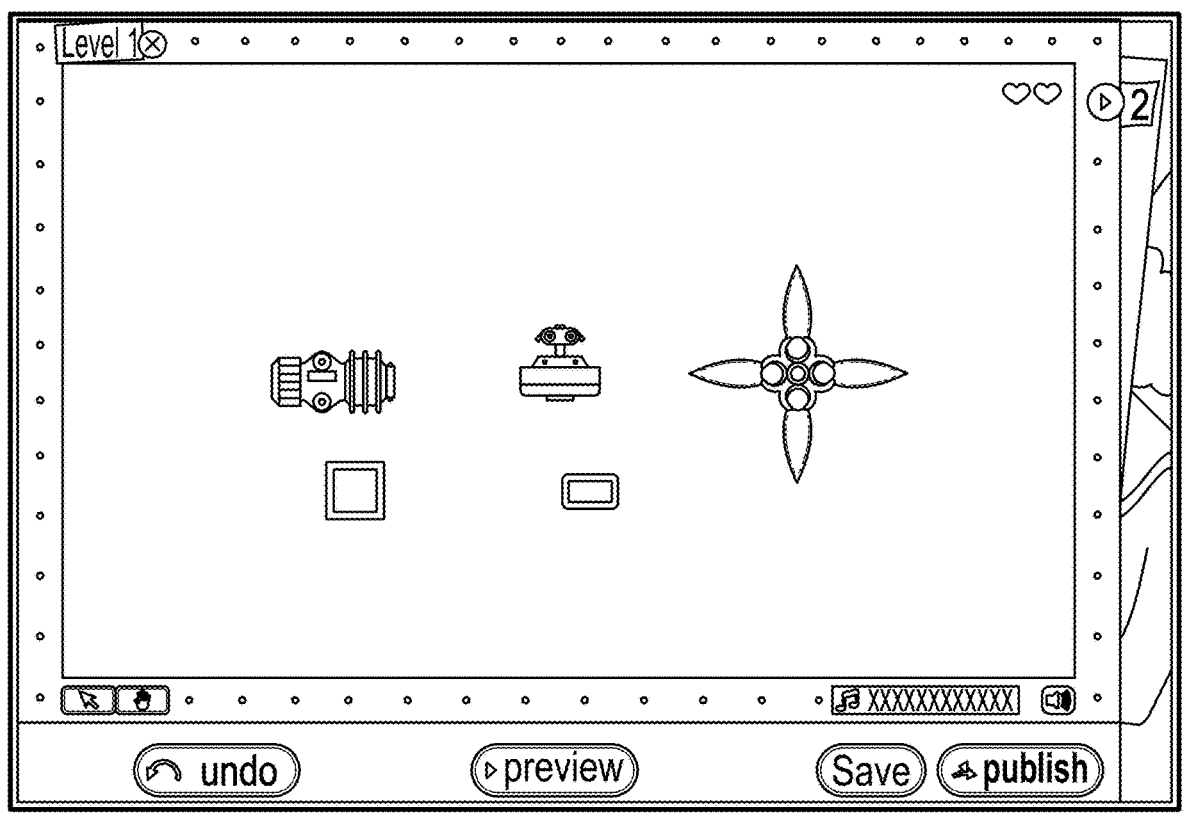
FIG. 47 shows an example level with a few game objects.

FIG. 47 depicts an example game consisting of two levels (the second level isn't shown for brevity). This very simple example game is saved to disk as the XML file shown in Code Listing 4 in FIG. 48A-B (collectively, FIG. 48).

The first thing to notice in Code Listing 4 in FIG. 48 is that the file format is XML (other formats could alternatively be used). We have chosen XML because it has proven itself to be a very flexible file format and more easily allows for forwards and backwards compatibility as file formats change over time. Another item of note is that there are two high level categories in the file, the kit and the levels of the game. The first section of the game level file describes the game kit used to make the game.

A unique aspect of the invention is that each game object (also known as a game piece) described in the game kit is not a full description of the game object, it merely describes how the game piece in the game kit is different from a base game object description described in a separate file. This is why each game piece in the kit has a reference to a base ID. This base ID is used to load a full description of a game piece from the game piece description file which may or may not be loaded from a remote server on the Internet. For a review of what a base game object file looks like refer to Code Listing 1 in FIG. 5 and the discussion in the Problem 1 section.

What is stored in the game kit section of the game file might not be the full description of a given game object, although it could be. As Code Listing 3 in FIG. 36 illustrates, only changes to that game object from the original game piece description file are described. For example, in the player section of the game kit, we see that the default physics properties and color of the object have been changed to be different values from the default game piece description.

An advantage of this scheme is that we only need have one base description of a game object (stored in an XML file) and any game kit object can simply reference this base description. This greatly reduces the cumulative amount of space required to store many games which all reference the same game object. Applying this separated storage concept to game pieces, and objects stored in a remote location accessed via the Internet is unique.

Because game kit objects describe the necessary changes color, physics, behavior, and other modifications to base objects, all that needs to be stored in the level sections of the file are the positions and orientations of those objects within the level. Note that each object within a level contains a reference to a game kit ID and sets the position of that game piece. Once again this structure reduces the file size of the game save format.

Keeping in mind the aforementioned comments we can now discuss how a complete game is loaded by a game engine using this embodiment of the invention:

The loading order of all files, game objects, game components etc. to play or edit a game is listed below:

1. The game save file is loaded from the server.
2. Base object files are loaded from the server or other location using the base IDs in the game file (or other methods such as an internal or external URL). This includes game assets required by the base objects are loaded from the server or other location using asset IDs or other URLs in the base object files.
3. Base object properties are modified according to the game kit modifications specified in the game kit section of the game file.
4. As each level is loaded/played, the game kit objects are placed in the new level.

There are a variety of code implementations and orderings that could be used to load a complete game. The order listed above is the currently preferred embodiment, but a number of optimizations or changes may be applied. Note that the game assets and game objects for a game need only be loaded once and can also be cached. In this way if a game object or asset is shared by multiple games, then over the course of multiple game play sessions game objects or game assets could be cached or stored locally to reduce network traffic.

Unique Aspects of the File Storage Formats:

(a) The storage of base game piece descriptions may be separated from modifications used in a particular game kit object.

(b) The levels section of the file need only reference the game kit object as opposed to specifying complete game objects directly in the file format.

(c) Game assets, Game objects, Game Kits, and games can be cached or stored locally.

(d) A database or other may be used to track unique identifiers for game objects, game components/assets, game levels, games or other aspects of the invention.

There are requirements for a game engine in order to be able to load or use the Game, Game Object and Game Component file formats. In order for another party to be able to use this aspect of the invention, they would use software which can load the game file, game object files, and game assets to create a fully running game. Typically this software includes a game engine, although other types of software might be used to edit the file format including special game object or game asset editors.

The current embodiment of the invention uses the following game engine features:

(a) the ability to read XML files (or other file formats in which game information is stored)

(b) the ability to display art/animation assets in a variety of formats (c) a physics engine which allows various physical properties of objects to be set (d) the ability to play sound effects and music (e) other game engine capabilities as needed Solution to Problem 8: A method by which any player of a game can easily edit or remix the game.

Approach to Problem 8: An aspect of our invention also allows for a new kind of remix culture. By default, every game made with our system can be modified, edited by itself or otherwise remixed with other games. Thus, we have the ability to let any user know that they have the ability to edit the game.

A version of this is a button or link in the frame for the game, and on the game over/win screens. Anyone playing a game can see an "Edit this game" or "Remix this game" button (or anything that indicates that the game could be modified) and is one-click away from doing so. Such a call to "Edit" the game can also be shown on interstitial screens (ie: between levels).

The inclusion of such a button or link appearing in a game is unique, because up until this aspect of the invention there was no way that a game could be edited or remixed easily.

Note that the use of the word "remix" is particularly applicable to aspects of this invention because a user could mix the game objects in this game with game objects in the repository. However, any term that conveys the concept of editing, modifying or otherwise changing the game would be appropriate.

Figure 49:
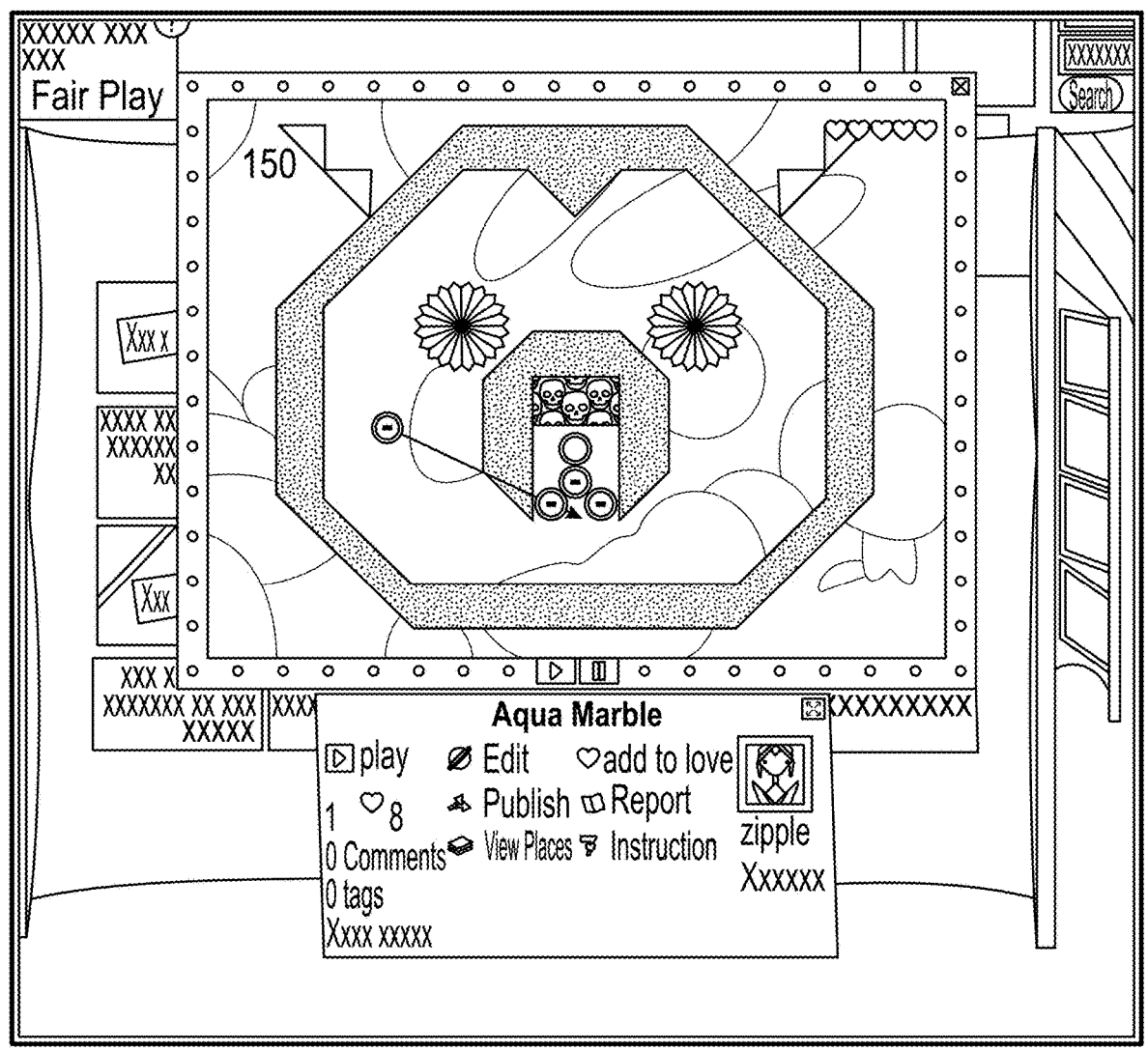
FIG. 49 shows an edit button in a game.
Figure 50:
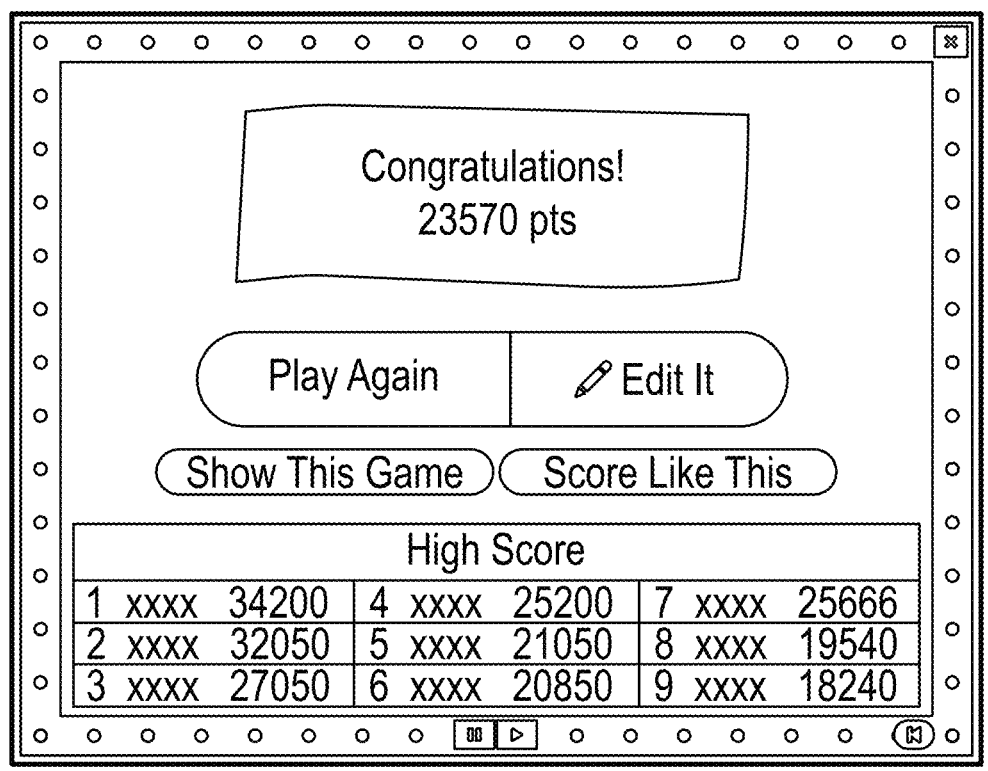
FIG. 50 illustrates that when a game is over, a prominent "Edit It" button is shown.

FIG. 49 shows an edit button in a game. Another placement of the edit/remix button is shown in FIG. 50.

The concept of notifying a user that a game can be edited or otherwise remixed is unique, in particular we propose that at least the following concepts are unique:

(a) The concept of notifying a user that a game can be edited.

(b) The concept that this notification can be present at all times while playing a game.

(c) The concept that this notification can be displayed, during the loading of the game, during the first screen of the game, at the end of the game, or at any time while playing the game.

Solution to Problem 9: We require system or framework which combines a subset or all of the above solutions to each of the problems in such a way that users with only a subset of skills required to create a complete game can participate in game creation.

Approach to Problem 9: An aspect of this invention is the combined structure of the solutions to the above problems in such a way that a given user need not understand the entirety (or even the majority) of the system in order to use it (see FIG. 1). For example the following things are true of our system:

(a) a player of the games need not understand how to create levels.

(b) a level designer doesn't need to understand how to create a useful game kit composed of game objects that work well together and rules that make sense.

(c) a game designer doesn't need to understand how to combine game components to create a game object.

(d) a technical game designer doesn't need to know how to program, draw, create music or sounds, or animations.

(e) an artist or programmer need not understand the skills required to be a technical game designer, game designer, or level designer.

We propose that Problems 1-7 can be seen as requiring 5 different levels of experience with game creation. We will describe how the solutions to Problems 1-7 maps to each level.

The act of game creation consists of the following layers of abstraction which require different subsets of skills to work in each layer. A person working in a specific layer need not understand the layers below or above. Let us examine the following layers in turn and see how each is decoupled from the next using the innovations proposed in this patent:

(a) Game component creation
  i. Programming
  ii. Audio, Animations and Art assets
(b) Technical Game design (Combining game components to create game objects)
(c) Game design (Combining and configuring game objects and rules to create a game kit)
(d) Level design (Combining game objects into a level, and combining levels into a game which can be played)
(e) Play Game component creation: This layer corresponds to the lowest level programming and game asset creation. In the section where we describe the approach to Problem 1, we describe how these components can be made to work together using messages and a physics engine. The components created are abilities, controls as well as art sounds and animation.

Technical game design: A technical game designer need only understand how to configure and combine game components to create new game objects. In our approach to Problem 1, we describe how XML is used to combine and configure game components (from the previous layer) to create a new game object. In our approach to Problem 3, we described how a tool might be used to graphically combine game components into game objects. The technical game designer may also decide to limit certain properties to a given range of values. For example the mass of Pacman might be allowed to be between 1 kilogram and 2 kilograms, but not outside this range. The output of a technical game designer is a game object with which some set of parameters may be varied within a given range.

Game Designer: A game designer configures complete game objects by selecting the value of a few sliders, and then combines fully configured game objects with rules to create a game kit. We describe our innovations in this area in our approaches to Problems 4, 5, and 6. Note that the game designer doesn't need to know how game objects are constructed from game components; they need only to know the allowable values for certain parameters and select a valid value for each parameter. Then they combine the game objects into a kit, and select the rules for the game.

Level design: In this layer, the user must understand where to place game objects into a level to make a game enjoyable. Where do the walls go? Where are the enemies placed? We have shown an innovative design for this layer when describing our approach to Problem 7. Note that no knowledge of any part of our approaches to Problems 4,5, and 6 is required when working in this layer. The user only places game objects.

Play: The simplest layer for a game creator or user of the website is simply to play games. This requires none of the skill set required to create games, nor does it require a tool other than the actual game itself.

We believe that the combination of all of the above activities into one framework or system is a unique concept. Furthermore, no attempt has been made to have this combination of features into an online system nor a system made using Adobe Flash's platform.

As stated earlier, there are several key problems for which this invention proposes a set of unique solutions:

1. A system or framework which enhances the likelihood (or ensures) that the game components and or game objects from a wide variety of game genres being placed into a central or distributed repository will work together. This means that game components can be combined to make a functional game object, and that game objects can be combined to make a complete game.

2. A central or distributed repository of game components and game objects that can be easily reviewed and searched by other users. The game components and or game objects can then be traded, sold, or gifted between any pair of users.

3. A tool or method which allows a user to combine the game components into game objects.

4. A tool or method which allows a user to modify the rules of a game.

5. A tool or method which allows a user to modify properties of game objects.

6. A tool or method which allows a user to create a combination of rules and game objects.

7. A tool or method which allows a user to combine the game objects into complete games.

8. A method by which any player of a game can easily edit or remix the game.

9. A system or framework which combines a subset or all of the above features.

10. A system or method that allows any of the above to done with two or more people collaborating.

At least the following combinations of features are unique, and have not been combined in any existing methods or systems for game creation:

(a) The combination of approaches 1 and 3. This includes our particular method of having a simple messaging system combined with a physics engine and XML file format to create game objects which work across genres is unique.

(b) The combination of approaches 4, 5, and 6. This includes the ability to easily modify game object properties using sliders, easily specify the rules, and create a combination of rules and game objects is unique.

(c) The combination of approaches 1, 3, 4, 5, and 6. This includes a system which has all of the above features is unique (d) The combination of approach 7 with the previous two options. This includes a system that has all of the above and also includes a level editor which is unique.

(e) The combination of the marketplace (approach 2) with any of the above subsets.

(f) The combination of a system which allows collaboration (approach 8) with any of the above.

Solution to Problem 10: A system or framework to do any of the above collaboratively.

Approach to Problem 10: An aspect of the invention provides a system through which the solutions to Problems 3, 7, 4, and 5 can be used in a collaborative manner. That is to say that two or more people can work together to create a game object from components, create a game from game objects, change the rules of the game, or edit properties of a game object. By designing aspects of the invention to be used on the web we allow the users to see the same level, game component or game object at the same time.

One particular embodiment uses the concept of shared objects and the use of an open source Adobe Flash Media server called red5 to share data between clients. This allows different people to work on the same thing either synchronously (working together at the same time) or asynchronously (working on the same thing at different times).

We believe that aspects of our invention will change the way games are made by enabling anyone to easily create, share and play games. With only limited spatial reasoning and a small amount of game play experience a child could easily create a new game by moving game objects and combining them in interesting ways. An individual with knowledge of only a single game development discipline such programming, art, music, sound effects, or other game related skill could contribute game components. Others could license game components from their original authors and combine these game components into game objects. Aspiring game designers could then search for these game objects, pay the owners for a license, edit the properties of these objects and place them into novel games. Placing all of these things into an environment that can be accessed by anyone with a web connection and high quality content is easily found and licensed will allow an entirely new way of creating games.

In the following paragraphs we summarize the unique aspects of the invention in layman terms. They are organized according to the outline of the different problems described previously.

Problem 1: A system or framework which enhances the likelihood (or ensures) that the game components and or game objects from a wide variety of game genres being placed into a central or distributed repository will work together.

Unique Aspects of our solution to Problem 1: We have created a particular grammar of inter-object messages such that game objects from many different styles of games can be made to work together. We have a system to create game objects from components that is flexible enough to create game objects from multiple genres. This allows for the following unique features of a game engine, among others:

(a) The re-combination or remixing of game objects that typically would not be seen together. One example might be a Space Invaders ship in a Breakout style game. This enables mixing game objects from almost any game genre together.

(b) The restriction of messages to a predefined set allows for game objects from the many genres defined above to work together. This selection of messages is unique.

(c) The ability to easily examine which messages any game component or object sends or receives. This allows 3rd parties to easily create new game components or game objects that work with an existing library of components or objects.

(d) The combination of the messaging system with a general physics engine is a unique method to ensure that game objects from different game types can work together meaningfully in a physical sense.

(e) Making a game object out of abilities, controllers and shapes is unique.

(f) Limiting messages sent between objects to score and destroy is unique.

(g) Having an XML file format directly specify properties of a game object that are editable is unique (h) Further having the file format specify the acceptable range of editable properties is unique (i) Marking the following properties of a game object as being editable and or specifying the acceptable range of those properties is unique:
  i. Mass
  ii. coefficient of restitution
  iii. density
  iv. moments of inertia
  v. size properties
  vi. color of any aspect of the object
  vii. amount of points of gaining
  viii. number of lives or health
  ix. any other property of a game object
  x. The sharing of game components or assets between objects is unique To our knowledge this is the first effort to create a game engine architecture which will allow game objects created by any person on the Internet to work well with a large library of game objects created by other users on the Internet with little to no coordination. This allows for the fully distributed creation of games. The above approach applies equally well to almost any game genre, multi-player or single player etc.

Problem 2: A central or distributed repository of game components and game objects that can be easily reviewed and searched by other users. The game components and or game objects can then be traded, sold, or gifted between any pair of users.

Unique Aspects of our solution to Problem 2: Applying any of the following techniques where the content is either game components or game objects is unique:

(a) Applying user-generated voting, rating, ranking, tagging, commenting, marking as inappropriate, direct or indirect to game components and game objects.

(b) Recommending game components and game objects to users based on their use of other components and game objects.

(c) The ability for users to take game objects from an existing game (both while playing the game and while editing the game) and adding them to their personal library.

(d) The separation of pieces into a large library containing all pieces and a smaller library of pieces used only for a specific game. This aspect of the invention allows a user to deal with potentially thousands of objects in the piece library.

(e) The concept of a personal library of game objects or game pieces that can be collected from a particular game.

(f) The purchase of complete game objects (including behavior, physical, visual, sounds etc.) for use in game creation or game play.

(g) The ability for users to upload game objects and sell or exchange them with other users. This allows talented creators to make a profit and potentially earn a living by creating game objects or game components.

(h) The use of a mathematical function or other method to automatically change the price of content such as game components and game objects.

(i) A method to allow people to try all content for free, but ask them to pay for it only when they share that content with other people.

(j) An open marketplace where game assets, game components and game objects are traded between users with a fee being applied to transactions.

Some other unique aspects of the invention:

(a) The concept of taking game objects from within an games and then re-using them to create another game.
  i. Doing so by placing the game object into any kind of personal library or shopping cart.
  ii. Doing so either when playing or editing a game
  iii. Doing any of the above using drag and drop (b) The purchase of complete game objects (including behavior, physical, visual, sounds etc.) for use in game creation or game play. This includes the use of a personal library or shopping cart to do so.

(c) The ability for users to upload game objects or components and sell or exchange them with users for either real, virtual currency or some form of barter.

(d) This concept of allowing full personal use of game objects before paying for them.

(e) The concept of only forcing the user of for-pay game objects to pay when they want to make a game public (share it with anyone else).

(f) The concept of a marketplace where game components and game objects are traded for virtual or real currency.

(g) Charging users of a game object marketplace to exchange game components or game objects. This includes using any of the following techniques:
  i. Fees for listing an item for sale
  ii. Fees charged to either user that are a percentage of the value of the transaction (in either virtual or real currency)
  iii. A fixed fee per transaction
  iv. Changing the size of the fee depending upon the kind of license to the content being exchanged The above aspects can also be further refined using the following concepts which are more specific to our particular implementation:

(a) (AND the above with the fact that the game objects can be used across multiple genres)

(b) (AND the above with online website)

(c) (AND the above with flash website)

Problem 3: A tool or method which allows a user to combine the game components into game objects. Unique Aspects of our solution to Problem 3 include:

(a) Easy selection and testing of sound effects for a game object upon certain events using a graphical user interface (b) The events might be destruction, damage, collision or any other events defined by the object (c) The selection of a visual game component of a game object using a graphical user interface (d) The selection of the abilities of an object using a graphical user interface (e) The selection of the parameters of an ability using a graphical user interface (f) The creation of the physics or visual components of a game object by drawing using the mouse or other pointing device (g) The use of a graphical user interface to combine game components into a game object (h) The ability to upload an image to be used as the background image for a game or level (i) The ability to upload a sound to be used as one of the sounds for a game object (j) The method by which users can decide who has access to their content and at what price Problem 4: A tool or method which allows a user to modify the rules of a game.

Unique Aspects of our solution to Problem 4 include: The ability of an end user to be able to easily change the rules of a game without requiring any scripting or programming.

(a) Allowing the user to specify the win conditions of games using the following concepts:
  i. The ability to define many game genres with only the following options: player object selection, one of only two objectives, and one or more game objects which are required by the objective.
  ii. The use of drag and drop interaction to select the game objects that belong in the rules/win conditions.
  iii. The ability to automatically warn the creator if they have incorrectly specified the rules/win conditions of a game (b) Ensuring the creator's game is always winnable by picking default game objects for the rules, while allowing them the freedom to make changes to the rules.

(c) The automatic generation of rules display to a user for any game is a unique concept.

(d) The display of the rules using the visual aspect game objects is a unique concept.

Problem 5: A tool or method which allows a user to modify properties of game objects.

Unique Aspects of our solution to Problem 5 include: There are many aspects of the above invention that allow the user to easily edit the properties of a game object, e.g.:

(a) The concept of a visual preview or testing sandbox to allow a user to easily understand the effects of the setting of properties.

(b) The idea that the properties of any game object can be edited within a few clicks from anywhere in the game editing interface.

(c) The concept that an unskilled user can easily change physics properties of a game object.

(d) The concept that an unskilled user can easily change the rules and behaviors of a game object.

(e) The concept that an unskilled user can easily change the color, animations, and sound effects of a game object.

(f) The ability for users to change the projectile(s) of a shooter piece and edit their properties.

(g) The ability for users to easily replace the visual component of a game object by uploading a picture.

(h) The ability for users to access and subscribe to their content stored on other websites for the purposes of placing that content onto game pieces.

(i) The ability for users to add and modify text associated with game objects including any of the aspects mentioned in problem 5.

(j) The ability for users to add and modify text as described in problem 5

(k) The ability for users to modify any of the aspects of particle effects used in a game either via an XML file or a graphical interface.

(j) (AND above with in a web-based framework, AND with flash).

Problem 6: A tool or method which allows a user to create a combination of rules and game objects.

Unique Aspects of our solution to Problem 6 include: In summary we have at least the following unique concepts of this approach:

(a) Specifying properties of game objects, combine them into a group along with the rules or win condition. Another way of phrasing this is that we believe that the concept of a game kit or template which combines fully specified game objects with rules is a unique concept.

(b) Ensuring that a game template always describes a winnable game. This may be done using a randomly generated game template or, alternatively, this can be done by using a game template from an existing game.

(c) The use of drag and drop from a personal library or shopping cart to add game objects to a game kit or template.

Problem 7: A tool or method which allows a user to combine the game objects into complete games.

Unique Aspects of our solution to Problem 7 include: There are several aspects to our particular game editor that are unique. Some are listed below:

(a) The concept of breaking up objects into categories: player controlled pieces, interactive pieces, environmental pieces, music and background.

(b) The library of all game objects and the game pieces of a specific game being organized according to the categories of game objects.

(c) Restricting which game objects can be used as objectives for the game.

(d) Restricting the type and number of game objects than can be controlled by the player.

(e) Restricting the type and number of game objects that can be used as backgrounds and music.

(f) The ability to upload images or videos to be used as the backgrounds.

(g) The ability to view and manipulate all the levels of a game at once.

(h) The ability to stamp multiple copies of a game object onto the game canvas.

(i) The ability to modify properties of many game objects at once by editing those properties of an object in the game kit rather than editing the properties of a specific game object on the canvas. This includes the notification to the user that they are editing all of the properties at once may be shown by highlighting all objects that the property modification affects, as well as potentially displaying all of the game levels which contain that object.

(j)(AND above with in a web-based framework, AND with flash).

Unique Aspects of the File Storage Formats:

(a) The storage of base game piece descriptions may be separated from minor modifications used in a particular game kit object (b) The level part of the file need only reference the game kit object as opposed to specifying complete game objects directly in the file format (c) Game assets, Game objects, Game Kits, and games can be cached or stored locally (d) A database or other may be used to track unique identifiers for game objects, game components/assets, game levels, games or other aspects of the invention Problem 8: A method by which any player of a game can easily edit or remix the game.

Unique Aspects of our solution to Problem 8: The concept of notifying a user that a game can be edited or otherwise remixed is unique, in particular we propose that at least the following concepts are unique:

(a) The concept of notifying a user that a game can be edited (b) The concept that this notification can be present at all times while playing a game (c) The concept that this notification can be displayed, during the loading of the game, during the first screen of the game, at the end of the game, or at any time while playing the game.

(d) (AND above with in a web-based framework, AND with flash).

Problem 9: A system or framework which combines a subset or all of the above features.

Unique Aspects of our solution to Problem 9: The approaches refer to the problems in the order given. We believe that at least certain combinations of the approaches are unique:

(a) The combination of approaches 1 and 3. This includes our particular method of having a simple messaging system combined with a physics engine and XML file format to create game objects which work across genres is unique.

(b) The combination of approaches 4, 5, and 6. This includes the ability to easily modify game object properties using sliders, easily specify the rules, and create a combination of rules and game objects is unique.

(c) The combination of approaches 1, 3, 4, 5, and 6. This includes the concept that a system which has all of the above features is unique (d) The combination of approach 7 with the previous two options. This includes the concept that a system that has all of the above features and also includes a level editor is unique (e) The combination of the marketplace (approach 2) with any of the above subsets.

(f) The combination of a system which allows collaboration (approach 8) with any of the above (g)(AND above with in a web-based framework, AND with flash).

Problem 10: A system or method that allows any of the above to done with two or more people collaborating.

Unique Aspects of our solution to Problem 10 include: One embodiment uses the concept of shared objects and the use of an open source Adobe Flash Media server called red5 to share data between clients. This allows different people to work on the same thing either synchronously (working together at the same time) or asynchronously (working on the same thing at different times). (AND above with in a web-based framework, AND with flash).

One or more aspects of the invention may be embodied in computer-usable data and computer-executable instructions, such as in one or more program modules, executed by one or more communicatively coupled computers or other devices (e.g., over a network such as the Internet). Generally, program modules include routines, programs, objects, components, data structures, etc. that perform particular tasks or implement particular abstract data types when executed by a processor in a computer or other device. The computer executable instructions may be stored on a computer readable medium or computer storage medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein. Multiple interconnected computing devices may be used in concert to affect one or more aspects of the invention, e.g., communicating over the Internet or other wired or wireless communications network.

What is claimed is:

1. A system comprising:
   at least one memory having stored thereon (i) computer-executable instructions, and (ii) game-creation assets including a plurality of game objects,
      wherein each of the plurality of game objects is stored in the at least one memory as a game object file, and each of the plurality of game objects is created from one or more game components, each game component is defined by a set of component parameters and respective parameter values,
      wherein each of the component parameter values is set to be editable or not editable by a respective creator for subsequent users of the respective game object,
      wherein the plurality of game objects include a first game object received from a first computing device corresponding to a first creator of the first game object, and a second game object received from a second computing device corresponding to a second creator of the second game object;
   at least one processor configured to execute the computer-executable instructions, wherein executing the computer-executable instructions causes the at least one processor to:
   receive, from a third computing device, a request to access a library of game-creation assets for a video game;
   cause to display, on the third computing device, a graphical user interface (GUI) illustrating the library of game-creation assets for creating a video game, the library of game-creation assets including the plurality of game objects;
   receive, from the third computing device, a request to edit the first game object; and
   cause to display, on the third computing device, an object editing GUI for editing component parameters of the first game object, where the object editing GUI is configured to automatically generate interface elements configured to adjust component parameters of the first game object based on the component parameters set as editable by the first creator of the first game object.

2. The system of claim 1, wherein the at least one memory is further configured to store a plurality of game components, each of the plurality of game components is stored as a game component file, wherein the plurality of game components comprises a first game component, wherein the first game object comprises the first game component and the second game object comprises the first game component.

3. The system of claim 1, wherein the execution of the computer-executable instructions further causes the at least one processor to:
   receive, via the GUI, from a third computing device corresponding to a third creator, a request to use the first game object, wherein the first game object is stored in a first game object file;
   authorize use of the first game object by the third computing device, wherein the authorizing of the use of the first game object includes providing a first virtual object file corresponding to the first game object, the first virtual object file including (i) a unique identifier referencing the first game object file, and (ii) new parameter values, the new parameter values of the first virtual object file including parameter values that are different than the parameter values of the first game object and excluding parameter values that are the same as the parameter values stored in the first game object file.

4. The system of claim 3, wherein the execution of the computer-executable instructions further causes the at least one processor to:
   receive, from the third computing device, an update to a first component parameter value of the first game object;
   add the first component parameter value to the new parameter values of the first virtual object file.

5. The system of claim 3, wherein the execution of the computer-executable instructions further causes the at least one processor to:
   receive, from the third computing device, a request to create a first game application, wherein the first game application includes the first game object and the second game object.

6. The system of claim 5, wherein the authorization of use of the first game object includes a limitation on use of the first game object until a predefined condition is met, wherein the limitation prevents sharing the first game application with other users, while allowing the third creator to play the first game application.

7. The system of claim 1, wherein the plurality of game components are configured to transmit and receive messages to and from one another, the messages being restricted to a defined set of game component message types, and the plurality of game objects are configured to transmit and receive messages to and from one another, the messages being restricted to a defined set of game object message types.

8. The system of claim 1, wherein the execution of the computer-executable instructions further causes the at least one processor to:
   receive, from the third computing device, a request to add a third game object created by a third creator to the library of game-creation assets, the request including:
   (i) a third game object file including (a) component parameters and respective component parameter values defining the third game object, and (b) an indication of whether each of the component parameter values defining the third game object is editable or not editable, and (ii) rules for authorizing use of the third game object and limitations to the use of the third game object, add the third game object to the library of game-creation assets, including storing the third game object file and the rules; and cause to display the third game object within the library of game-creation assets.

9. The system of claim 1, wherein for each of the editable component parameter values is set to be editable within defined constraints set by the respective creator.

10. The system of claim 9, wherein the execution of the computer-executable instructions further causes the at least one processor to automatically display different types of interface elements based on a type of the defined constraints of the object component parameter value.

11. The system of claim 9, wherein the defined constraints are at least one of a maximum value and a minimum value, a list of values, or a Boolean value.

12. A computer-implemented method comprising:
as implemented by at least one processor executing computer-executable instructions,
storing game-creation assets including a plurality of game objects, wherein each of the plurality of game objects is stored as a game object file, and each of the plurality of game objects is created from one or more game components, each game component is defined by a set of component parameters and respective component parameter values, wherein each of the component parameter values is set to be editable or not editable by a respective creator for subsequent users of the respective game object, wherein the plurality of game objects include a first game object received from a first computing device corresponding to a first creator of the first game object, and a second game object received from a second computing device corresponding to a second creator of the second game object;
receiving, from a third computing device, a request to access a library of game-creation assets for a video game;
causing to display, on the third computing device, a graphical user interface (GUI) illustrating the library of game-creation assets for creating a video game, the library of game-creation assets including the plurality of game objects;
receiving, from the third computing device, a request to edit the first game object; and
causing to display, on the third computing device, an object editing GUI for editing component parameters of the first game object, where the object editing GUI is configured to automatically generate interface elements configured to adjust component parameters of the first game object based on the component parameters set as editable by the first creator of the first game object.

13. The method of claim 12 further comprising storing a plurality of game components, each of the plurality of game components is stored as a game component file, wherein the plurality of game components comprises a first game component, wherein the first game object comprises the first game component and the second game object comprises the first game component.

14. The method of claim 12 further comprising:
receiving, via the GUI, from a third computing device corresponding to a third creator, a request to use the first game object, wherein the first game object is stored in a first game object file;
authorizing use of the first game object by the third computing device, wherein the authorizing of the use of the first game object includes providing a first virtual object file corresponding to the first game object, the first virtual object file including (i) a unique identifier referencing the first game object file, and (ii) new parameter values, the new parameter values of the first virtual object file including parameter values that are different than the parameter values of the first game object and excluding parameter values that are the same as the parameter values stored in the first game object file.

15. The method of claim 14 further comprising:
receiving, from the third computing device, an update to a first component parameter value of the first game object;
adding the first component parameter value to the new parameter values of the first virtual object file.

16. The method of claim 14 further comprising:
receiving, from the third computing device, a request to create a first game application, wherein the first game application includes the first game object and the second game object.

17. The method of claim 16, wherein the authorizing of use of the first game object includes a limitation on use of the first game object until a predefined condition is met, wherein the limitation prevents sharing the first game application with other users, while allowing the third creator to play the first game application.

18. The method of claim 12, wherein the plurality of game components are configured to transmit and receive messages to and from one another, the messages being restricted to a defined set of game component message types, and the plurality of game objects are configured to transmit and receive messages to and from one another, the messages being restricted to a defined set of game object message types.

19. The method of claim 12 further comprising:
receiving, from the third computing device, a request to add a third game object created by a third creator to the library of game-creation assets, the request including:
(i) a third game object file including (a) component parameters and respective component parameter values defining the third game object, and (b) an indication of whether each of the component parameter values defining the third game object is editable or not editable, and
(ii) rules for authorizing use of the third game object and limitations to the use of the third game object,
adding the third game object to the library of game-creation assets, including storing the third game object file and the rules; and
causing to display the third game object within the library of game-creation assets.

20. The method of claim 12, wherein for each of the editable component parameter values is set to be editable within defined constraints set by the respective creator.

* * * * *